United States Patent
Oh et al.

(10) Patent No.: US 12,213,213 B2
(45) Date of Patent: Jan. 28, 2025

(54) ELECTRONIC DEVICE TRANSMITTING UE CAPABILITY AND METHOD FOR OPERATING THEREOF

(71) Applicant: SAMSUNG ELECTRONICS CO., LTD., Suwon-si (KR)

(72) Inventors: Jungmin Oh, Suwon-si (KR); Sanghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/733,112

(22) Filed: Apr. 29, 2022

(65) Prior Publication Data

US 2022/0360975 A1  Nov. 10, 2022

Related U.S. Application Data

(63) Continuation of application No. PCT/KR2022/006031, filed on Apr. 27, 2022.

(30) Foreign Application Priority Data

Apr. 30, 2021 (KR) .......................... 10-2021-0056898

(51) Int. Cl.
*H04W 8/24* (2009.01)
*H04W 60/00* (2009.01)
*H04W 76/10* (2018.01)

(52) U.S. Cl.
CPC ............. *H04W 8/24* (2013.01); *H04W 60/00* (2013.01); *H04W 76/10* (2018.02)

(58) Field of Classification Search
CPC ..... H04W 76/10; H04W 60/04; H04W 60/00; H04W 8/24; H04W 76/27; H04W 88/06; H04W 76/30
See application file for complete search history.

(56) References Cited

U.S. PATENT DOCUMENTS 11,197,230 B2 * 12/2021 Jain ........................ H04W 48/16
11,425,772 B2 * 8/2022 Mattam ................... H04W 8/22
(Continued)

FOREIGN PATENT DOCUMENTS

CN          108200612       6/2018
KR     10-2012-0083870      7/2012
(Continued)

OTHER PUBLICATIONS

Search Report and Written Opinion issued Jul. 26, 2022 in counterpart International Patent Application No. PCT/KR2022/006031.
(Continued)

*Primary Examiner* — Congvan Tran
(74) *Attorney, Agent, or Firm* — Nixon & Vanderhye P.C.

(57) ABSTRACT

According to various embodiments, an electronic device includes: at least one processor, and the at least one processor is configured to: check at least one event requiring a change in user equipment (UE) capability of the electronic device, change the UE capability of the electronic device based on the at least one event and transmit a TAU request message indicating that UE capability information update is requested, enter an idle state, based on receiving a TAU acceptance message corresponding to the TAU request message in a state in which the UE capability enquiry message corresponding to the TAU request is not received, establish a new RRC connection with the network in the idle state, receive a UE capability enquiry message based on the new RRC connection, and transmit a UE capability information message including the changed UE capability, based on the reception of the UE capability enquiry message.

19 Claims, 34 Drawing Sheets

(56) References Cited

U.S. PATENT DOCUMENTS

| | | | |
|---|---|---|---|
| 2012/0184281 A1 | 7/2012 | Kim et al. | |
| 2013/0322302 A1* | 12/2013 | Gholmieh | H04W 76/30 |
| | | | 370/328 |
| 2015/0351054 A1* | 12/2015 | Immonen | H04W 52/243 |
| | | | 370/311 |
| 2019/0116483 A1 | 4/2019 | Ryu et al. | |
| 2020/0045767 A1* | 2/2020 | Velev | H04W 8/24 |
| 2020/0229076 A1* | 7/2020 | Jin | H04W 8/24 |
| 2021/0204112 A1 | 7/2021 | Kim et al. | |
| 2021/0243590 A1 | 8/2021 | Jin et al. | |

FOREIGN PATENT DOCUMENTS

| | | |
|---|---|---|
| KR | 10-2018-0123141 | 11/2018 |
| KR | 10-2019-0107150 | 9/2019 |
| KR | 10-2020-0088667 | 7/2020 |
| KR | 10-2020-0118724 | 10/2020 |
| WO | 2020/209541 | 10/2020 |

OTHER PUBLICATIONS

Huawei et al., 'Correction on UE Radio Capability Handling during suspend', S2-2100125, 3GPP TSG-WG SA2 Meeting #143E e-meeting, Elbonia, Feb. 18, 2021, 4 pp.

'3GPP; TSG SA; GPRS enhancements for E-UTRAN access (Release 17)', 3GPP TS 23.401 V17.0.0, Mar. 30, 2021, 444 pp.

Apple et al., 'Leaving procedure for Multi-USIM UEs', C1-212575, 3GPP TSG-CT WG1 Meeting #129-e, Electronic meeting, Apr. 22, 2021, 37 pp.

* cited by examiner

ELECTRONIC DEVICE TRANSMITTING UE CAPABILITY AND METHOD FOR OPERATING THEREOF

CROSS-REFERENCE TO RELATED APPLICATIONS

This application is a continuation of International Application No. PCT/KR2022/006031 designating the United States, filed on Apr. 27, 2022, in the Korean Intellectual Property Receiving Office and claiming priority to Korean Patent Application No. 10-2021-0056898, filed on Apr. 30, 2021, in the Korean Intellectual Property Office, the disclosures of which are incorporated by reference herein in their entireties.

BACKGROUND

Field

The disclosure relates to an electronic device for transmitting UE capability and a method for operating the same.

Description of Related Art

An electronic device may transmit a user equipment (UE) capability information message to a network. The UE capability information message may include, for example, a message transmitted to the network during a procedure in which the electronic device registers on the network. The UE capability information may include, for example, a supported band combination list, a carrier aggregation (CA) bandwidth class, a CA parameter, a codebook parameter, a featureset (for example, FeatureSetDownlinkPerCC or FeatureSetuplinkPerCC), and MIMO-ParametersPerB and. The network may receive UE capability and may allocate a resource based thereon, thereby communicating with the electronic device. The network may perform control (for example, SRS configuration, Measurement configuration, handover command, redirection) of the electronic device based on UE capability.

The network may transmit a UE capability Enquiry message to the electronic device. Based on receiving the UE capability Enquiry message, the electronic device may transmit a UE capability information message to the network. 24.301 of TS (technical specification) of 3GPP ($3^{rd}$ generation partnership project) defines "UE radio capability information update needed", which is an information element included in a TAU (tracking area update) request message. If UE capability needs to be updated, the electronic device may transmit a TAU request message including the corresponding IE to the network. After receiving the TAU request message including the corresponding IE, the network may transmit a UE capability enquiry message to the electronic device, and the electronic device may transmit a UE capability information message updated so as to correspond to the UE capability enquiry message to the network.

When a TAU request message including an information element of "UE radio capability information update needed" is received, the network may transmit a UE capability enquiry message, but the network may transmit no UE capability enquiry message in some cases. For example, if the electronic device has transmitted a TAU request message in a radio resource control (RRC) connected state, the network may transmit no UE capability enquiry message and may operate so as to maintain existing RRC connection. In this case, the network cannot identify a change in UC capability of the electronic device, and this may cause a mismatch between the changed UE capability of the electronic device and the UE capability managed by the network. As a result of such a mismatch between UE capabilities, there is a possibility that the network will instruct an operation that the electronic device cannot perform, or a problem (for example, severe heating) may occur due to an operation caused by the UE capability prior to the change.

SUMMARY

Embodiments of the disclosure provide an electronic device and a method for operating the same may enter an idle state and establish new RRC connection, thereby performing UE capability transfer, when a TAU request message including an information element of "UE radio capability information update needed" has been transmitted, but no UE capability transfer has been performed.

According to various embodiments, an electronic device may include: at least one processor, wherein the at least one processor is configured to: identify at least one event requiring a change in user equipment (UE) capability of the electronic device, change the UE capability of the electronic device, based on the at least one event and transmit a tracking area update (TAU) request message indicating that UE capability information update is requested, enter an idle state based on receiving a TAU accept message corresponding to the TAU request message in a state in which a UE capability enquiry message corresponding to the TAU request is not received, establish a new radio resource control (RRC) connection with the network in the idle state, receive a UE capability enquiry message based on the new RRC connection, and transmit a UE capability information message including the changed UE capability based on the reception of the UE capability enquiry message.

According to various embodiments, a method of operating an electronic device may include identifying at least one event requiring a change in UE capability of the electronic device, changing the UE capability of the electronic device based on the at least one event and transmitting a TAU request message indicating that UE capability information update is requested, entering an idle state, based on receiving a TAU acceptance message corresponding to the TAU request message in a state in which a UE capability enquiry message corresponding to the TAU request is not received, establishing a new RRC connection with the network in the idle state, receiving a UE capability enquiry message based on the new RRC connection; and transmitting a UE capability information message including the changed UE capability, based on the reception of the UE capability enquiry message.

Various embodiments may provide an electronic device and a method for operating the same, which enter an idle state and establish new RRC connection, thereby performing UE capability transfer, when a TAU request message including an information element of "UE radio capability information update needed" has been transmitted, but no UE capability transfer has been performed. This may suppress occurrence of a problem due to a mismatch between UE capabilities between the electronic device and the network.

DETAILED DESCRIPTION

Figure 1:
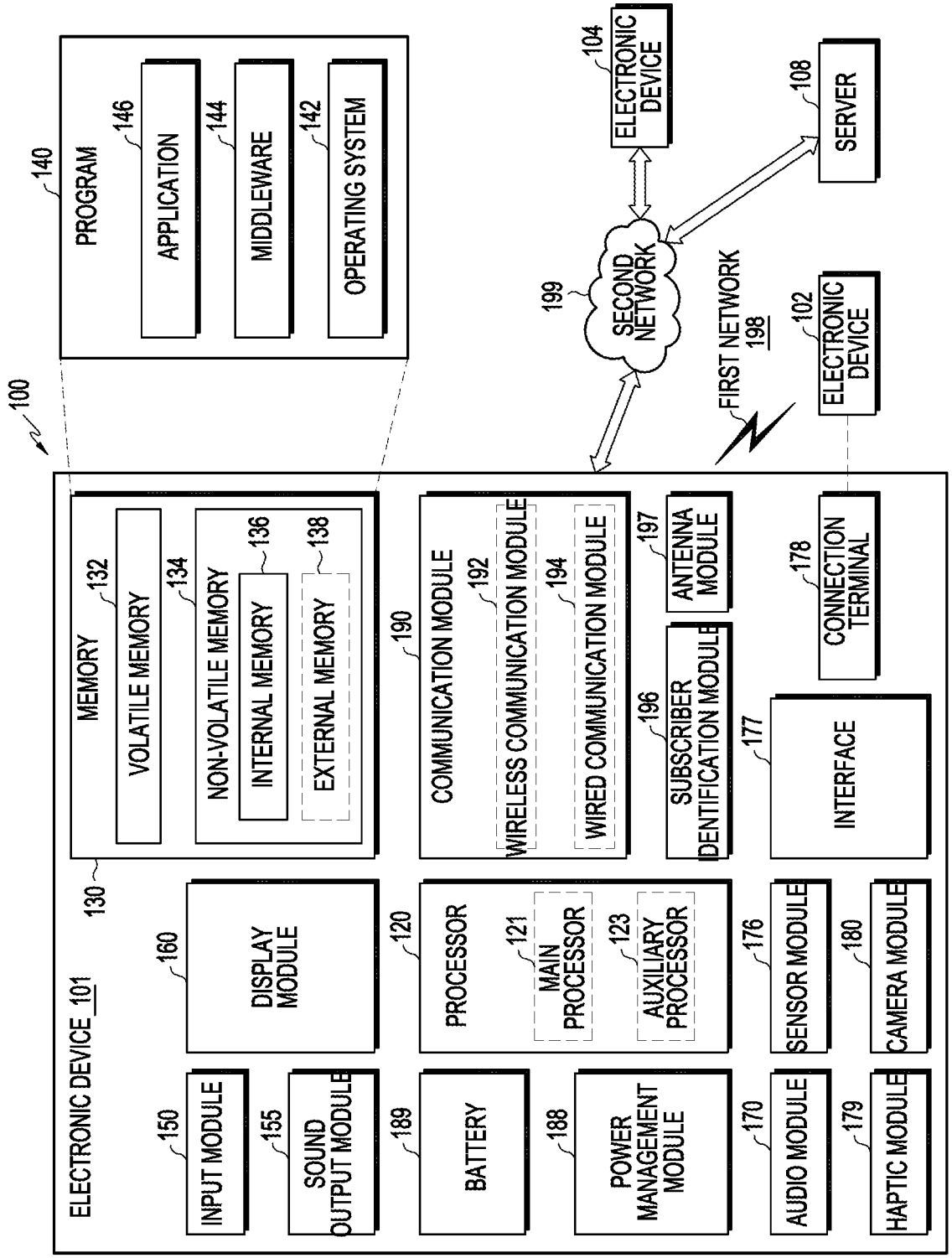
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network.

According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
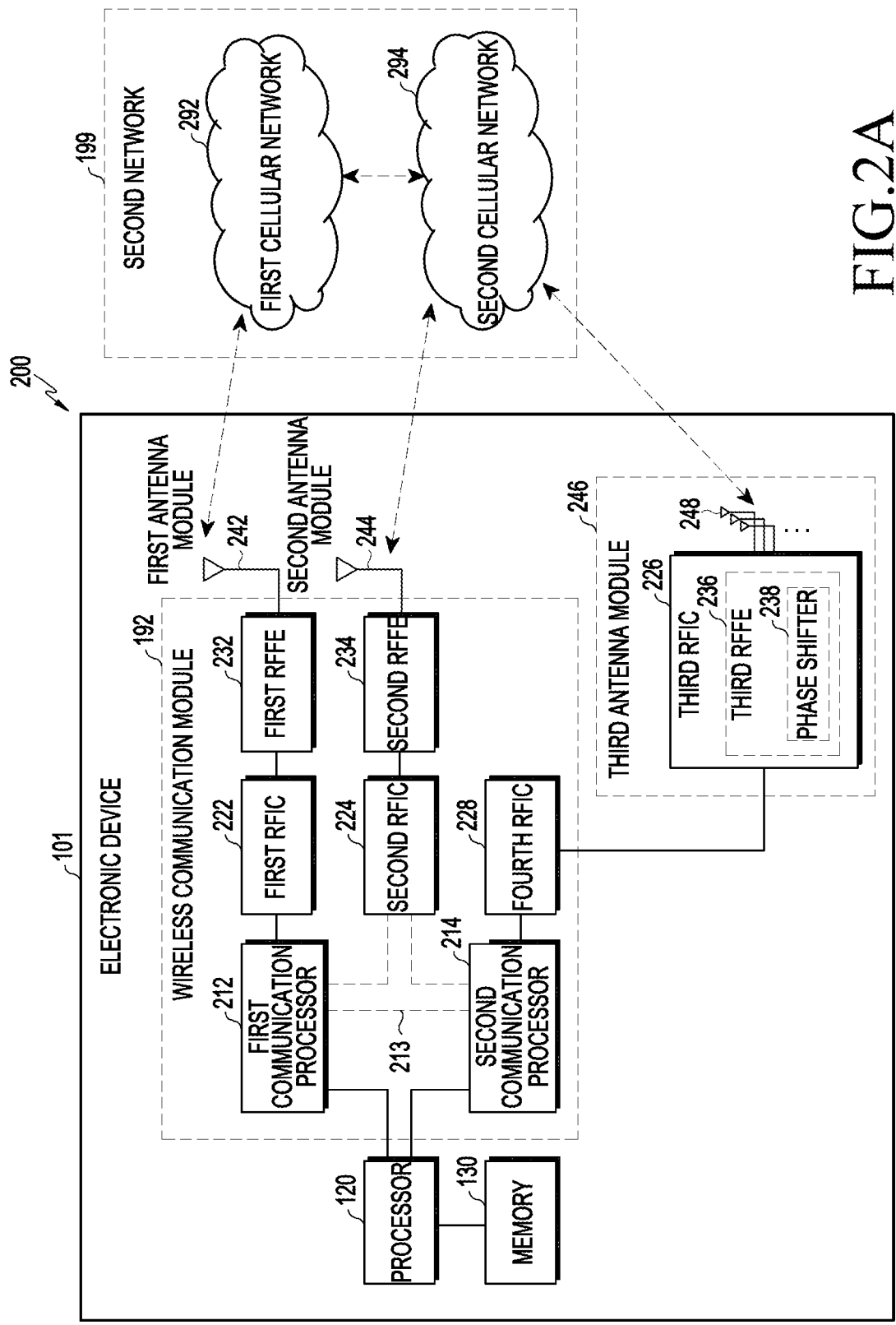
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246 and antennas 248. The electronic device 101 may further include a processor 120 and a memory 130. A second network 199 may include a first cellular network 292 and a second cellular network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to an embodiment, the fourth RFIC 228 may be omitted or may be included as a part of the third RFIC 226.

The first communication processor 212 may support include various processing circuitry and establishment of a communication channel of a band to be used for wireless communication with the first cellular network 292, and legacy network communication through the established communication channel According to various embodiments, the first cellular network may be a legacy network including a second generation (2G), 3G, 4G, or long-term evolution (LTE) network. The second communication processor 214 may support establishment of a communication channel corresponding to a designated band (e.g., about 6 GHz to about 60 GHz) among bands to be used for wireless communication with the second cellular network 294, and 5G network communication through an established communication channel According to various embodiments, the second cellular network 294 may be a 5G network defined by 3GPP. Additionally, according to an embodiment, the first communication processor 212 or the second communication processor 214 may support establishment of a communication channel corresponding to another designated band (e.g., about 6 GHz or less) among bands to be used for wireless communication with the second cellular network 294, and 5G network communication through an established communication channel.

The first communication processor 212 may transmit and receive data to and from the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART), (e.g., high speed-UART (HS-UART) or a peripheral component interconnect bus express (PCIe) interface), but there is no limitation in the type thereof. Alternatively, the first communication processor 212 and the second communication processor 214 may exchange control information and packet data information using, for example, a shared memory. The first communication processor 212 may transmit and receive various information to and from the second communication processor 214, such as sensing information, information on output strength, and resource block (RB) allocation information.

Depending on the implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from the processor 120 (e.g., an application processor) through the HS-UART interface or the PCIe interface, but the type of interface is not limited. Alternatively, the first communication processor 212 and the second communication processor 214 may exchange control information and packet data information using a shared memory with the processor 120 (e.g., an application processor).

Figure 2B:
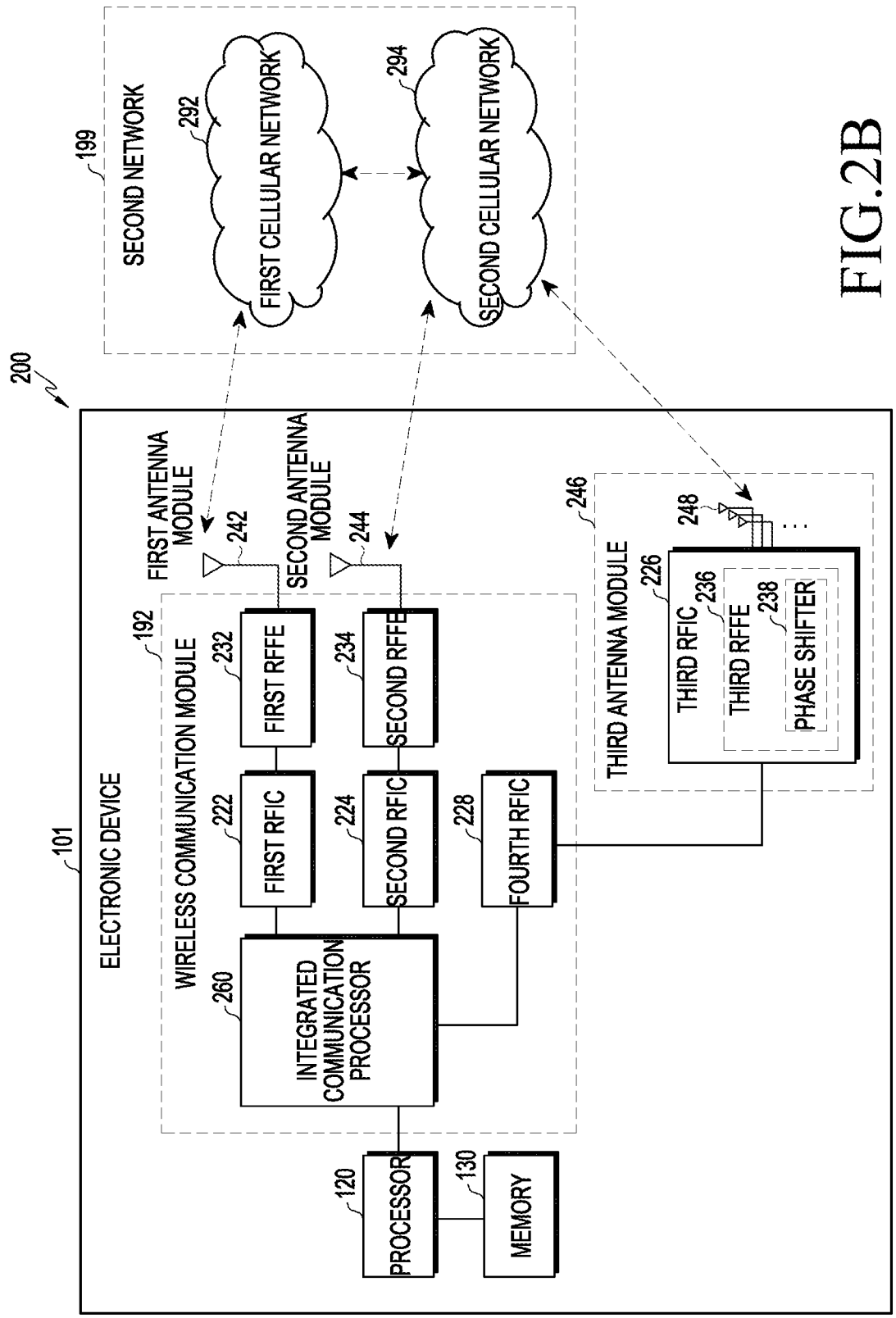
FIG. 2B is a block diagram illustrating an example configuration of an electronic device for supporting legacy network communication and 5G network communication according to various embodiments.

According to an embodiment, the first communication processor 212 and the second communication processor 214 may be configured in a single chip or a single package. According to various embodiments, the first communication processor 212 or the second communication processor 214 may be configured in a single chip or a single package with the processor 120, an auxiliary processor 123, or a communication module 190. For example, as illustrated in FIG. 2B, a communication processor 260 may include various processing circuitry and support both functions for communication with the first cellular network 292 and the second cellular network 294.

The first RFIC 222, on transmission, may convert the baseband signal generated by the first communication processor 212 into a radio frequency (RF) signal of about 700 MHz to about 3 GHz used in the first cellular network 292 (e.g., a legacy network). On reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

The second RFIC 224 may, on transmission, convert the baseband signal generated by the first communication processor 212 or the second communication processor 214 into an RF signal (hereinafter, 5G Sub6 RF signal) of the Sub6 band (e.g., about 6 GHz or less) used for the second cellular network 294 (e.g., a 5G network). On reception, a 5G Sub6 RF signal may be obtained from the second cellular network 294 (e.g., 5G network) through an antenna (e.g., second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second cellular network 294 (e.g., a 5G network). On reception, a 5G Above6 RF signal may be obtained from the second cellular network 294 (e.g., 5G network) through antennas (e.g., antennas 248), and may be preprocessed through a third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

According to an embodiment, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then transmit the IF signal to the third RFIC 226. The third RFIC 226 may convert the IF signal into a 5G Above6 RF signal. On reception, the 5G Above6 RF signal may be received from the second cellular network 294 (e.g., 5G network) through antennas (e.g., antennas 248) and converted to an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least a part of a single chip or a single package. According to various embodiments, if the first RFIC 222 and the second RFIC 224 in FIG. 2A or 2B are configured as a single chip or a single package, they may be configured as an integrated RFIC. In this case, the integrated RFIC may be connected to the first RFFE 232 and second RFFE 234 to convert a baseband signal into a signal of a band supported by the first RFFE 232 and/or second RFFE 234, and transmit the converted signal to one of the first RFFE 232 and the second RFFE 234. According to an embodiment, the first RFFE 232 and the second RFFE 234 may be configured as at least a part of a single chip or a single package. According to an embodiment, at least one antenna module of the first antenna module 242 or the second antenna module 244 may be omitted or may be combined with another antenna module to process RF signals of a plurality of corresponding bands.

According to an embodiment, the third RFIC 226 and the antennas 248 may be disposed on the same substrate to configure the third antenna module 246. For example, the wireless communication module 192 or the processor 120 may be disposed on the first substrate (e.g., main PCB). In this case, the third RFIC 226 may be disposed in a partial area (e.g., bottom) of the second substrate (e.g., sub PCB) separate from the first substrate, and the antennas 248 may be disposed in another partial area (e.g., top), thereby configuring the third antenna module 246. By disposing the third RFIC 226 and the antennas 248 on the same substrate, it is possible to reduce the length of the transmission line therebetween. This, for example, may reduce loss (e.g., attenuation) of a signal in a high-frequency band (e.g., about 6 GHz to about 60 GHz) used for 5G network communication by the transmission line. Accordingly, the electronic device 101 may improve the quality or speed of communication with the second network 294 (e.g., a 5G network).

According to an embodiment, the antennas 248 may be configured as an antenna array including a plurality of antenna elements that may be used for beamforming. In this case, the third RFIC 226 may include, for example, as part of the third RFFE 236, a plurality of phase shifters 238 corresponding to a plurality of antenna elements. On transmission, each of the plurality of phase shifters 238 may convert the phase of a 5G Above6 RF signal to be transmitted to the outside (e.g., a base station of a 5G network) of the electronic device 101 through a corresponding antenna element. On reception, each of the plurality of phase shifters 238 may convert the phase of the 5G Above6 RF signal received from the outside through a corresponding antenna element into the same or substantially the same phase. This enables transmission or reception through beamforming between the electronic device 101 and the outside.

The second cellular network 294 (e.g., 5G networks) may operate independently (e.g., Stand Alone (SA)) of the first cellular network 292 (e.g., legacy networks) or may be connected and operated (e.g., Non-Stand Alone (NSA)). For example, a 5G network may have only an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information (e.g., LTE protocol information) for communication with a legacy network or protocol information (e.g., New Radio (NR) protocol information) for communication with a 5G network may be stored in the memory 130 and may be accessed by other components (e.g., the processor 120, the first communication processor 212, or the second communication processor 214).

Figure 3:
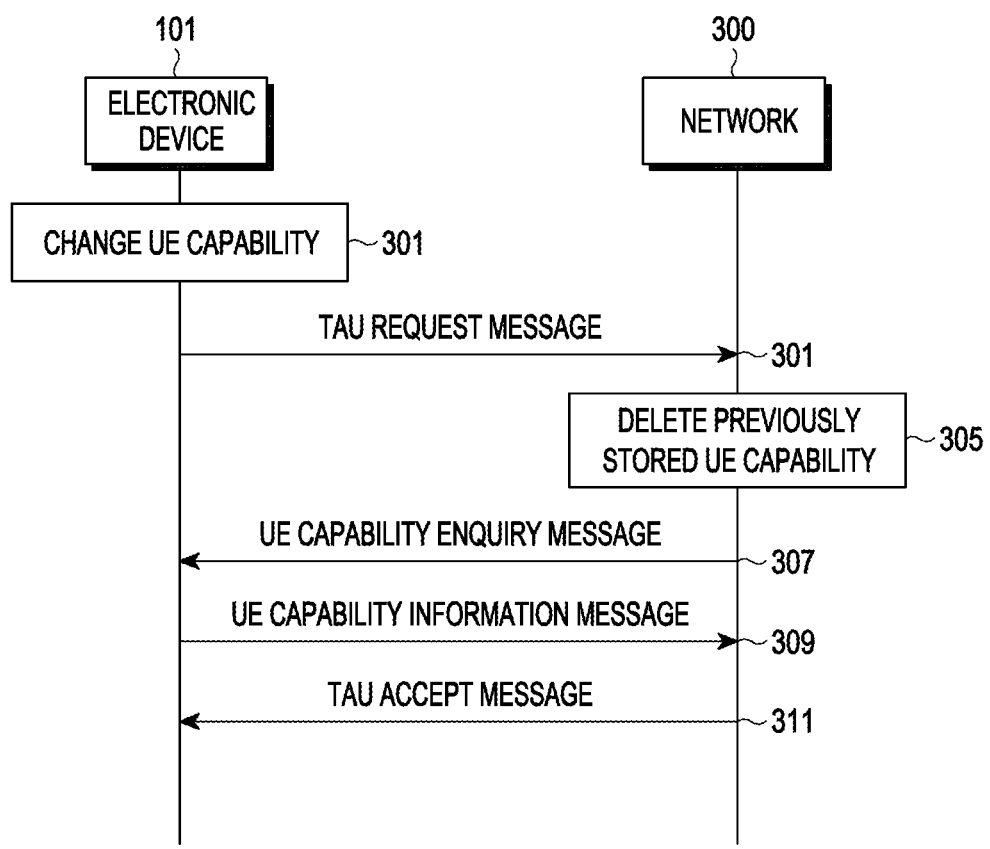
FIG. 3 is a signal flow diagram illustrating an example method of operating an electronic device and a network according to various embodiments.

FIG. 3 is a signal flow diagram illustrating an example method of operating an electronic device and a network according to various embodiments.

According to various embodiments, the electronic device 101 (e.g., at least one of the processor 120, the first communications processor 212, the second communications processor 214, or the unified communications processor 260) may change UE capability in operation 301. For example, the UE capability may be a file and/or data (or data table) that may be stored in a memory (e.g., the memory 130 of FIG. 1 or a memory included in and/or referenced by at least one communication processor) of the electronic device 101. The UE capability may include an information element for generating a UE capability information message. The change of the UE capability may refer to a change of at least some of a plurality of information elements included in the UE capability. The electronic device 101 may change UE capability based on detection of an event requesting UE capability change, and an event according to various embodiments will be described later.

According to various embodiments, the electronic device 101 may transmit a TAU request message to a network 300 in operation 303. For example, the electronic device 101 may transmit a TAU request message including an information element of "UE radio capability information update needed" to the network 300. The purpose of the information element of "UE radio capability information update needed" may be to indicate whether to delete the UE capability information stored by the network. The information element of "UE radio capability information update needed" may include, for example, a field of "URC upd" of octet 1, which may be expressed in the form of a flag. For example, if the "URC upd" field of the corresponding information element is "1", it may refer to the UE capability update being requested, and if "0", it may refer to the UE capability update not being requested. For example, the electronic device 101 may transmit the TAU request message including the information element of "UE radio capability information update needed" in which the "URC upd" field is "1" to the network 300.

The network 300 may delete the previously stored UE capability in operation 305 based on the reception of the TAU request message. For example, the UE capability stored in the network 300 may be information (e.g., file and/or data (or data table)) based on at least one information element included in a UE capability information message received from a specific UE (e.g., electronic device 101).

According to various embodiments, the network 300 may transmit a UE capability enquiry message to the electronic device 101 in operation 307. For example, the network 300 may transmit a UE capability enquiry message when (additional) UE capability information is required in an RRC connected state. For example, the network 300 may perform an enquiry of UE capability after AS security activation. Based on the reception of the UE capability enquiry message, the electronic device 101 may transmit the UE capability information message to the network 300 in operation 309. For example, the electronic device 101 may generate a UE capability information message based on at least a part of the UE capability stored in the electronic device 101. For example, the UE capability information message may include information elements of the changed UE capability. The process of transmitting and receiving the UE capability enquiry message and the UE capability information message may be referred to as a UE capability transfer process. After the UE capability transfer process is performed, the network 300 may transmit a TAU accept message in operation 311. As described above, the network 300 may identify the UE capability changed by the electronic device 101, so that the UE capabilities of the electronic device 101 and the network 300 may match.

Figure 4:
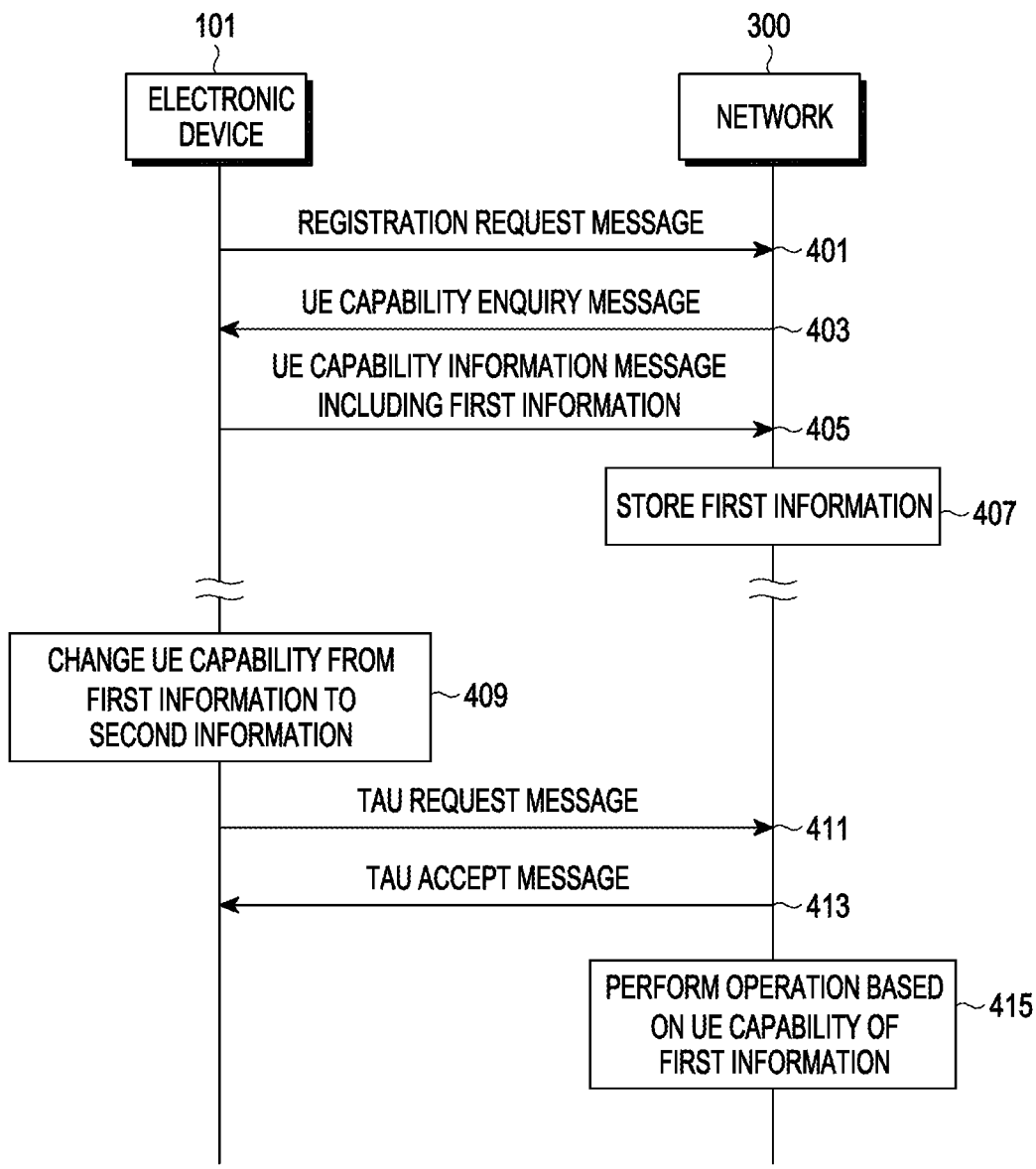
FIG. 4 is a signal flow diagram illustrating an example method of operating an electronic device and a network according to a comparative example with various embodiments.

FIG. 4 is a signal flow diagram illustrating an example method of operating an electronic device and a network according to a comparative example with various embodiments. At least some of the operations of the electronic device 101 according to the comparative example may be performed by the electronic device 101 according to various embodiments.

According to the comparative example, the electronic device 101 (e.g., at least one of the processor 120, the first communications processor 212, the second communications processor 214, or the unified communications processor 260) may transmit a registration request message to the network 300 in operation 401. For example, the electronic device 101 may transmit an Attach request message when registration with the evolved packet core (EPC) is required, or transmit a registration request message when registration is required in the 5th generation core (5GC), but there is no limitation. The network 300 may transmit a UE capability enquiry message to the electronic device 101 in operation 403. In operation 405, the electronic device 101 may transmit a UE capability information message including first information to the network 300. The first information may be, for example, at least one information element. In operation 407, the network 300 may store the first information included in the UE capability information message as the UE capability for the electronic device 101. Accordingly, the network 300 may store and/or manage the UE capability of the electronic device 101 after registering the electronic device 101 with the core network. The network 300 may perform resource allocation for the electronic device 101 and/or control of the electronic device 101 based on the UE capability of the electronic device 101.

According to the comparative example, the electronic device 101 may change the UE capability from the first information to the second information in operation 409. For example, the electronic device 101 may change the UE capability when an overheating state is detected, but there is no limit to the event configured for the change, which will be described later. In operation 411, the electronic device 101 may transmit a TAU request message including an information element of "UE radio capability information update needed" in which the "URC upd" field is "1" to the network 300. In operation 413, the network 300 may transmit a TAU accept message corresponding to the TAU request message to the electronic device 101. The network 300 may transmit the TAU accept message to the electronic device 101 without performing a process of UE capability transfer. For example, in 3GPP, in relation to the process of UE capability transfer, when the UE requests a change in UE capability, the UE may request higher layers to request NAS procedures necessary, which indicates that UE capability can be updated using a new RRC connection. However, in 3GPP, the network 300 does not necessarily force the UE capability transfer process in response to the receipt of the TAU accept message, and accordingly, depending on the implementation of the network 300, there is a possibility that the process of transferring the UE capability may not be performed immediately. For example, when the electronic device 101 is transmitting and receiving data in an RRC-connected state, the network 300 may suspend the UE capability transfer process, and during the grace period, the UE capability may be mismatched between the electronic device 101 and the network 300. During the grace period, the network 300 is likely not to transmit an RRC release message.

In this case, the network 300 cannot identify that the UE capability of the electronic device 101 is changed from the first information to the second information. Accordingly, the network 300 may determine the UE capability of the electronic device 101 as the continuously stored first information. The network 300 may perform an operation based on the UE capability of the first information in operation 415. The UE capability managed by the electronic device 101 is the second information, and the UE capability of the electronic device 101 managed by the network 300 is the first information, and thus they do not match each other, which may cause a problem in the operation of the network 300. For example, when the electronic device 101 changes the UE capability from the first information to the second information in order to suppress heat generation in an overheating state, if the network 300 operates based on the first information, there may be a high possibility that the overheating state of the electronic device 101 will not be resolved. For example, the network 300 may maintain the existing bandwidth, command transmission of SRS, command CA, or command DC, which may exacerbate the overheating condition. Alternatively, the network 300 may perform an operation (e.g., handover command, CA command, or SCG add command) for a band no longer supported by the electronic device 101 based on the first information before the change, and in this case, the electronic device 101 may not be able to perform the corresponding command Because there is a possibility that a problem due to mismatch of UE capabilities as described above may occur, rapid synchronization of UE capabilities of the electronic device 101 and the network 300 may be required.

Figure 5A:
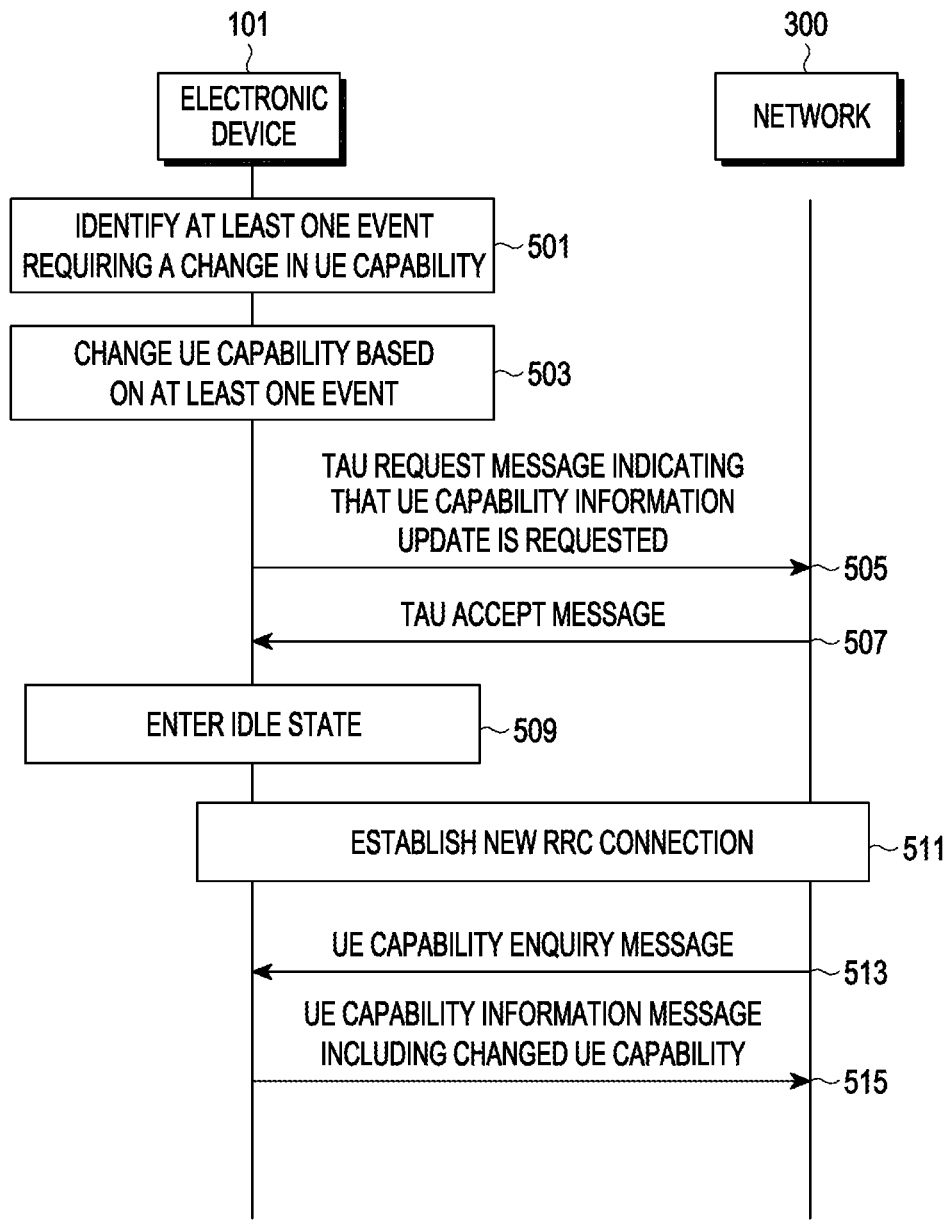
FIG. 5A is a signal flow diagram illustrating an example method of operating an electronic device and a network according to various embodiments.

FIG. 5A is a signal flow diagram illustrating an example method of operating an electronic device and a network according to various embodiments.

According to various embodiments, the electronic device 101 (e.g., at least one of the processor 120, the first communications processor 212, the second communications processor 214, or the unified communications processor 260) may identify at least one event for which a change in UE capability is required, in operation 501. In an example, the electronic device 101 may identify obtainment of information related to an overheating state as an event requiring a change in UE capability. In an example, the electronic device 101 may identify obtainment of information related to insufficient battery capacity as an event requiring a change in UE capability. Insufficient battery capacity may be identified, for example, when the capacity of the battery is less than or equal to a specified threshold capacity (e.g., 15%), but there is no limitation. In an example, the electronic device 101 may identify obtainment of a deactivation command for a specific RAT (or specific communication) according to a user manipulation as an event requiring a change in UE capability. In an example, the electronic device 101 may identify satisfaction of a condition requiring deactivation of a specific RAT (or specific communication) as an event requiring a change in UE capability. Conditions requiring deactivation of the specific RAT (or specific communication) may include, for example, at least one operation related to the occurrence of cell reselection in the boundary region of the serving cell, RACH failure for a specific cell, or a Wi-Fi call, which will be described later.

According to various embodiments, in operation 503, the electronic device 101 may change the UE capability based on at least one event. In an example, when the occurrence of the at least one event is identified, the electronic device 101 may change the information element set as default regardless of the type of the at least one event. In this case, the setting value of the information element may also be set to a fixed value. There is no limitation on the type and/or change value of the information element to be changed. In another example, when the occurrence of at least one event is identified, the electronic device 101 may change the information set as default element irrespective of the type of the at least one event, but may also determine the setting value (or the degree of change) of the information element based on the information on the at least one event. As another example, when the occurrence of at least one event is identified, the electronic device 101 may select an information element to be changed based on the type of the at least one event. In this case, the setting value of the information element may be set to a fixed value. In another example, when the occurrence of at least one event is identified, the electronic device 101 may select an information element to change based on the type of at least one event, and may determine a setting value (or degree of change) of the information element based on the at least one event. Although the UE capability change operation (e.g., operation 503) of the electronic device 101 is illustrated as being performed after the event identification operation (e.g., operation 501) and before other operations are performed, this is merely an example and there is no limitation on the execution time of the UE capability change operation.

According to various embodiments, in operation 505, the electronic device 101 may transmit a TAU request message indicating that UE capability information update is requested to the network 300. For example, the electronic device 101 may transmit the TAU request message including the information element of "UE radio capability information update needed" in which the "URC upd" field is "1" to the network 300. In operation 507, the network 300 may transmit a TAU approval message corresponding to the TAU request message to the electronic device 101. The network 300 may transmit the TAU accept message to the electronic device 101 without performing a process of UE capability transfer.

According to various embodiments, the electronic device 101 may enter an idle state in operation 509 based on receiving the TAU accept message in a state where the UE capability enquiry message is not received. Receiving the TAU accept message in a state in which the UE capability enquiry message is not received may refer to the network 300 suspending the UE capability transfer procedure, and the electronic device 101 may enter an idle state to perform a procedure of rapid UE capability transfer. In an embodiment, the electronic device 101 may enter an idle state based on not receiving the UE capability enquiry message until a specified threshold time elapses after transmitting the TAU request message, and the condition for entering the idle state is not limited as long as the condition relates to a case where the UE capability enquiry message is not received and thus the UE capability information message cannot be transmitted. Entering the idle state by the electronic device 101 may be expressed as, for example, performing a local release of an RRC connection, or may be expressed as declaring a radio link failure (RLF), but there is no limitation. In the idle state, the electronic device 101 may establish a new RRC connection with the network 300 in operation 511. For example, the electronic device 101 may perform at least one operation for establishing a new RRC connection without performing RRC re-establishment based on the local release of the RRC connection or the declaration of the RLF. For example, the electronic device 101 may transmit the RRC connection request message (e.g., E-UTRA's RRC Connection Request message, or NR's RRC Setup Request message) to the network 300 based on receiving the TAU accept message in a state where the UE capability enquiry message is not received. The electronic device 101 may receive an RRC connection setup message (e.g., E-UTRA's RRC Connection Request message, or NR's RRC Setup Request message) corresponding to the RRC connection request message from the network 300. The electronic device 101 may transmit an RRC connection setup completion (e.g., E-UTRA's RRC Connection Setup Complete message, or NR's RRC Setup Complete message) corresponding to the RRC connection setup message to the network 300. According to the above-described procedure, a new RRC connection between the electronic device 101 and the network 300 may be established without re-establishing an existing RRC connection.

According to various embodiments, the electronic device 101 may receive a UE capability enquiry message from the network 300 in operation 513. As the new RRC connection has been established, the network 300 may transmit a UE capability enquiry message. Based on the reception of the UE capability enquiry message, the electronic device 101 may transmit a UE capability information message including the changed UE capability to the network 300 in operation 515. The network 300 may store and/or manage the changed UE capabilities. As described above, the transfer of UE capability may be performed substantially immediately without a grace period, so the possibility of occurrence of a problem due to mismatch of UE capability between the electronic device 101 and the network 300 may be reduced. In addition, the time required to establish a new RRC connection may be relatively short. Accordingly, the data packet generated during the connection establishment time may be processed only by the retransmission operation of the higher layer, and thus the possibility that the service will be affected may be small.

Figure 5B:
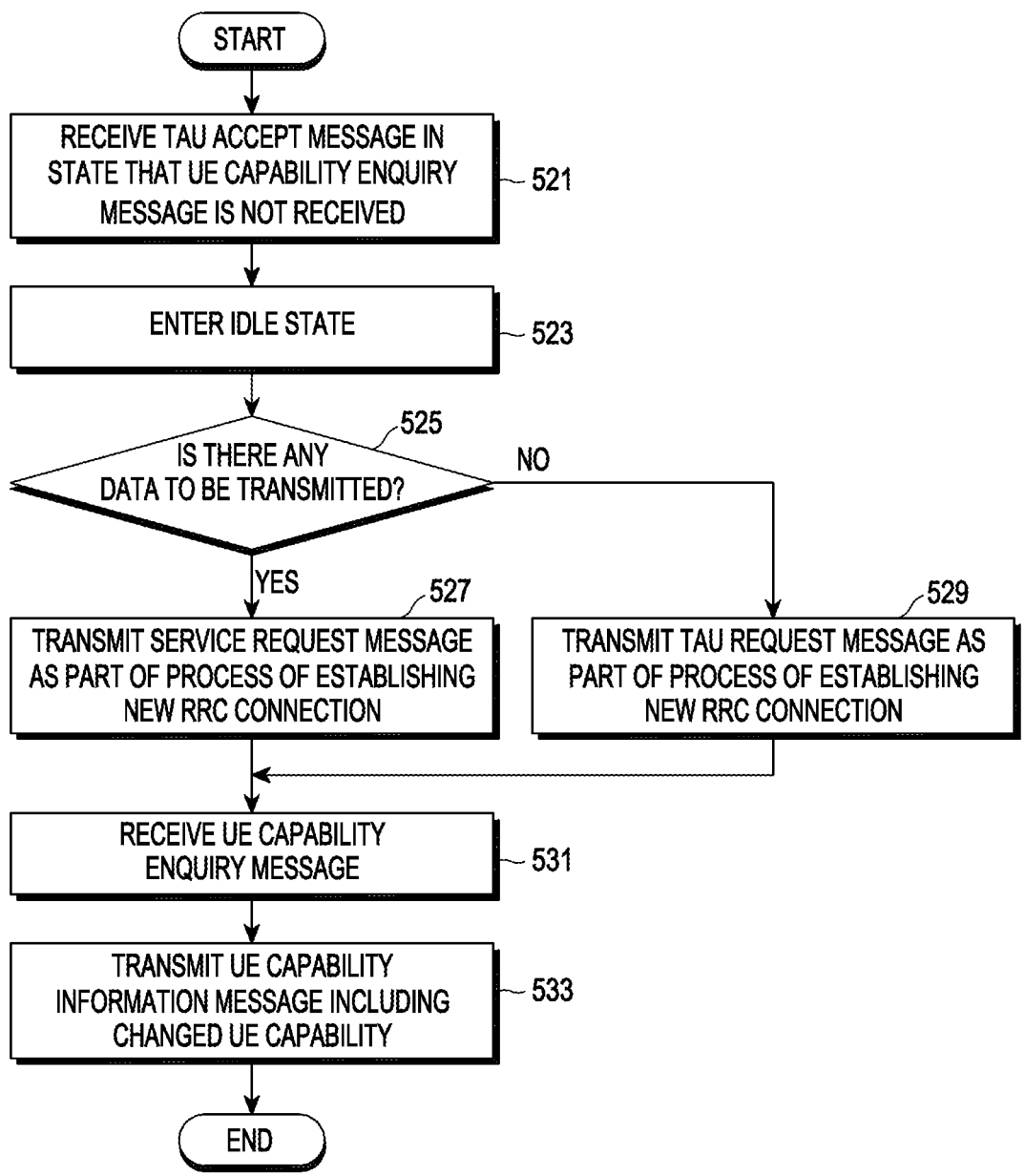
FIG. 5B is a flowchart illustrating an example method of operating an electronic device according to various embodiments.

FIG. 5B is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may, in operation 521, receive the TAU accept message in a state in which the UE capability enquiry message is not received. For example, as described with reference to FIG. 5A, the electronic device 101 may change UE capability and transmit a TAU request message indicating that UE capability information update is requested. After TAU transmission, the electronic device 101 may receive the TAU accept message in a state in which reception of the UE capability enquiry message fails in operation 521. As described with reference to FIG. 5A, the electronic device 101 may enter the idle state in operation 523 based on receiving the TAU accept message without receiving the UE capability enquiry message. As described above, it will be understood by those skilled in the art that the trigger for entering the idle state in this embodiment and other embodiments may be replaced by the satisfaction of another condition (e.g., failure to receive a UE capability enquiry message within a preset period).

According to various embodiments, in operation 525, the electronic device 101 may determine whether data to be transmitted to the network 300 exists. If there is data to be transmitted (525—Yes), the electronic device 101 may transmit a service request message to the network 300 as at least part of a new RRC connection establishment process in operation 527. For example, the electronic device 101 may transmit an RRC connection request message to the network 300 and receive an RRC connection setup message from the network 300. The electronic device 101 may transmit an RRC connection setup complete message including a service request message to the network 300. The network 300 may allocate a radio resource and/or a network resource to the electronic device 101 based on reception of the service request message, and thereafter may transmit and receive data (or traffic). As the RRC connection setup complete message including the service request message is transmitted, data transmission may be performed.

According to various embodiments, if there is no data to be transmitted (525—No), in operation 529, the electronic device 101 may transmit a TAU request message to the network 300 as at least part of a new RRC connection establishment process. For example, the electronic device 101 may transmit an RRC connection request message to the network 300 and receive an RRC connection setup message from the network 300. The electronic device 101 may transmit an RRC connection setup complete message including the TAU request message to the network 300. The electronic device 101 may receive a UE capability enquiry message from the network 300 in operation 531. In operation 533, the electronic device 101 may transmit a UE capability information message including the changed UE capability to the network 300. Accordingly, the changed UE capability may be shared with the network 300.

Figure 5C:
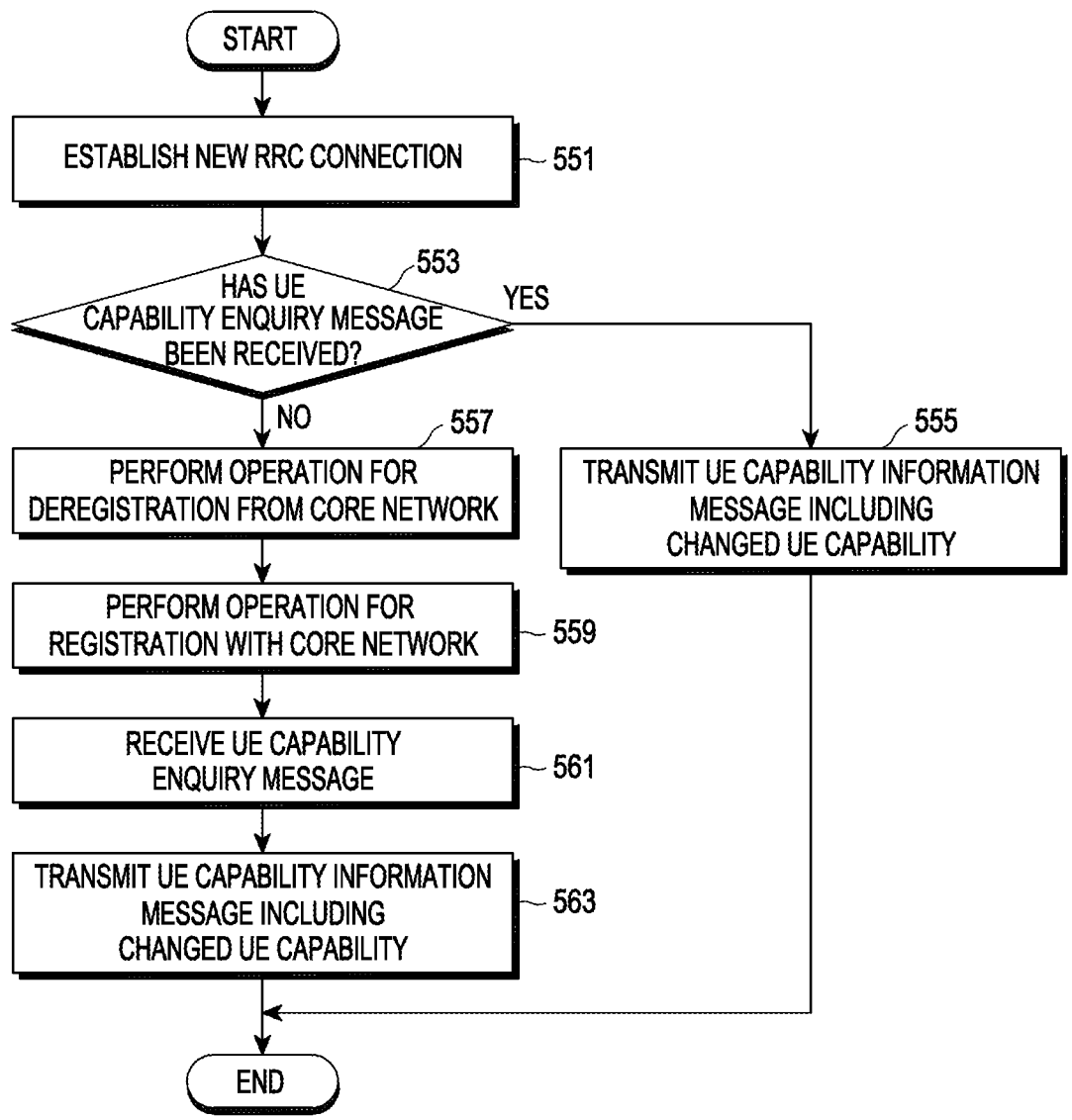
FIG. 5C is a flowchart illustrating an example method of operating an electronic device according to various embodiments.

FIG. 5C is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may establish a new RRC connection in operation 551. As described with reference to FIG. 5A, the electronic device 101 may enter the idle state based on receiving the TAU accept message in a state in which the UE capability enquiry message is not received. The electronic device 101 may perform at least one operation for establishing a new RRC connection in the idle state. Accordingly, a new RRC connection may be established between the electronic device 101 and the network 300. Although it has been described that UE capability transfer is performed after establishment of a new RRC connection in FIG. 5A, UE capability transfer may not be performed even after a new RRC connection according to implementation of the network 300.

According to various embodiments, in operation 553, the electronic device 101 may determine whether a UE capability enquiry message is received from the network 300. When the UE capability enquiry message is received (553—Yes), in operation 555, the electronic device 101 may transmit a UE capability information message including the changed UE capability to the network 300. This may be a UE capability transfer process based on the new RRC connection described in FIG. 5A. Not receiving the UE capability enquiry message may refer to the UE capability not having been transmitted. When the UE capability enquiry message is not received (553—No), the electronic device 101 may perform an operation for deregistration from the core network in operation 557. For example, the electronic device 101 may perform an operation for deregistration from the core network based on not receiving a UE capability enquiry message for a specified period. The electronic device 101 may perform an operation for deregistration from the core network based on another event (e.g., reception of other types of messages from the network 300) being identified in a state in which the UE capability enquiry message is not received, and there is no limit to the criteria for judging the non-receipt of the UE capability enquiry message. As an operation for deregistration from the core network, the electronic device 101 may transmit a message for deregistration (e.g., Detach Request message for EPC, or Deregistration request message for 5GC) to the network 300. The network 300 may deregister the electronic device 101 based on reception of the message for deregistration. For example, the network 300 may delete information (e.g., UE context) associated with the electronic device 101. The network 300 may transmit a message for accepting deregistration (e.g., a Detach Accept message for EPC or a Deregistration accept message for 5GC) to the electronic device 101.

According to various embodiments, after deregistration, the electronic device 101 may perform an operation for registration with the core network in operation 559. For example, the electronic device 101 may transmit a registration request message (e.g., Attach request message for EPC, or Registration request message for 5GC) and may receive a registration accept message (e.g., Attach accept message for EPC, or Registration accept message for 5GC) from the network 300 in response thereto. Because the network 300 has deleted all the UE contexts for the electronic device 101, UE capability may be required. The electronic device 101 may receive a UE capability enquiry message from the network 300 in operation 561. In operation 563, in response to the UE capability enquiry message, the electronic device 101 may transmit a UE capability information message including the changed UE capability to the network 300. Accordingly, even when the UE capability is not updated even after establishment of the new RRC connection, the UE capability may be synchronized between the electronic device 101 and the network 300.

Figure 5D:
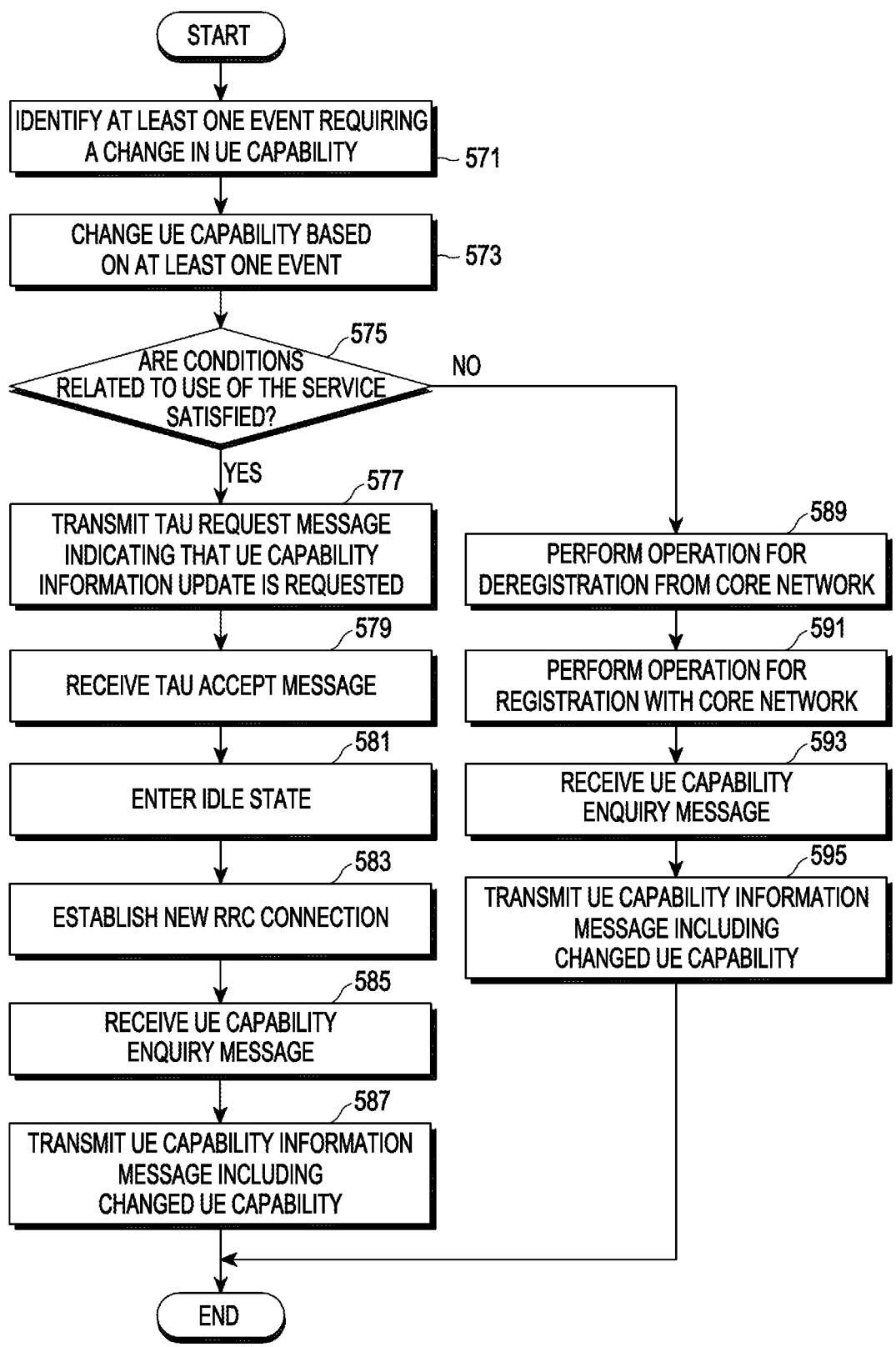
FIG. 5D is a flowchart illustrating an example method of operating an electronic device according to various embodiments.

FIG. 5D is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify at least one event for which a change in UE capability is required, in operation 571. In operation 573, the electronic device 101 may change the UE capability based on at least one event. Because the identification of the event and the change of the UE capability have been described with reference to FIG. 5A, a detailed description thereof may not be repeated.

According to various embodiments, in operation 575, the electronic device 101 may determine whether a condition related to service use is satisfied. For example, the electronic device 101 may determine whether a condition related to service use is satisfied, based on whether a TCP/UDP connection is established. The conditions related to service use are not limited as long as the conditions are for determining whether the electronic device 101 uses and/or plans to use the current service (e.g., transmitting and receiving user data). For example, based on the number of connections established based on TCP/UDP, when the number satisfies a specified condition (e.g., 1 or more), the electronic device 101 may determine that the service is in use. For example, when the number of established PDU sessions satisfies a specified condition (e.g., 1 or more), the electronic device 101 may determine that the service is in use. When the condition associated with service use is satisfied (575—Yes), in operation 577, the electronic device 101 may transmit a TAU request message indicating that UE capability information update is requested. In operation 579, the electronic device 101 may receive the TAU accept message in a state in which the UE capability enquiry message is not received. As described above with reference to FIG. 5A, the electronic device 101 may enter the idle state in operation 581 based on receiving the TAU accept message in a state where the UE capability enquiry message is not received. In the idle state, the electronic device 101 may perform at least one operation for establishing a new RRC connection in operation 583. When a new RRC connection is established, the electronic device 101 may receive a UE capability enquiry message in operation 585. In operation 587, the electronic device 101 may transmit a UE capability information message including the changed UE capability to the network 300. As described above, the procedure for establishing a new RRC connection may take a shorter processing time than the procedure for deregistration and registration with the core network. When a service is currently in use or is scheduled to be used, the electronic device 101 may perform a UE capability transfer procedure by establishing a new RRC connection.

According to various embodiments, when a condition related to service use is not satisfied (575—No), the electronic device 101 may perform an operation for deregistering from the core network in operation 589. The electronic device 101 may perform an operation for registration with the core network in operation 591. As the operations for deregistration and registration with the core network have been described with reference to FIG. 5C, a detailed description thereof may not be repeated. The electronic device 101 may receive a UE capability enquiry message from the network 300 in operation 593. As described above, because the release of the core network has been performed, the network 300 may have to enquire about the UE capability to the electronic device 101. In operation 595, the electronic device 101 may transmit a UE capability information message including the changed UE capability to the network 300 based on reception of the UE capability enquiry message. When the service is not in use or is not scheduled to be used, the deregistration and registration procedure with the core network that is more likely to perform the UE capability transfer procedure may be performed even if the required time is relatively longer.

Figure 6:
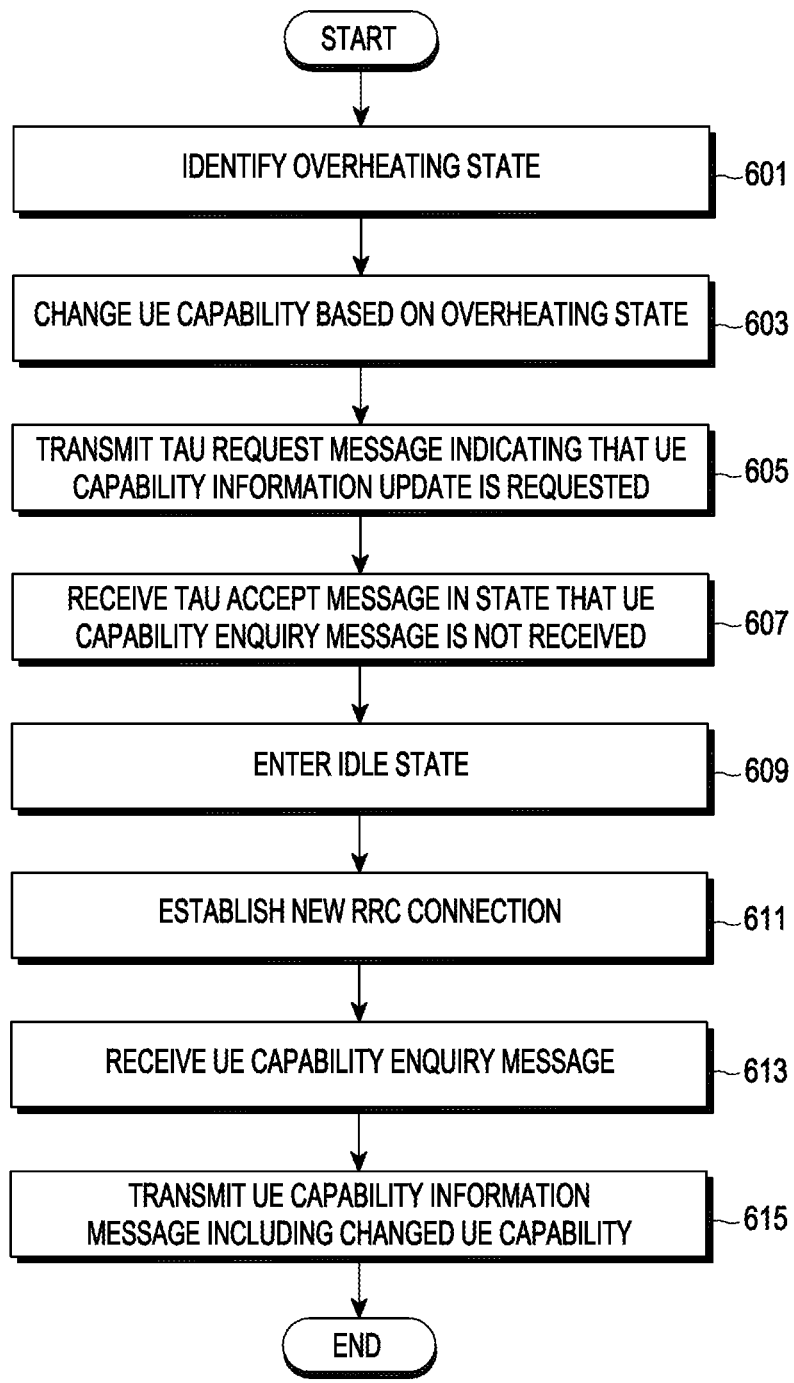
FIG. 6 is a flowchart illustrating an example method of operating an electronic device according to various embodiments.

FIG. 6 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify the overheating state in operation 601. For example, the electronic device 101 may include a sensor module 176 for measuring a temperature inside (or on a surface) of the electronic device 101. The electronic device 101 may identify an indication indicating an overheating indicating that the measured temperature is equal to or greater than the threshold temperature as an overheating state, which will be described with reference to FIG. 7A. The electronic device 101 may operate based on the measured temperature, which will be described with reference to FIG. 7B. For example, when the electronic device 101 executes an application that requires transmission and reception of large data (e.g., a game application or a streaming application), an overheating state may occur.

According to various embodiments, in operation 603, the electronic device 101 may change the UE capability based on the overheating state. In an example, the electronic device 101 may change an information element associated with carrier aggregation (CA) of UE capability and/or an information element associated with dual connectivity (DC). For example, the electronic device 101 may change the number of CCs of the CA (e.g., from 5 CC to 2 CC) or deactivate the CA based on changing the item of supportedBandCombinationList of rf-parameters included in a specific RAT (e.g., NR) of UE-CapabilityRAT-Container of UE capability. For example, the electronic device 101 may deactivate the DC based on changing the supportedBandCombinationList item of the rf-Parameter of the UE-MRDC-Capability included in the specific RAT (e.g., NR-EUTRA) of the UE-CapabilityRAT-Container of the UE capability. It will be understood by those skilled in the art that this information element and modifications of the information element in other embodiments are merely examples. Accordingly, information element of the UE capability information message that enters the idle state based on failure of delivery of the UE capability and is transmitted in response to the UE capability enquiry message received based on the new RRC connection established in the idle state may be different from the information element previously reported to the network 300. The amount of heat generated in the electronic device 101 when CA and/or DC is performed may be greater than the amount of heat generated in the electronic device 101 when CA and/or DC is not performed. The electronic device 101 may deactivate CA and/or DC in the overheating state, and thus the possibility of resolving the overheating state may increase. When CA is performed, the amount of heat generated by the electronic device 101 may be relatively large as CA is performed based on a relatively larger number of CCs. The electronic device 101 may relatively reduce the number of CCs used for CA in the overheating state, and thus the possibility of resolving the overheating state may increase.

In an example, the electronic device 101 may change an information element associated with a layer. For example, the electronic device 101 may change (e.g., reduction from 4 layers to 2 layers) at least one of maxNumberMIMO-LayersPDSCH of FeatureSetDownlinkPerCC, maxNumberMIMO-LayersCB-PUSCH of FeatureSetUplinkPerCC, or maxNumberMIMO-LayersNonCB-PUSCH of FeatureSetUplinkPerCC of the UE capability. As communication is performed based on a relatively larger number of layers, the amount of heat generated by the electronic device 101 may be relatively large. The electronic device 101 may relatively reduce the number of layers in the overheating state, and thus the possibility of resolving the overheating state may increase.

For example, the electronic device 101 may change an information element associated with a bandwidth. For example, the electronic device 101 may change at least one of SupportedBandwidthDL and/or ChannelBW-90 mhz of FeatureSetDownlinkPerCC, or SupportedBandwidthUL and/or ChannelBW-90 mhz of FeatureSetUplinkPerCC of UE capability. As communication is performed based on a relatively larger bandwidth, the amount of heat generated by the electronic device 101 may be relatively large. The electronic device 101 may relatively lower the bandwidth in the overheating state, and thus the possibility of resolving the overheating state may increase. For example, the electronic device 101 may reduce information (e.g., bandwidth value) of SupportedBandwidthDL and/or SupportedBandwidthUL, and/or may deactivate ChannelBW-90 mhz. In an example, the electronic device 101 may reduce the bandwidth to the initial carrier bandwidth, but this is exemplary and there is no limit to the value of the bandwidth after the reduction. For example, the electronic device 101 may reduce the bandwidth to the initial carrier bandwidth (or other value) when the initial carrier bandwidth is equal to or greater than the threshold bandwidth (e.g., 10 MHz or 20 MHz), and may change the bandwidth to a specified value (e.g., 10 MHz) when the initial carrier bandwidth is less than the threshold bandwidth.

For example, the electronic device 101 may change an information element associated with a modulation and coding scheme (MCS). As communication is performed based on a relatively larger number of MCSs, the amount of heat generated by the electronic device 101 may be relatively large. For example, the electronic device 101 may decrease (e.g., decrease from qam 256 to qam 64) at least one of supportedModulationOrderDL of FeatureSetDownlinkPerCC or supportedModulationOrderUL of FeatureSetUplinkPerCC of the UE capability. The electronic device 101 may relatively decrease the number of MCSs in the overheating state, and thus the possibility of resolving the overheating state may increase.

For example, the electronic device 101 may change an information element associated with a sounding reference signal (SRS). For example, the electronic device 101 may change the srs-TxSwitch parameter of the BandCombinationList of the UE capability to not supported. The amount of heat generated by the electronic device 101 when SRS transmission is performed may be greater than the amount of heat generated by the electronic device 101 when SRS transmission is not performed. The electronic device 101 may deactivate the transmission of the SRS in the overheating state, and thus the possibility of resolving the overheating state may increase.

For example, the electronic device 101 may change an information element associated with a supported radio access technology (RAT) and/or a communication system. For example, the NR may be deleted in the UE-capabilityRAT-container of the UE capability. The amount of heat generated by the electronic device 101 when a specific RAT is activated may be greater than the amount of heat generated by the electronic device 101 when another RAT is activated. The electronic device 101 may deactivate the specific RAT in the overheating state, and thus the possibility of resolving the overheating state may increase.

According to various embodiments, in operation 605, the electronic device 101 may transmit a TAU request message indicating that UE capability information update is requested. In operation 607, the electronic device 101 may receive a TAU accept message in a state in which the UE capability enquiry message is not received. In a state in which the UE capability enquiry message is not received, the electronic device 101 may enter an idle state in operation 609 based on receiving the TAU accept message. In the idle state, the electronic device 101 may establish a new RRC connection in operation 611. The electronic device 101 may receive a UE capability enquiry message based on the new RRC connection in operation 613. In operation 615, the electronic device 101 may transmit a UE capability information message including the changed UE capability based on the UE capability enquiry message.

Figure 7A:
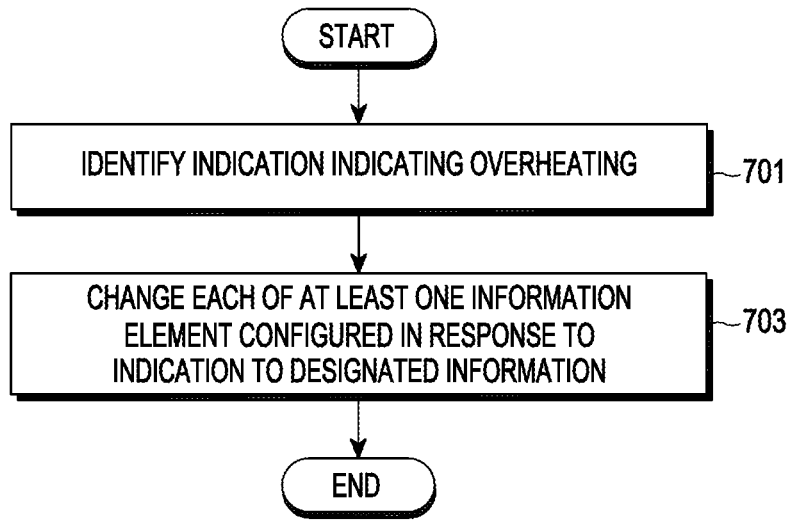
FIG. 7A is a flowchart illustrating an example method of operating an electronic device according to various embodiments.

FIG. 7A is a flowchart illustrating an example method of operating an electronic device according to various embodiments.

According to various embodiments, the electronic device 101 (e.g., at least one of the first communications processor 212, the second communications processor 214, or the unified communications processor 260) may identify an indication indicating overheating in operation 701. For example, the processor 120 may obtain temperature information from the sensor module 176. For example, the processor 120 may determine whether the obtained temperature information is equal to or greater than a specified threshold temperature (e.g., 43° C.). When the obtained temperature information is equal to or greater than a specified threshold temperature, the processor 120 may provide an indication indicating the overheating to the communication processor (e.g., at least one of first communication processor 212, second communication processor 214, or unified communication processor 260). In another implementation example, the communication processor (e.g., at least one of first communication processor 212, second communication processor 214, or unified communication processor 260) may obtain temperature information directly from the sensor module 176. In this case, the communication processor (e.g., at least one of first communication processor 212, second communication processor 214, or unified communication processor 260) may determine whether the obtained temperature information is equal to or greater than a specified threshold temperature.

Based on the obtaining the indication (or based on identifying that the obtained temperature information is above the specified threshold temperature), in operation 703, the electronic device 101 may change each of the at least one information element configured in response to the indication into specified information. At least one of an information element associated with deactivation of CA and/or DC, an information element associated with a reduction in the number of CCs in CA, an information element associated with a reduction in bandwidth, an information element associated with a reduction in the number of layers, an information element associated with a reduction in the number of MCSs, an information element associated with deactivation of SRS transmit antenna switching or an information element associated with deactivation of a specific RAT may be pre-configured as an information element to be changed in response to an indication indicating overheating. In an example, when the overheating indication is identified, the electronic device 101 may change UE capabilities by deactivating CA and/or DC, reducing bandwidth (e.g., change to 20 MHz), changing the number of layers to 2, changing the number of MCSs to a number corresponding to 64QAM, and deactivating transmission of SRS, but there is no limitation on the information element to be changed and the information corresponding to the information element.

Figure 7B:
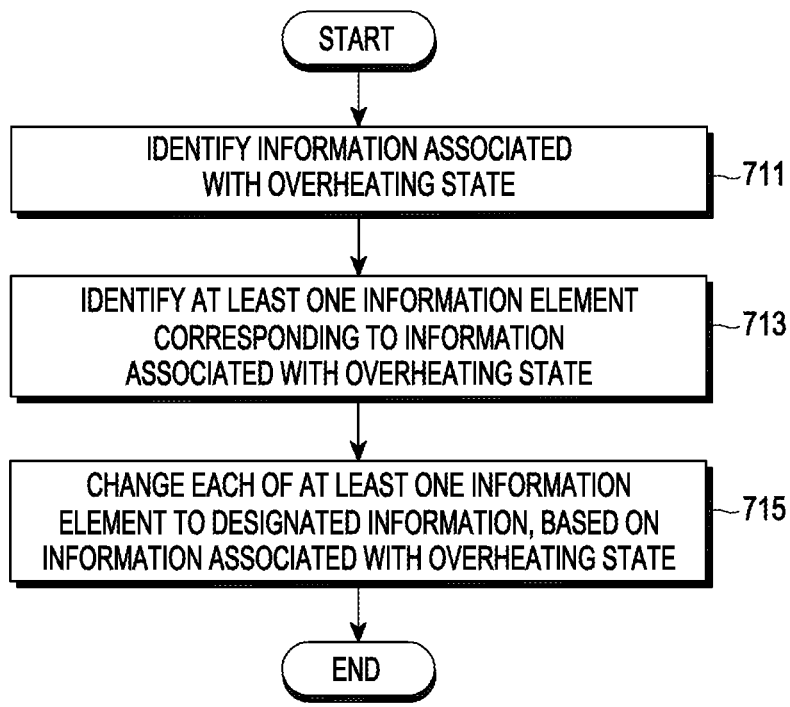
FIG. 7B is a flowchart illustrating an example method of operating an electronic device according to various embodiments.

FIG. 7B is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify information associated with the overheating state in operation 711. For example, the electronic device 101 may manage a plurality of temperature ranges. The electronic device 101 may identify a temperature range including the measured temperature as information related to an overheating state.

According to various embodiments, in operation 713, the electronic device 101 may identify at least one information element corresponding to information associated with an overheating state. In operation 715, the electronic device 101 may change each of the at least one information element into specified information (or change to a specified degree) based on the information associated with the overheating state. For example, the electronic device 101 may identify at least one information element of a change target based on a temperature range including the measured temperature. For example, the electronic device 101 may identify information on the information element to be changed based on a temperature range including the measured temperature. In an example, the electronic device 101 may change a relatively small number of information elements when an overheating state in a relatively low temperature range is identified and may change a relatively large number of information elements when an overheating state in a relatively high temperature range is identified. For example, the electronic device 101 may disable CA and DC when a temperature range of 40° C. to 50° C. is identified, may disable SRS transmit antenna switching while disabling CA and DC when a temperature range of 50° C. to 60° C. is identified, and may disable CA and DC, reduce bandwidth and disable SRS transmit antenna switching when a temperature range of 60° C. to 70° C. is identified, but, the above-described change target information element is merely an example. In an example, when an overheating state in a relatively low temperature range is identified, the electronic device 101 may change information on a specific information element to a value set for a relatively high quality, and when an overheating state in a relatively high temperature range is identified, the electronic device 101 may change information on a specific information element to a value set for a relatively low quality. For example, the electronic device 101 may set the number of layers to 4 when a temperature range of 40° C. to 50° C. is identified, and may set the number of layers to 2 when a temperature range of 50° C. to 60° C. is identified, but the above-described numerical values are merely examples.

In the above-described embodiment, it has been described that information of a specific information element corresponds to a specific temperature range, but this is merely an example. The electronic device 101 according to various embodiments may be implemented to reduce information of a specific information element of a current UE capability when an overheating state is identified. For example, when an overheating state is identified, the electronic device 101 may reduce the current UE capability bandwidth to 10 MHz if the current UE capability bandwidth is 20 MHz, and may reduce the current UE capability bandwidth to 20 MHz if the current UE capability bandwidth is 40 MHz. For example, even when the same temperature is measured, information after the change may be different according to the current UE capability.

Figure 7C:
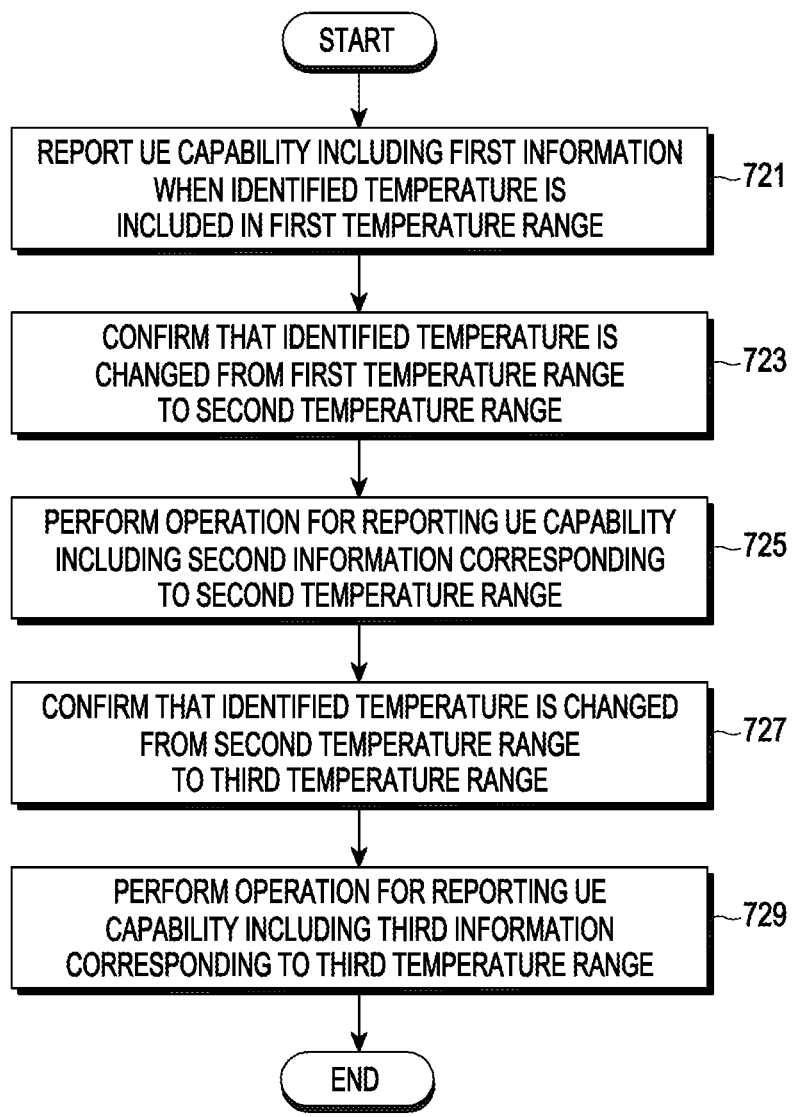
FIG. 7C is a flowchart illustrating an example method of operating an electronic device according to various embodiments.

FIG. 7C is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may, in operation 721, report the UE capability including the first information to the network 300 when the temperature identified by the sensor module 176 of the electronic device 101 is included in the first temperature range. In operation 723, the electronic device 101 may confirm that the temperature identified by the sensor module 176 is changed from the first temperature range to the second temperature range. For example, the first temperature range may be a larger temperature range than the second temperature range, but may be a smaller temperature range. In operation 725, the electronic device 101 may perform an operation (e.g., at least some of the operations by FIGS. 5A to 5D) for reporting the UE capability including the second information corresponding to the second temperature range. In an example, the electronic device 101 may configure the second information based on the information element and/or the information of the information element configured in response to the second information. The operation for reporting the UE capability including the second information may be performed by at least a part of FIGS. 5A to 5D. In another example, the electronic device 101 may identify the second information as the degree of change of the information corresponding to the second temperature range is applied to the first information.

According to various embodiments, in operation 727, it may be confirmed that the temperature identified by the sensor module 176 is changed from the second temperature range to the third temperature range. For example, the second temperature range may be a larger temperature range than the third temperature range, but may be a smaller temperature range. In operation 729, the electronic device 101 may perform an operation for reporting the UE capability including the third information corresponding to the third temperature range. In an example, the electronic device 101 may configure the third information based on the information element and/or the information of the information element configured in response to the third information. The operation for reporting the UE capability including the third information may be performed by at least a part of FIGS. 5A to 5D. In another example, the electronic device 101 may identify the third information as the degree of change of the information corresponding to the third temperature range is applied to the second information. As described above, after changing the UE capability once and reporting to the network 300, the electronic device 101 may perform additional UE capability change and report to the network 300.

Figure 8:
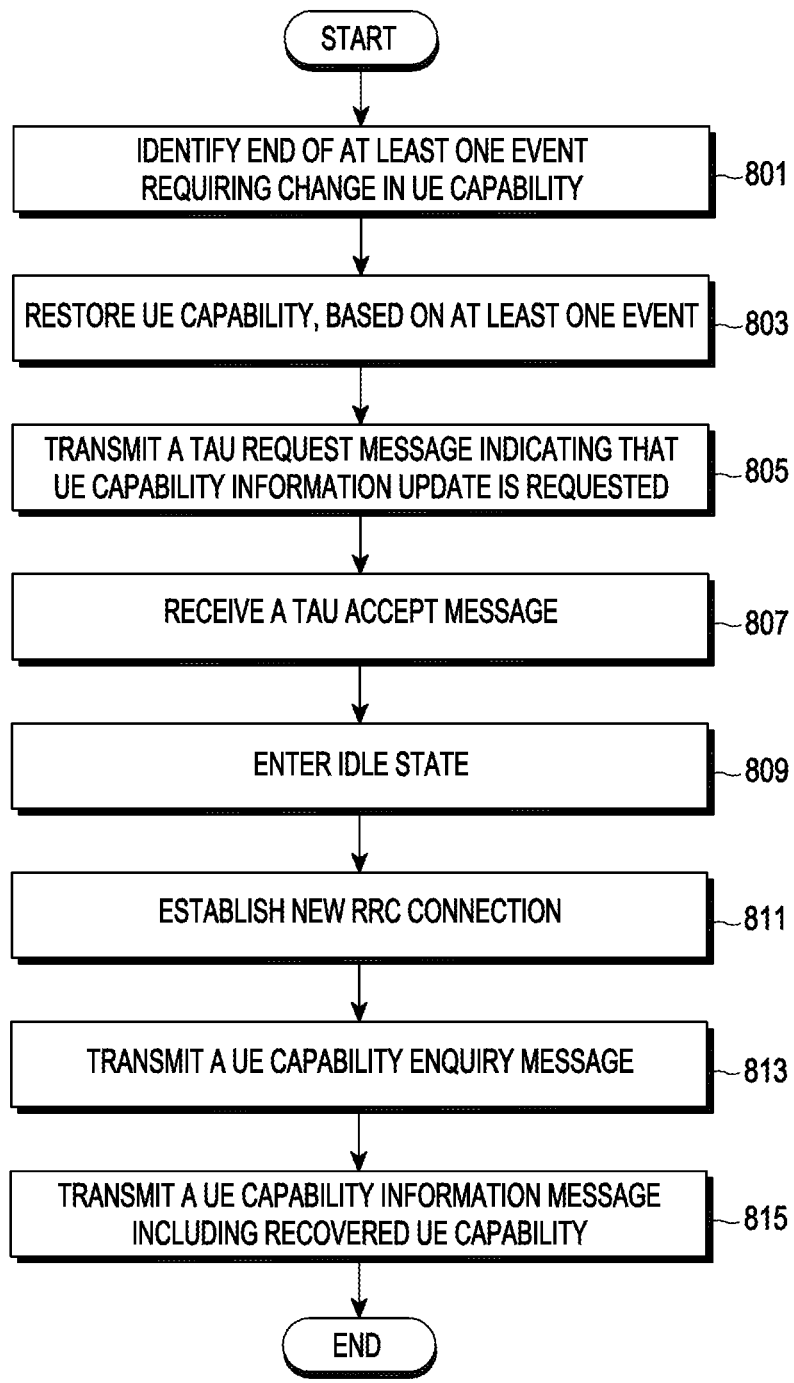
FIG. 8 is a flowchart illustrating an example method of operating an electronic device according to various embodiments.

FIG. 8 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify the end of at least one event for which a change in UE capability is required, in operation 801. For example, based on the occurrence of an event, it is assumed that the electronic device 101 performs a procedure for changing the UE capability and reporting the changed UE capability to the network 300, for example, a procedure by at least one of FIGS. 5A to 5D. After reporting the changed UE capability, the electronic device 101 may identify the end of the event in operation 801. For example, when the UE capability is changed due to the overheating state, the electronic device 101 may identify the release of the overheating state as an event end.

According to various embodiments, in operation 803, the electronic device 101 may restore UE capability based on the end of at least one event. The electronic device 101 may restore the changed information of the information element changed based on the occurrence of the event to the information before the change. In operation 805, the electronic device 101 may transmit a TAU request message indicating that UE capability information update is requested to the network 300. In operation 807, the electronic device 101 may receive a TAU accept message from the network 300. Based on receiving the TAU accept message in a state in which the UE capability enquiry message is not received, the electronic device 101 may enter an idle state in operation 809. In operation 811, the electronic device 101 may perform at least one operation for establishing a new RRC connection in an idle state. In operation 813, the electronic device 101 may receive a UE capability enquiry message based on the new RRC connection. In operation 815, the electronic device 101 may transmit a UE capability information message including the restored UE capability to the network 300. Accordingly, even when the UE capability is restored according to the end of the event, the UE capabilities of the electronic device 101 and the network 300 may be synchronized.

Figure 9A:
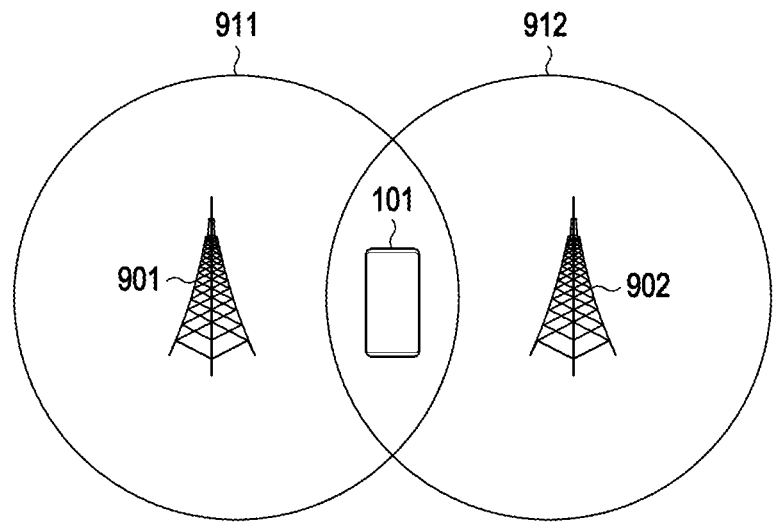
FIG. 9A is a diagram illustrating coverage of an electronic device and a cell according to various embodiments.

FIG. 9A is a diagram illustrating coverage of an electronic device and a cell according to various embodiments.

According to various embodiments, a first cell 901 supporting the first RAT (e.g., NR) and/or a first communication system (e.g., 5GS) and a second cell 902 supporting a second RAT (e.g., E-UTRA) and/or a second communication system (e.g., EPS) may be supported. The first cell 901 may support the first coverage 911, and the second cell 902 may support the second coverage 912. Although included in the first coverage 911, the electronic device 101 may be located near an edge of the first coverage 911. In this case, there is a possibility that the electronic device 101 performs a plurality of cell reselections. At the boundary of the first coverage 911, cell reselection may be performed based on the relatively low strength of the signal from the cell. Thereafter, after the electronic device 101 reselects the second cell 902, there is a possibility of reselecting the first cell 901 again, and accordingly, frequent cell reselection may be performed. It may be difficult to provide a stable communication service due to the frequent execution of cell reselection.

Figure 9B:
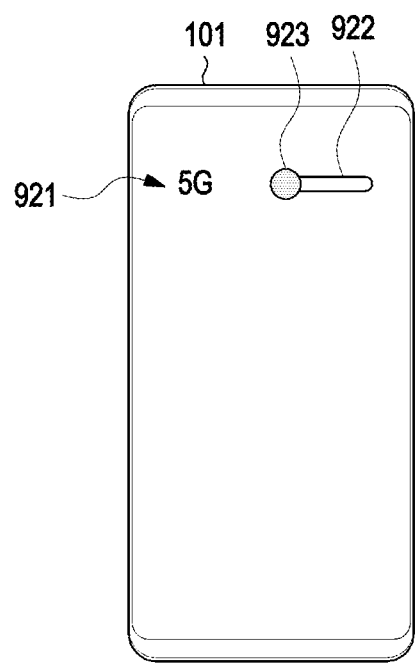
FIG. 9B is a diagram illustrating a screen displayed by an electronic device according to various embodiments.

FIG. 9B is a diagram illustrating an example screen displayed by an electronic device according to various embodiments.

As illustrated in FIG. 9A, when the electronic device 101 is at the boundary of the cell coverage of a specific cell, frequent cell reselection may be performed, so that it may be difficult to provide a stable communication service. The electronic device 101 may inactivate a specific RAT and/or a communication service (e.g., NR and/or 5GS) in order to provide a stable communication service. For example, the electronic device 101 may display a UI including text 921 indicating 5G, which is a specific communication service, as illustrated in FIG. 9B, and a slide bar 922 and an indicator 923. For example, the electronic device 101 may display the UI (or a popup window containing an object for calling the UI) based on the occurrence of cell reselection (or handover, or redirect) more than a specified threshold number of times during a specified period. The electronic device 101 may display a UI based on a user's UI call command, and there is no limit to an event for displaying the UI. The electronic device 101 may identify a command (e.g., touch, drag, or flick) that causes the indicator 923 to move from the user. The electronic device 101 may change the position of the indicator 923 based on the identified command. For example, while the indicator 923 is disposed in the first position (e.g., left position), the electronic device 101 may deactivate a specific RAT and/or communication service (e.g., NR and/or 5GS). For example, while the indicator 923 is disposed in the second position (e.g., right position), the electronic device 101 may activate a specific RAT and/or communication service (e.g., NR and/or 5GS).

Figure 9C:
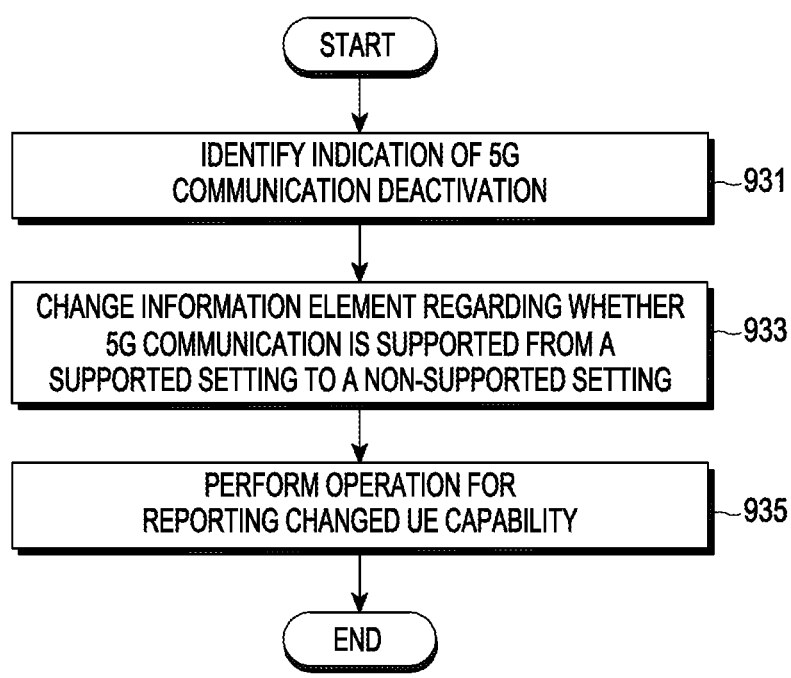
FIG. 9C is a flowchart illustrating an example method of operating an electronic device according to various embodiments.

FIG. 9C is a flowchart illustrating an example method of operating an electronic device according to various embodiments.

According to various embodiments, the electronic device 101 (e.g., at least one of the first communications processor 212, the second communications processor 214, or the unified communications processor 260) may identify an indication of 5G communication deactivation in operation 931. As described above with reference to FIG. 9B, the electronic device 101 (e.g., processor 120) may identify a command for deactivating 5G communication, and may provide the command to the communication processor (e.g., at least one of first communication processor 212, second communication processor 214, or unified communication processor 260). In operation 933, the communication processor (e.g., at least one of first communication processor 212, second communication processor 214, or unified communication processor 260) may change an information element regarding whether 5G communication (or NR) is supported from a supported setting to a non-supported setting. For example, the NR may be deleted in the UE-capabilityRAT-container of the UE capability. The electronic device 101 according to various embodiments may perform an operation (e.g., at least some of the operations described in FIGS. 5A to 5D) for reporting the changed UE capability in operation 935.

Figure 9D:
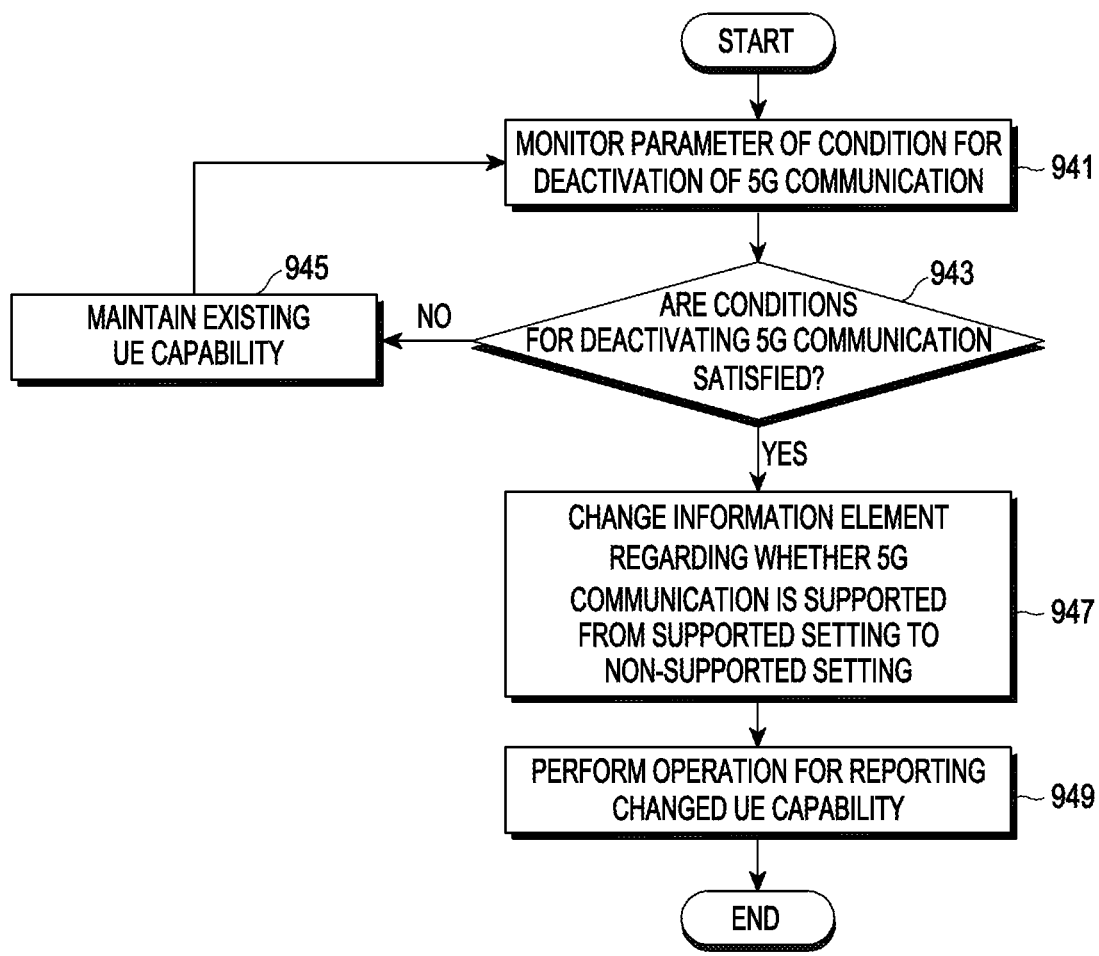
FIG. 9D is a flowchart illustrating an example method of operating an electronic device according to various embodiments.

FIG. 9D is a flowchart illustrating an example method of operating an electronic device according to various embodiments.

According to various embodiments, the electronic device 101 (e.g., at least one of the first communications processor 212, the second communications processor 214, or the unified communications processor 260) may monitor a parameter of a condition for deactivation of 5G communication, in operation 941. In operation 943, the electronic device 101 may determine whether a condition for deactivating 5G communication is satisfied using the monitored parameter. In an example, the electronic device 101 may determine that the condition for deactivation of 5G communication is satisfied based on the number of times of performing cell reselection within the threshold period being equal to or greater than the threshold number of times. In another example, the electronic device 101 may determine that the condition for inactivating 5G communication is satisfied based on the fact that the number of failures of RRC connection to a cell supporting 5G communication within a threshold period is equal to or greater than the threshold number. In another example, the electronic device 101 may determine that a condition for deactivating 5G communication is satisfied based on the fact that the reception strength of a signal from a specific cell satisfies a specified condition (e.g., below critical intensity). In addition to the above-described examples, if it is a condition for a case in which stable performance of 5G communication is impossible, it will be understood by those skilled in the art that it may be implemented as a condition for deactivating 5G communication.

According to various embodiments, when the condition for 5G communication deactivation is not satisfied (943-NO), the electronic device 101 may maintain the existing UE capability in operation 945. The electronic device 101 may continue monitoring the parameter as in operation 941 while maintaining the existing UE capability. When the condition for 5G communication deactivation is satisfied (943—Yes), in operation 947, the electronic device 101 may change the information element regarding whether 5G communication (or RAT) is supported from the supported setting to the non-supported setting. The electronic device 101 may perform an operation (e.g., at least some of the operations described in FIGS. 5A to 5D) for reporting the changed UE capability in operation 949.

As described above, the electronic device 101 may automatically deactivate 5G communication (or RAT) rather than based on a user command. For example, the electronic device 101 may support an automatic selection mode related to selection of a communication mode. In the automatic selection mode, the electronic device 101 may determine whether to activate or deactivate a specific communication based on a monitored parameter.

Although not illustrated, the electronic device 101 may identify that 5G communication is activated again. For example, the electronic device 101 may identify an activation command (e.g., touch, drag, or flick) of 5G communication through the UI illustrated in FIG. 9B. The electronic device 101 may determine whether to automatically activate 5G communication based on a monitored parameter. For example, the electronic device 101 may re-activate 5G communication based on deterioration of the communication quality of another RAT (e.g., E-UTRA), but there is no limitation on conditions for re-activating 5G communication. The electronic device 101 may restore UE capability based on activation of 5G communication. The electronic device 101 may change the information element regarding whether 5G communication is supported from a non-supported configuration to a supported configuration. The electronic device 101 may perform an operation (e.g., at least some of the operations described in FIGS. 5A-5D) for reporting the changed UE capability in operation 949.

Figure 10A:
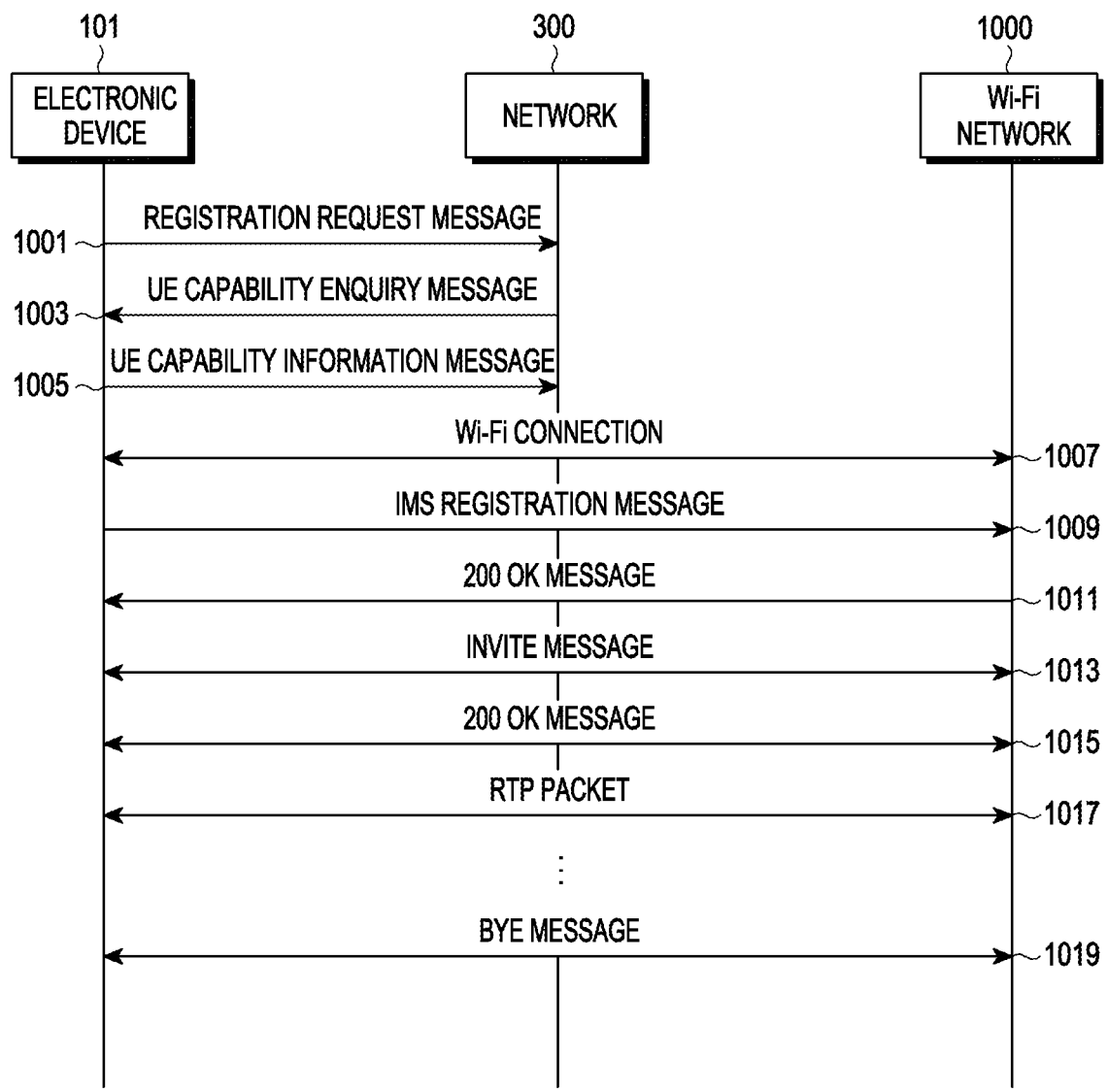
FIG. 10A is a signal flow diagram illustrating an example method of operating an electronic device according to various embodiments.

FIG. 10A is a signal flow diagram illustrating an example method of operating an electronic device according to various embodiments.

According to various embodiments, the electronic device 101 (e.g., at least one of the processor 120, the first communications processor 212, the second communications processor 214, or the unified communications processor 260) may transmit a registration request message (e.g., Attach request message for EPC, or Registration request message for 5GC) to the network 300 in operation 1001. In operation 1003, the electronic device 101 may receive a UE capability enquiry message from the network 300. In operation 1005, the electronic device 101 may transmit the UE capability information message to the network 300 based on reception of the UE capability enquiry message. The network 300 may store and/or manage UE capabilities for the electronic device 101 based on information included in the UE capability information message.

According to various embodiments, the electronic device 101 (e.g., Wi-Fi module) may establish a Wi-Fi connection with a Wi-Fi network 1000 in operation 1007. An operation for establishing a Wi-Fi connection may follow, for example, at least some of the sub-standards of 802.11, and a description of the operation may not be repeated here. Based on the Wi-Fi connection, the electronic device 101 may transmit an IMS registration message to the IMS server (or IMS core) (not illustrated) through the Wi-Fi network 1000 in operation 1009. The IMS registration message may be a session initiation protocol (SIP)-based message, and may be transmitted, for example, to the IMS server through the Wi-Fi network 1000 and ePDG, but there is no limitation. When the electronic device 101 is registered in the IMS server, the IMS server may transmit a 200 OK message to the electronic device 101 through the Wi-Fi network 1000. In operation 1011, the electronic device 101 may receive a 200 OK message from the Wi-Fi network 1000.

According to various embodiments, in operation 1013, the electronic device 101 may transmit or receive an INVITE message through the Wi-Fi network 1000. If the electronic device 101 is a mobile originating (MO) UE, the electronic device 101 may transmit an INVITE message. If the electronic device 101 is a mobile terminated (MT) UE, the electronic device 101 may receive an INVITE message. The electronic device 101 may transmit or receive a 200 OK message in operation 1015. For example, when the electronic device 101 transmits the INVITE message and the MT UE approves the reception, the 200 OK message may be received. For example, when the electronic device 101 receives the INVITE message and acceptance of the call reception is confirmed, the electronic device 101 may transmit a 200 OK message. Although not illustrated, other SIP messages (e.g., TRYING message, RINGING message) may be transmitted and received between the transmission and reception of the INVITE message and the transmission and reception of the 200 OK message. A session may be established between the electronic device 101 and another UE based on the reception of the 200 OK message. The electronic device 101 may transmit and/or receive an RTP packet with another UE in operation 1017 based on the established session. Accordingly, multimedia data for a phone call may be transmitted and/or received. According to various embodiments, based on the end of the call, the electronic device 101 may transmit or receive a BYE message in operation 1019.

Switching between the network 300 and the Wi-Fi network 1000, for example, between LTE communication and Wi-Fi, and switching between 5G communication and Wi-Fi is defined in the 3GPP standard. For example, an entity of N3IWF may be required for switching between 5G communication and Wi-Fi. However, depending on the network operator, the entity of the N3IWF may not be implemented. In this case, switching between 5G communication and Wi-Fi may not be performed. In this case, it may be advantageous for the electronic device 101 to use a continuous phone service to deactivate 5G communication.

Figure 10B:
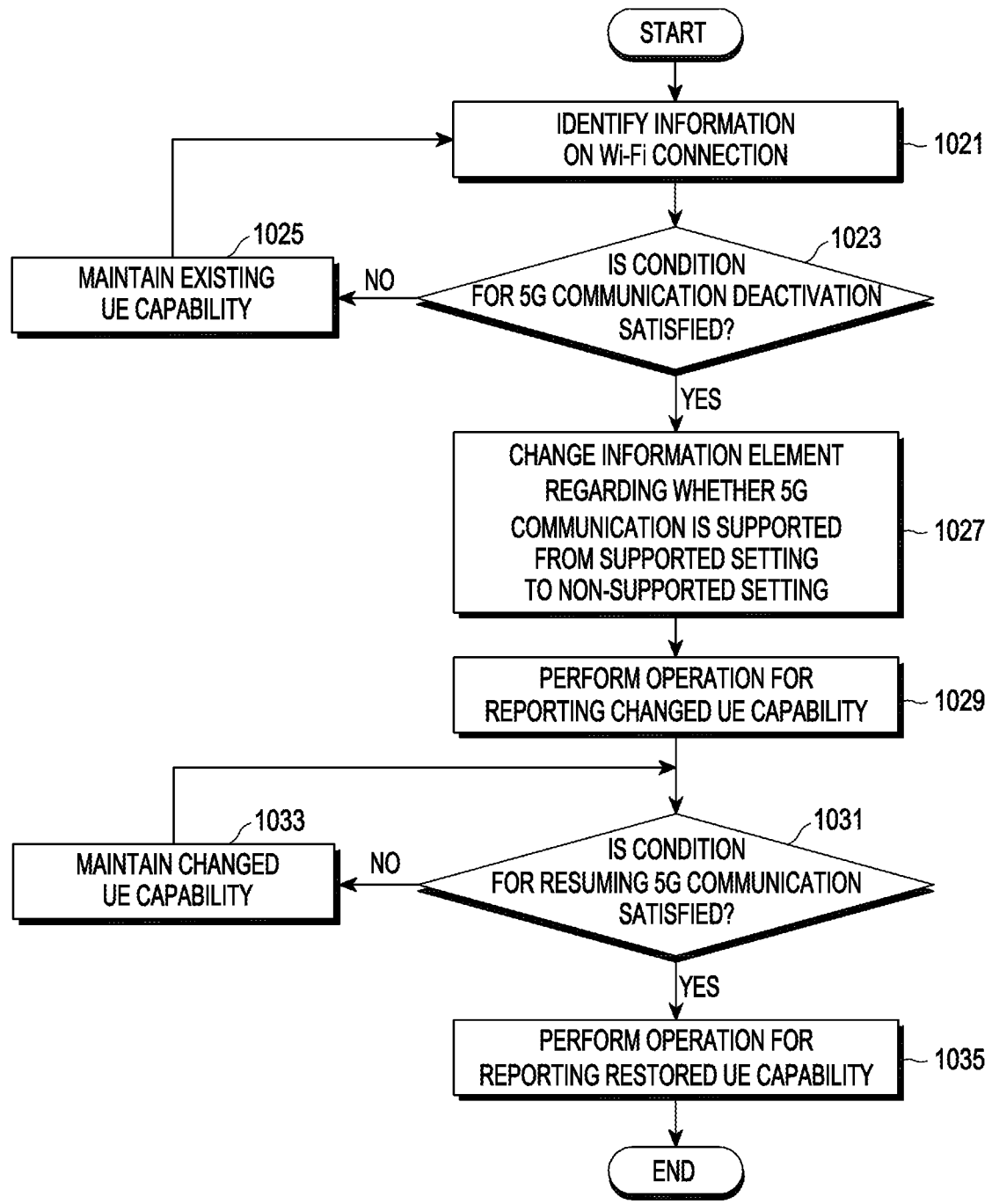
FIG. 10B is a flowchart illustrating an example method of operating an electronic device according to various embodiments.

FIG. 10B is a flowchart illustrating an example method of operating an electronic device according to various embodiments.

According to various embodiments, the electronic device 101 (e.g., at least one of the first communications processor 212, the second communications processor 214, or the unified communications processor 260) may identify information about the Wi-Fi connection in operation 1021. For example, when information on Wi-Fi connection through the Wi-Fi module is confirmed, the processor 120 may provide the information to the communication processor (e.g., at least one of the first communications processor 212, the second communications processor 214, or the unified communications processor 260). For example, the information on the Wi-Fi connection may be an indication indicating a state in which the Wi-Fi connection is established by the Wi-Fi module, but as long as it is information indicating that the Wi-Fi connection is established, the format is not limited.

According to various embodiments, in operation 1023, the electronic device 101 may determine whether a condition for deactivating 5G communication is satisfied. For example, the electronic device 101 may identify at least one of transmission and/or reception of at least a portion of a plurality of messages for a Wi-Fi connection in operation 1007 of FIG. 10A, transmission or reception of an IMS registration message in operation 1009, transmission or reception of a 200 OK message in action 1011, transmission or reception of an INVITE message in operation 1013, transmission or reception of 200 OK message in operation 1015, and transmission or reception of at least one RPT packet in operation 1017, as satisfaction of a condition for deactivating 5G communication. If the condition for 5G communication deactivation is not satisfied (1023—No), the electronic device 101 may maintain the existing UE capability in operation 1025. The electronic device 101 may continue monitoring the parameter as in operation 1021 while maintaining the existing UE capability. When the condition for deactivating 5G communication is satisfied (1023—Yes), in operation 1027, the electronic device 101 may change the information element regarding whether 5G communication (or RAT) is supported from the supported setting to the non-supported setting. The electronic device 101 may perform an operation (e.g., at least some of the operations described in FIGS. 5A to 5D) for reporting the changed UE capability in operation 1029.

According to various embodiments, the electronic device 101 may determine whether a condition for resuming 5G communication is satisfied in operation 1031. For example, the electronic device 101 may identify at least one of transmission or reception of a BYE message in FIG. 10A, release of the SIP session, unregister with the IMS server, or disconnect Wi-Fi as satisfaction of a condition for resuming 5G communication. When the condition for resuming 5G communication is not satisfied (1031—No), the electronic device 101 may maintain the changed UE capability in operation 1033. When the condition for resuming 5G communication is satisfied (1031—Yes), the electronic device 101 may perform an operation for reporting the restored UE capability in operation 1035. Based on the satisfaction of the condition for resuming 5G communication, the electronic device 101 may change the information element regarding whether 5G communication (or RAT) is supported from non-supported configuration to supported configuration. The electronic device 101 may perform an operation (e.g., at least some of the operations described in FIGS. 5A to 5D) for reporting the changed UE capability.

Figure 11:
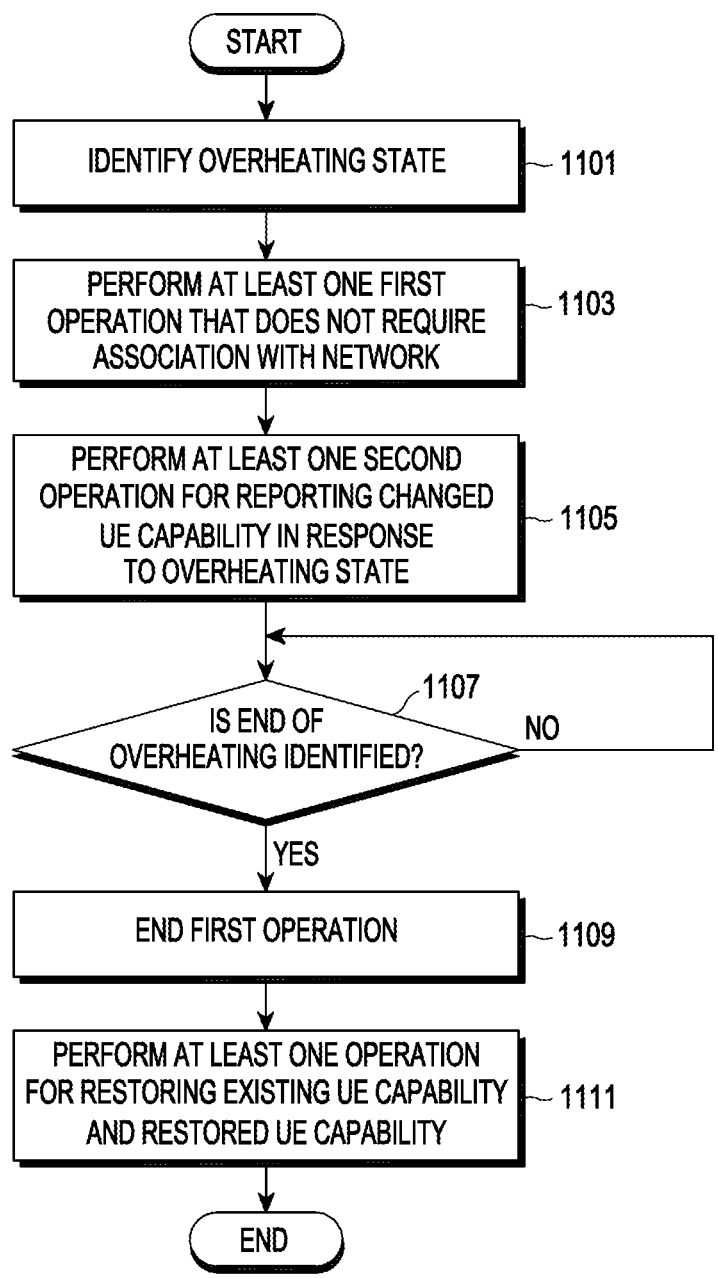
FIG. 11 is a flowchart illustrating an example method of operating an electronic device according to various embodiments.

FIG. 11 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify the overheating state in operation 1101. For example, as described with reference to FIG. 7A, the electronic device 101 may identify an indication indicating an overheating indicating that the measured temperature is equal to or greater than a threshold temperature, as an overheating state. As described with reference to FIG. 7B, the electronic device 101 may operate based on the measured temperature (or a temperature range that includes the measured temperature).

According to various embodiments, in operation 1103, the electronic device 101 may perform at least one first operation that does not require association with the network 300. In an example, the electronic device 101 may perform adjustment of the number of antennas for reception as a first operation, which will be described later. In another example, the electronic device 101 may adjust the transmission power as a first operation, which will be described later. Those skilled in the art will understand that, if reporting of the changed information to the network 300 is not a mandatory operation, it may be performed as at least one first operation. For example, as the number of antennas for reception is relatively large, the amount of heat generated by the electronic device 101 may be relatively large. Accordingly, in the heating state, the electronic device 101 may reduce the amount of heat generated by reducing the number of antennas for reception.

According to various embodiments, in operation 1105, the electronic device 101 may perform at least one second operation for reporting the changed UE capability in response to the overheating state. For example, as described with reference to FIG. 6, the electronic device 101 may perform at least one of change of the information element associated with the CA and/or the information element associated with the DC of the UE capability, change of information elements associated with the layer, change of information elements related to bandwidth, change of an information element associated with a modulation and coding scheme (MCS), change of an information element associated with a sounding reference signal (SRS), or change of information elements associated with the supporting radio access technology (RAT) and/or communication system, and there is no limitation on the type of information element to be changed. For example, a change in UE capability may be at least in part the same as the change in UE capability described in connection with at least one of FIG. 5A, 5B, 5C, 5D, 6, 7A, 7B, 8, 9A, 9B, 9C, 9D, 10A, or 10B. The electronic device 101 may perform an operation (e.g., at least some of the operations by FIGS. 5A to 5D) for reporting the changed UE capability to the network 300. After transmitting the TAU request message, the electronic device 101 may transmit a UE capability information message including the changed UE capability based on reception of the UE capability enquiry message from the network 300. The electronic device 101 may receive an RRC connection release message from the network 300 after transmitting the TAU request message, and may establish a new RRC connection based on the reception of the RRC connection release message. Based on the new RRC connection, the electronic device 101 may receive the UE capability enquiry message and transmit a UE capability information message including the changed UE capability.

According to various embodiments, in operation 1107, the electronic device 101 may determine whether the end of the overheating is identified. If it is confirmed that the overheating does not end (1107-NO), the electronic device 101 may maintain the changed state of the UE capability and the execution of the first operation. If it is confirmed that the overheating has ended (1107—Yes), the electronic device 101 may end the first operation in operation 1109. For example, when the electronic device 101 adjusts the number of antennas for reception as a first operation, the electronic device 101 may restore the number of antennas for reception to the number before the adjustment. When the electronic device 101 performs back-off of transmit power as a first operation, the electronic device 101 may stop performing back-off. In operation 1111, the electronic device 101 may perform at least one operation for restoring the existing UE capability and reporting the restored UE capability. For example, the electronic device 101 may change the UE capability as a second operation. Based on the end of the overheating, the electronic device 101 may restore the UE capability to the information before the change, and may perform at least one operation for reporting this to the network 300.

Figure 12:
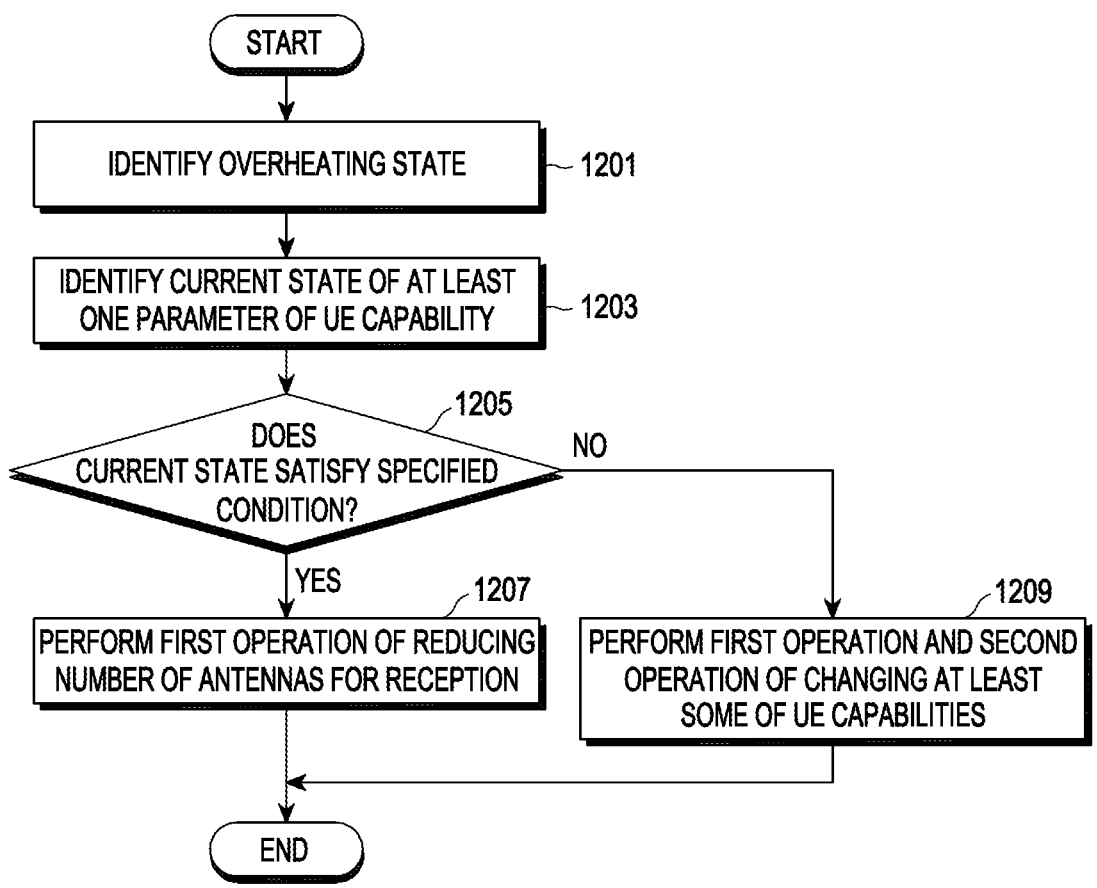
FIG. 12 is a flowchart illustrating an example method of operating an electronic device according to various embodiments.
Figure 13:
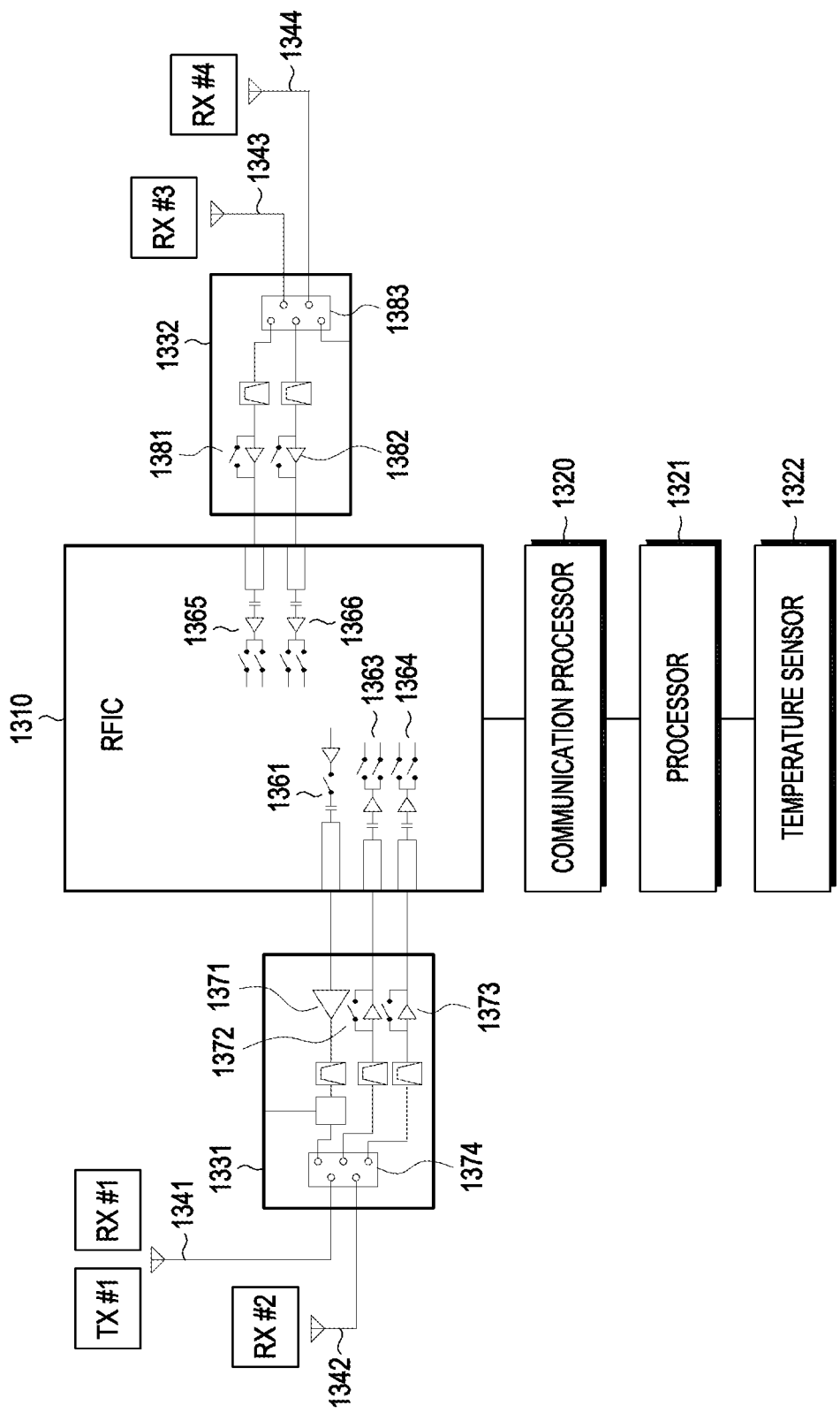
FIG. 13 is a block diagram illustrating an example configuration of an electronic device according to various embodiments.

FIG. 12 is a flowchart illustrating an example method of operating an electronic device according to various embodiments. FIG. 12 will be described with reference to FIG. 13. FIG. 13 is a block diagram illustrating an example configuration of an electronic device according to various embodiments.

According to various embodiments, the electronic device 101 (e.g., at least one of the processor 120, the first communications processor 212, the second communications processor 214, or the unified communications processor 260) may identify the overheating state in operation 1201. In operation 1203, the electronic device 101 may identify a current state of at least one parameter of UE capability. In operation 1205, the electronic device 101 may determine whether the current state satisfies a specified condition. In an example, as part of an operation of determining whether a specified condition is satisfied, the electronic device 101 may determine whether the electronic device 101 performs CA. For example, when CA is not performed, it may be determined that a specified condition is satisfied. In an example, as part of an operation of determining whether a specified condition is satisfied, the electronic device 101 may determine whether the electronic device 101 performs DC. For example, when DC is not performed, it may be determined that a specified condition is satisfied. In an example, as part of an operation of determining whether a specified condition is satisfied, the electronic device may determine whether the electronic device 101 transmits the SRS and/or receives the SRS configuration from the network 300. For example, when SRS transmission is not performed and/or if SRS configuration is not received, it may be determined that a specified condition is satisfied. In an example, as part of an operation of determining whether a specified condition is satisfied, the electronic device 101 may determine whether the current supported bandwidth (e.g., supportedbandwidth) of the electronic device 101 is the same as the initial carrier bandwidth (initialcarrierbandwidth). The initial carrier bandwidth may be obtained from system information. For example, when the initial carrier bandwidth and the current supported bandwidth are the same, it may be determined that a specified condition is satisfied. The specified condition is not limited as long as the operation performed by the electronic device 101 and the network 300 does not change due to the change in UE capability. For example, when CA or DC is not currently performed, even if the information element for CA or DC of UE capability is deactivated, there is no change in the operation of the electronic device 101 and the network 300, accordingly, it may be less likely that the overheating state will be resolved according to the change in UE capability.

According to various embodiments, when a specified condition is satisfied (1205—Yes), the electronic device 101 may perform a first operation of reducing the number of antennas for reception in operation 1207. When the specified condition is not satisfied (1205—No), in operation 1209, the electronic device 101 may perform a first operation of reducing the number of antennas for reception and a second operation of changing at least some of UE capabilities.

Referring to FIG. 13, an electronic device (e.g., the electronic device 101 of FIG. 1) according to various embodiments may include a communication processor 1320 (e.g., at least one of the first communication processor 212, the second communication processor 214, or the unified communication processor 260), a processor 1321 (e.g., the processor 120), a temperature sensor 1322 (e.g., the sensor module 176), an RFIC 1310 (e.g., at least one of the first RFIC 222, the second RFIC 224, the third RFIC 226, or the fourth RFIC 228), a first RFFE 1331, a second RFEE 1332, a first antenna 1341, a second antenna 1342, a third antenna 1343, a fourth antenna 1344. The communication processor 1320 may control at least some of the RFIC 1310 or the RFFEs 1331 and 1332 to adjust the number of antennas for reception.

According to various embodiments, the RFIC 1310 may convert a baseband signal generated by the communication processor 1320 into a radio frequency (RF) signal during transmission. For example, the RFIC 1310 may transmit an RF signal to the first antenna 1341 through the first RFFE 1331. Alternatively, when receiving, the RFIC 1310 may convert an RF signal received from the RFFE (e.g., the first RFFE 1331 or the second RFFE 1332) into a baseband signal and provide it to the communication processor 1320. The RFIC 1310 may include a component 1361 for transmission and components 1363, 1364, 1365, and 1366 for reception. The first RFFE 1331 may include a component 1371 for transmission, components 1372 and 1373 for reception, and a switch 1374. The switch 1374 may control the connection between each of the components 1371, 1372, and 1373 and each of the antennas 1341 and 1342. The second RFFE 1332 may include components 1381 and 1382 for reception and a switch 1383. The switch 1383 may control the connection between each of the components 1381 and 1382 and the antennas 1343 and 1344 respectively. The first antenna 1341 may be used for both transmission and reception, and may be referred to as a PRX antenna. The second antenna 1342, the third antenna 1343, and the fourth antenna 1344 may be used for reception and may be referred to as a DRX antenna. The electronic device 101 may use a DRX antenna for SRS transmission. Although not illustrated, the electronic device 101 may further include a switching structure for applying an RF signal for SRS to the DRX antennas 1342, 1343, and 1344. For example, when the UE capability of the electronic device 101 is configured to 1t4r, the electronic device 101 may sequentially (e.g., according to SRS transmission timing) apply an RF signal to each of the first antenna 1341 that is a PRX antenna, and the second antenna 1342, the third antenna 1343, and the fourth antenna 1344 those are DRX antennas. For example, when the UE capability of the electronic device 101 is configured to 1t2r, the electronic device 101 may sequentially (e.g., according to SRS transmission timing) apply the RF signal to the first antenna 1341 that is a PRX antenna and any one of the DRX antennas.

For example, when the number of antennas for reception is configured to four, the communication processor 1320 may control at least some of the RFIC 1310 and the RFFEs 1331 and 1332 so that reception may be performed through all of the first antenna 1341, the second antenna 1342, the third antenna 1343, and the fourth antenna 1344. The processor 1321 may provide information indicating an overheating state to the communication processor 1320 based on the temperature information obtained from the temperature sensor 1322. The communication processor 1320 may perform the first operation of adjusting the number of antennas for reception based on the obtained information indicating the overheating state. For example, the communication processor 1320 may adjust the number of antennas for reception to two. In this case, the communication processor 1320 may control the RFIC 1310 and the second RFFE 1332 so that a reception operation through the third antenna 1343 and the fourth antenna 1344 is not performed. In this case, at least some of the components 1365, 1366, 1381, and 1382 and the antenna 1383 may be controlled such that no signal is received from the antennas 1343, and 1344. Alternatively, the communication processor 1320 may adjust the number of antennas for reception to one. In this case, the communication processor 1320 may control the RFIC 1310 and the RFFEs 1331 and 1332 so that a reception operation through the second antenna 1342, the third antenna 1343, and the fourth antenna 1344 is not performed. In this case, at least some of the components 1364, 1365, 1366, 1381 and 1382, and antennas 1374 and 1383 may be controlled so that no signals are received from the antennas 1342, 1343, and 1344. The electronic device 101 may decrease or increase the number of antennas currently operating reception, and there is no limit to decrease or increase.

According to various embodiments, when the temperature sensed by the sensor module 176 is included in the first temperature range, the electronic device 101 may perform the first operation of reducing the number of antennas for reception. When the temperature sensed by the sensor module 176 is included in a second temperature range different from the first temperature range, the electronic device 101 may be configured to perform a second operation of changing at least some of UE capabilities. The second temperature range may be higher than the first temperature range, but may be lower than the first temperature range according to implementation.

Figure 14:
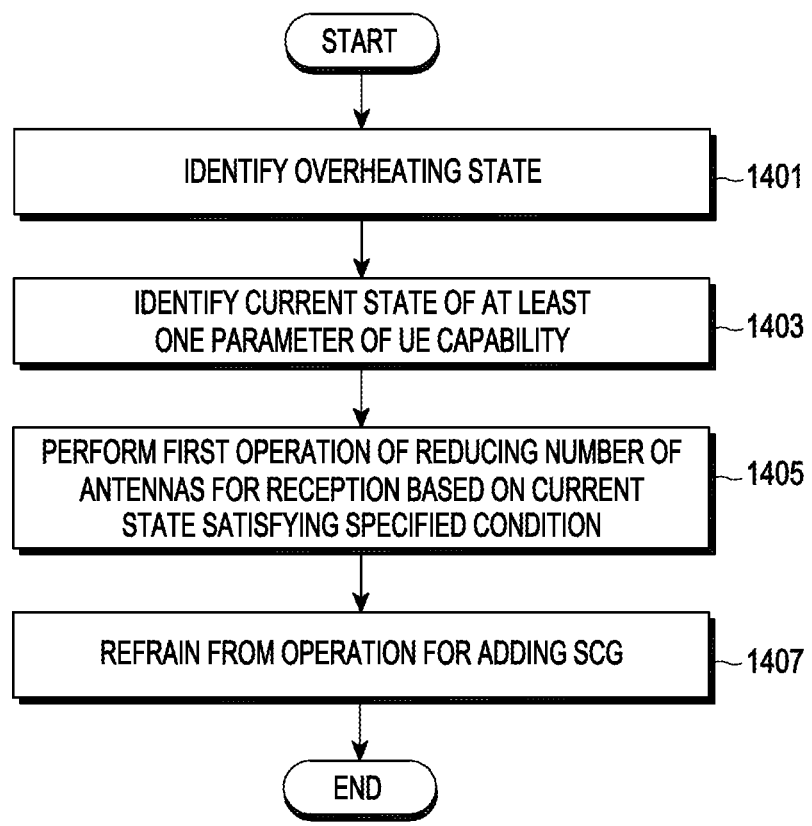
FIG. 14 is a flowchart illustrating an example method of operating an electronic device according to various embodiments.

FIG. 14 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify an overheating state in operation 1401. In operation 1403, the electronic device 101 may identify a current state of at least one parameter of UE capability. In operation 1405, the electronic device 101 may perform the first operation of reducing the number of antennas for reception based on the current state satisfying a specified condition. As described in FIG. 12, when the operation of the electronic device 101 and the network 300 does not change according to the change in the UE capability, the electronic device 101 may perform only the first operation without performing an operation for changing and reporting the UE capability. Because the UE capability has not changed, the network 300 is likely to perform an operation for, for example, DC.

According to various embodiments, in operation 1407, the electronic device 101 may refrain from an operation for adding a secondary cell group (SCG). In an example, when an RRC reconfiguration message including a measurement object (MO) for adding SCG is received, the electronic device 101 may refrain from measurement for the corresponding MO and/or performing measurement report (MR). When the RRC reconfiguration message for adding SCG is received, the electronic device 101 may refrain from performing an operation for adding an SCG, for example, a RACH procedure for the SCG, and may transmit an SCG failure message to the network 300.

Although not illustrated, the electronic device 101 may refrain from performing transmission of CA or SRS. For example, because the UE capabilities have not changed, the network 300 is likely to perform operations for, for example, CA or SRS. The electronic device 101 may refrain from an operation for CA even when an RRC reconfiguration message for CA is received. The electronic device 101 may refrain from transmitting the SRS even when the SRS configuration is included in the RRC reconfiguration message.

Figure 15:
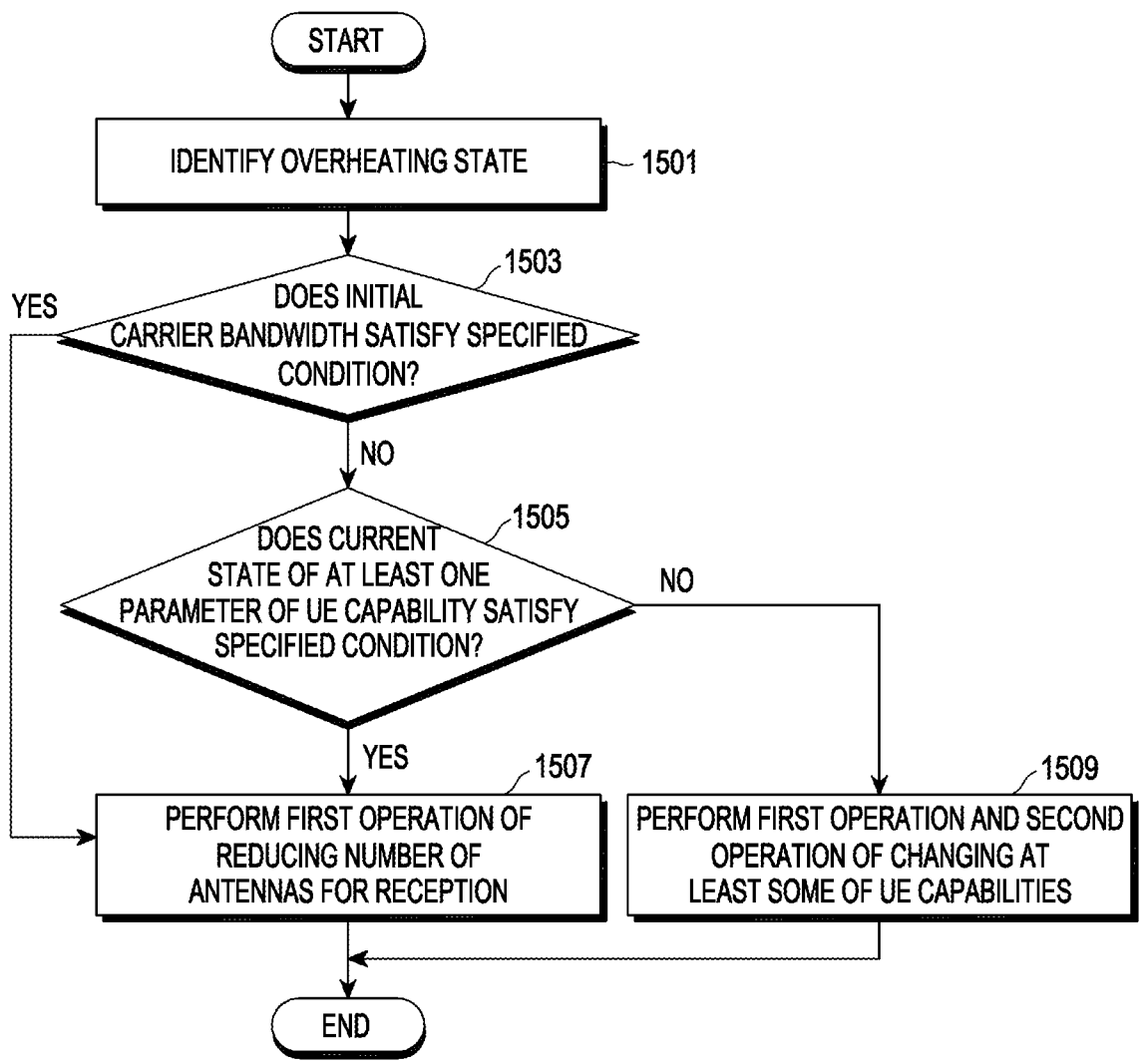
FIG. 15 is a flowchart illustrating an example method of operating an electronic device according to various embodiments.

FIG. 15 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify the overheating state in operation 1501. In operation 1503, the electronic device 101 may determine whether an initial carrier bandwidth (initialcarrierbandwidth) satisfies a specified condition. For example, the electronic device 101 may determine whether the initial carrier bandwidth is included in a specified range (e.g., 10 MHz or less, or 20 MHz or less). For example, 10 MHz may be a size configured for stable performance of a voice over NR (VoNR) service or an ultra-reliable low latency communication (URLLC) service. Because the VoNR service has a relatively low data rate used as a call service and a QoS Class Identifier (QCI) is a Guaranteed Bit Rate (GBR) type, stable performance may be possible even by changing the UE capability and/or adjusting the number of antennas for reception. The URLLC service may not require a large data rate as a service for low latency and high reliability. For example, 3GPP TS 22.186 provides a KPI of V2X, and may require a data rate of about 53 Mbps, which may be a data rate that may be supported by a bandwidth of 10 MHz. For example, when using only one CC with a bandwidth of 10

MHz in 5G communication, a data rate of about 84 Mbps may be obtained based on 2×2 MIMO and 64 QAM, which may be greater than the 53 Mbps required by URLLC. For example, 20 MHz may be a bandwidth that may ensure stable performance of other services while the URLLC service or VoNR service is performed. Alternatively, 20 MHz may be a bandwidth that may ensure stable provision of a service (e.g., eMBB service) that requires a relatively data rate.

According to various embodiments, when the initial carrier bandwidth satisfies a specified condition (1503—Yes), the electronic device 101 may perform a first operation of reducing the number of antennas for reception in operation 1507. When the initial carrier bandwidth does not satisfy a specified condition (1503—No), the electronic device 101 may determine whether a current state of at least one parameter of UE capability satisfies a specified condition in operation 1505. Whether the specified condition of operation 1505 is satisfied may be the same as described with reference to FIG. 13. When the specified condition is satisfied (1505—Yes), the electronic device 101 may perform the first operation of reducing the number of antennas for reception in operation 1507. When the specified condition is not satisfied (1505—No), in operation 1509, the electronic device 101 may perform a first operation of reducing the number of antennas for reception and a second operation of changing at least some of UE capabilities. As described above, when the initial carrier bandwidth is, for example, smaller than the specific bandwidth, the electronic device 101 may be configured not to adjust the UE capability in order to perform a stable service of the specific service (e.g., VoNR service or URLLC service).

Figure 16:
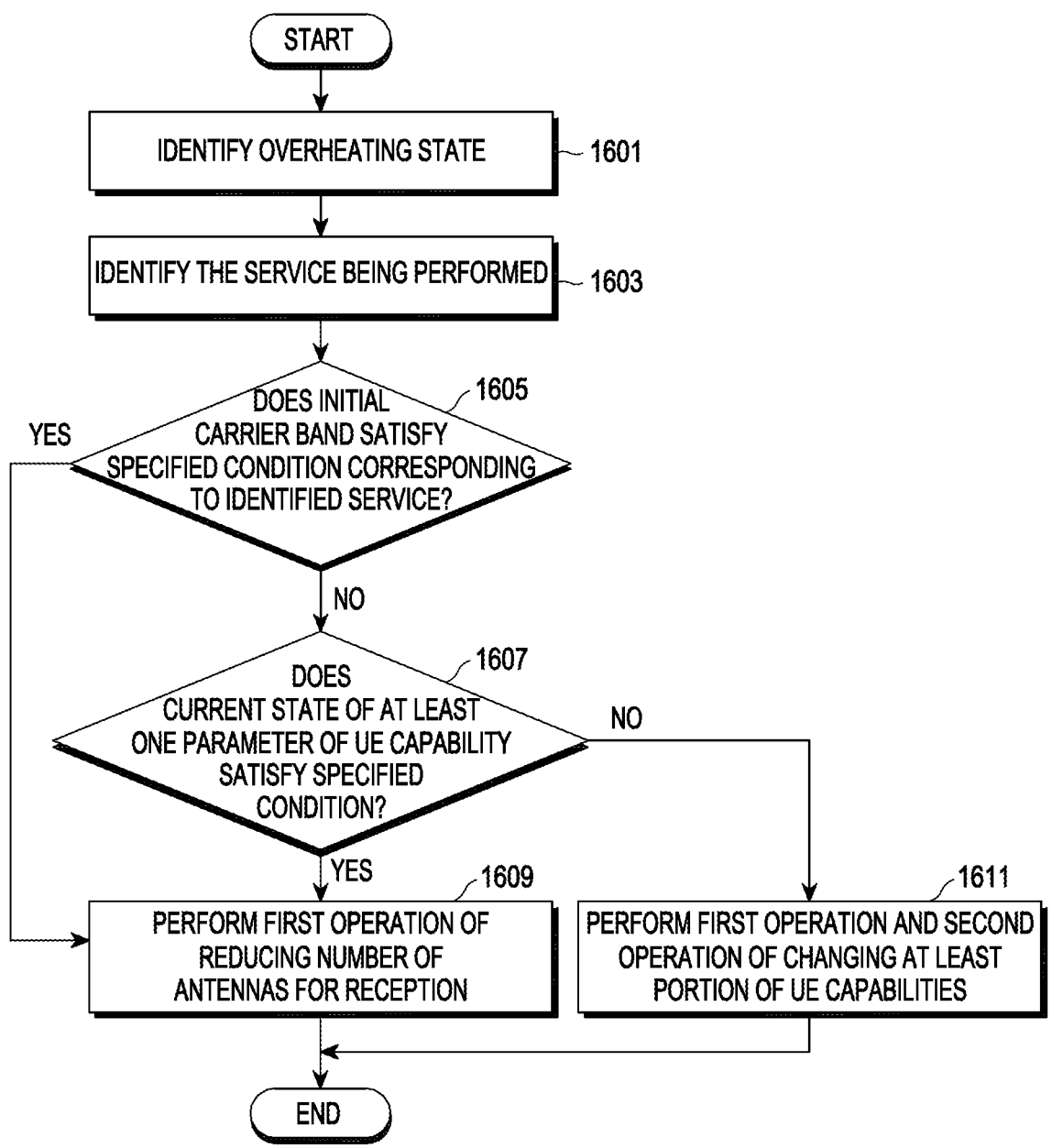
FIG. 16 is a flowchart illustrating an example method of operating an electronic device according to various embodiments.

FIG. 16 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify the overheating state in operation 1601. In operation 1603, the electronic device 101 may identify a service being performed. In an example, when the overheating condition is confirmed, the processor 120 may provide information on the overheating condition and information on the service type (e.g., slice/service type (SST)) being performed together to the communication processor (e.g., at least one of first communication processor 212, second communication processor 214, or unified communication processor 260). The communication processor (e.g., at least one of first communication processor 212, second communication processor 214, or unified communication processor 260) may identify the service being performed based on the information on the type of service being performed, which is received together with the information about the overheating state.

In another example, the communication processor (e.g., at least one of first communication processor 212, second communication processor 214, or unified communication processor 260) may establish at least one PDU (protocol data unit) session (PDU session) before the overheating state is identified. The communication processor (e.g., at least one of first communication processor 212, second communication processor 214, or unified communication processor 260) may transmit a PDU session establishment request message to the network based on a network request (or network connection request) from the application. The PDU session establishment request message may include SST. In this case, the communication processor (e.g., at least one of first communication processor 212, second communication processor 214, or unified communication processor 260) may store information about the SST in advance. When information about the overheating state is received from the processor 120, the communication processor (e.g., at least one of first communication processor 212, second communication processor 214, or unified communication processor 260) may identify the pre-stored service being performed based on the received information.

According to various embodiments, in operation 1605, the electronic device 101 may determine whether the initial carrier band satisfies a specified condition corresponding to the identified service. When the initial carrier band satisfies a specified condition corresponding to the identified service (1605—Yes), the electronic device 101 may perform the first operation of reducing the number of antennas for reception in operation 1609 and may not change the UE capability. For example, when the URLLC service is being performed, the electronic device 101 may determine whether the initial carrier band is smaller than 10 MHz. The electronic device 101 may determine whether the initial carrier band is smaller than 20 MHz when the URLLC service is being performed in order to ensure stable performance of services other than URLLC. For example, when the eMBB service is being performed, the electronic device 101 may determine whether the initial carrier band is smaller than 20 MHz. The above-described bandwidth for comparison for each service is merely an example. In addition, a method of identifying the provided service based on the SST is also an example. In an embodiment, the electronic device 101 may determine whether the initial carrier band satisfies a specified condition corresponding to the data rate being used. For example, the electronic device 101 may identify the data rate being used and identify the bandwidth for stably supporting the checked data rate. When the initial carrier band is equal to or less than the identified bandwidth, the electronic device 101 may perform the first operation of reducing the number of antennas for reception and may not change the UE capability.

According to various embodiments, when the initial carrier band does not satisfy the specified condition corresponding to the identified service (1605—No), the electronic device 101 may determine whether a current state of at least one parameter of UE capability satisfies a specified condition in operation 1607. When the current state of at least one parameter of UE capability satisfies the specified condition (1607—Yes), the electronic device 101 may perform the first operation of reducing the number of antennas for reception in operation 1609 and may not change the UE capability. When the current state of at least one parameter of UE capability does not satisfy the specified condition (1607—No), the electronic device 101 may perform a first operation of reducing the number of antennas for reception and a second operation of changing at least some of UE capabilities in operation 1611.

Figure 17:
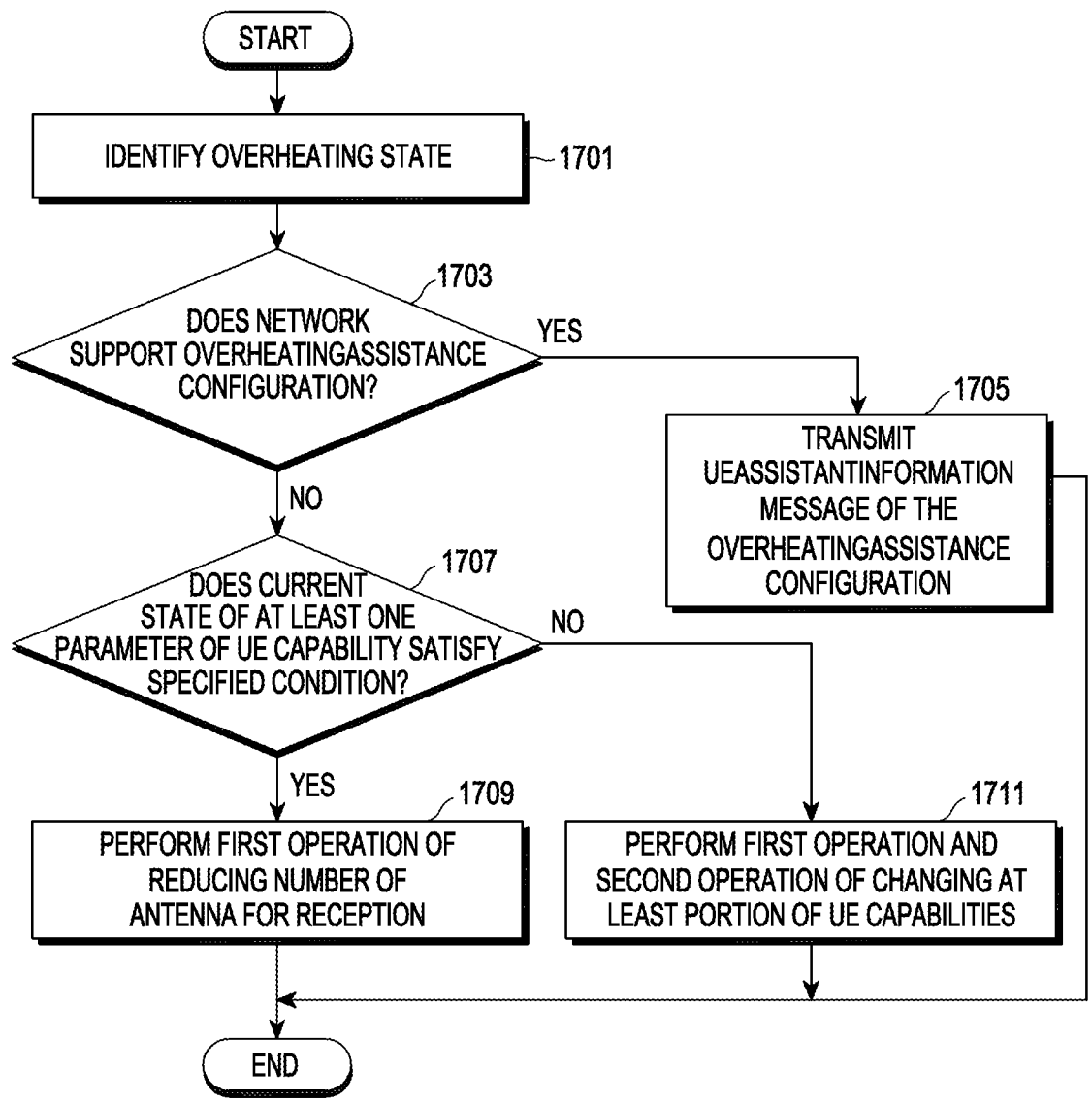
FIG. 17 is a flowchart illustrating an example method of operating an electronic device according to various embodiments.

FIG. 17 is a flowchart illustrating an example method of operating an electronic device according to various embodiments.

According to various embodiments, the electronic device 101 (e.g., at least one of the processor 120, the first communications processor 212, the second communications processor 214, or the unified communications processor 260) may identify the overheating state in operation 1701. In operation 1703, the electronic device 101 may determine whether the network 300 supports the OverheatingAssistance configuration. For example, when receiving otherconfig including the OverheatingAssistance configuration, the electronic device 101 may determine that the network supports the OverheatingAssistance configuration. When the electronic device 101 does not receive otherconfig including the OverheatingAssistance configuration, it may be determined that the network does not support the OverheatingAssistance configuration.

According to various embodiments, if it is determined that the network 300 supports the OverheatingAssistance configuration (1703—Yes), the electronic device 101 may transmit a UEAssistantInformation message of the OverheatingAssistance configuration in operation 1705. The electronic device 101 may request the network 300 to request at least one of a reduction in the maximum number of CCs of CA, a reduction in the maximum bandwidth, or a reduction in the maximum number of MIMO layers, based on the OverheatingAssistance configuration. In an example, when the electronic device 101 identifies the overheating indication, the electronic device may transmit a UEAssistantInformation message including preconfigured information in response to the overheating indication. For example, the overheating indication may be included in the temperature information received from the temperature sensor, or the processor 120 may generate the overheating indication based on the temperature information. The electronic device 101 may transmit a UEAssistantInformation message including information identified in response to the current temperature (or a range including the current temperature). Based on the received UEAssistantInformation message of the OverheatingAssistance configuration, the network 300 may perform at least one of a reduction in the maximum number of CCs of the CA, a reduction in the maximum bandwidth, or a reduction in the maximum number of MIMO layers. The network 300 may not configure SRS transmit antenna switching to the electronic device 101 based on the reception of the UEAssistantInformation message of the OverheatingAssistance configuration. For example, the network 300 may transmit an RRC reconfiguration message for releasing the SRS-related configuration to the electronic device 101. The network 300 may control to reduce the transmission power of the electronic device 101 based on the reception of the UEAssistantInformation message of the OverheatingAssistance configuration. For example, the network 300 may control to reduce the transmit power of the electronic device 101 by performing transmit power control (TPC). For example, the network 300 may transmit downlink control information (DCI) causing a reduction in transmission power to the electronic device 101.

According to various embodiments, when it is determined that the network 300 does not support the OverheatingAssistance configuration (1703—No), in operation 1707, the electronic device 101 may determine whether a current state of at least one parameter of UE capability satisfies a specified condition. When the specified condition is satisfied (1707—Yes), the electronic device 101 may perform the first operation of reducing the number of antennas for reception and may not change UE capabilities. When the specified condition is not satisfied (1707—No), the electronic device 101 may perform a first operation of reducing the number of antennas for reception and a second operation of changing at least some of UE capabilities in operation 1711.

Figure 18:
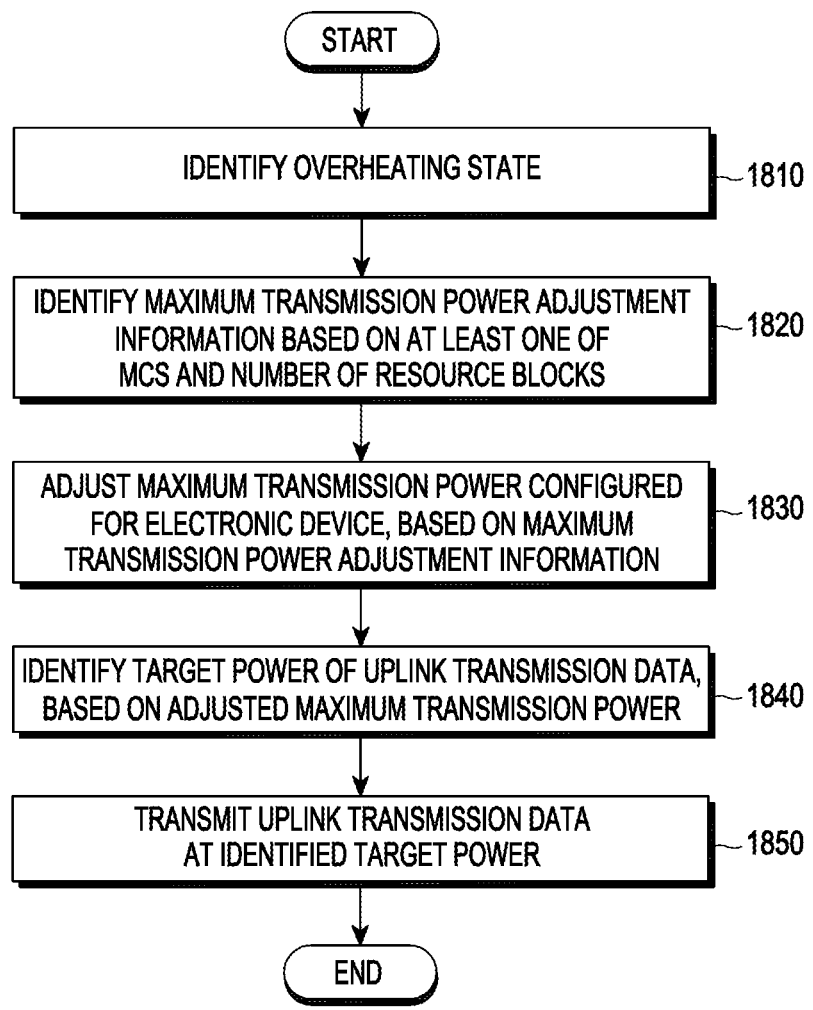
FIG. 18 is a flowchart illustrating an example method of operating an electronic device according to various embodiments.

FIG. 18 is a flowchart illustrating an example method of operating an electronic device according to various embodiments. Referring to FIG. 18, according to various embodiments, the electronic device 101 (e.g., at least one of the processor 120, the first communications processor 212, the second communications processor 214, or the unified communications processor 260) may identify the overheating state (or information related to overheating conditions) in operation 1810. For example, the electronic device 101 may identify an indication indicating an overheating in operation 1810. For example, the processor 120 may obtain temperature information from the sensor module 176. For example, the processor 120 may determine whether the obtained temperature information is equal to or greater than a specified threshold temperature (e.g., 43° C.). When the obtained temperature information is equal to or greater than a specified threshold temperature, the processor 120 may provide an indication indicating the overheating to the communication processor (e.g., at least one of the first communications processor 212, the second communications processor 214, or the unified communications processor 260). In another implementation example, the communication processor (e.g., at least one of the first communications processor 212, the second communications processor 214, or the unified communications processor 260) may obtain temperature information directly from the sensor module 176. In this case, the communication processor (e.g., at least one of the first communications processor 212, the second communications processor 214, or the unified communications processor 260) may determine whether the obtained temperature information is equal to or greater than a specified threshold temperature.

According to various embodiments, the electronic device 101 may identify information related to an overheating state in operation 1810. For example, the electronic device 101 may manage a plurality of temperature ranges. The electronic device 101 may identify a temperature range including the measured temperature as information related to an overheating state.

According to various embodiments, the electronic device 101 may control the transmission power based on information (e.g., information related to resource allocation) related to a physical (PHY) layer in response to identifying the overheating state (or information related to overheating conditions). For example, the electronic device 101 may identify whether the maximum transmission power (Max Tx power) is adjusted and/or the adjustment information of the maximum transmission power based on information related to a physical layer in response to identifying the overheating state. The information related to the physical layer may include at least one of modulation and coding scheme (MCS), the number of resource blocks (RBs) (NRB), grant ratio, block error rate (BLER), data rate (or throughput; T-put), buffer status index (BSI), or path loss (PL). According to various embodiments, the electronic device 101 may use the average value for a set unit time (e.g., 1 second) when applying the information related to the physical layer in embodiments to be described later.

According to various embodiments, the electronic device 101 may control the power of the transmission signal according to the target power required from the base station within the maximum transmission power transmittable by the electronic device 101. For example, the electronic device may control the power of the transmission signal with the minimum value among a target power and a maximum transmission power (UE Tx MAX Power) of the electronic device. According to various embodiments, the maximum transmission power (UE Tx MAX Power) of the electronic device may be determined to be the smallest value among maximum available transmission power (PcMax) of the electronic device in consideration of the characteristics of the electronic device, maximum transmission power (PeMax) according to a power class set in the electronic device, and maximum transmission power considering specific absorption rate (SAR) back-off event (SAR Max Power), but there is no limitation on the determination method. In the following description, for convenience of description, it is assumed that the maximum transmission power (UE Tx MAX Power) is the maximum transmission power (PcMax) available for the electronic device.

According to various embodiments, the target power may be changed according to a channel state that is changed in real time, and may be determined according to transmitting power control (TPC) by the base station. For example, the electronic device 101 may determine the target power based on the following <Equation 1> according to the standard document 3GPP TS 38.213.

$$P_{O\_PUSCH,b,f,c}(j)+10\log_{10}(2^{\mu} \cdot M_{RB,b,f,c}^{PUSCH}(i))+ \alpha_{b,f,c}(j) \cdot PL_{b,f,c}(q_d)+\Delta_{TF,b,f,c}(i)+f_{b,f,c}(i,l)$$ [Equation 1]

The definition of <Equation 1> may follow 3GPP TS 38.213, for example, $P_{O\_PUSCH,b,f,c}(j)$ may be provided by p0 for the activation uplink bandwidth part (UL BWP)(b) of the carrier (f) of the serving cell (c). $M^{PUSCH}_{RB,b,f,c}(i)$ is a bandwidth expressed by the number of resource blocks for a transmission occasion (i) on an activation UL BWP (b) of a carrier (f) of a serving cell (c), and µ, is a subcarrier spacing (SCS). $\alpha_{b,f,c}(j)$ may be provided by alpha for the activation UL BWP of the carrier (f) of the serving cell (c).

the maximum transmission power of the electronic device. For example, when the maximum transmission power of the electronic device is set to 20 dBm and the target power determined based on Equation 1 above is 21 dBm, the transmit power for uplink data transmission in the electronic device 101 may be limited to 20 dBm.

According to various embodiments, the electronic device 101 may identify the adjustment information of the maximum transmission power based on the above-described information (e.g., information related to resource allocation) related to the physical (PHY) layer, in response to identifying the overheating state (or information related to overheating conditions) in operation 1810. For example, in operation 1820, the electronic device 101 may identify the adjustment information of the maximum transmission power based on at least one of the MCS and the number of resource blocks. For example, the electronic device 101 may identify information about the MCS, and may identify the adjustment information of the maximum transmission power based on the MCS index. The adjustment information of the maximum transmission power may include an adjustment value y of the maximum transmission power.

The MCS index may be represented as illustrated in <Table 1> below, but is not limited thereto.

TABLE 1

| MCS Index | Modulation Order | Spectral efficiency | Target code Rate × [1024] |
|---|---|---|---|
| 0 | 2 | 0.2344 | 120 |
| 1 | 2 | 0.377 | 193 |
| 2 | 2 | 0.6016 | 308 |
| 3 | 2 | 0.877 | 449 |
| 4 | 2 | 1.1758 | 602 |
| 5 | 4 | 1.4766 | 378 |
| 6 | 4 | 1.6953 | 434 |
| 7 | 4 | 1.9141 | 490 |
| 8 | 4 | 2.1602 | 553 |
| 9 | 4 | 2.4063 | 616 |
| 10 | 4 | 2.5703 | 658 |
| 11 | 6 | 2.7305 | 466 |
| 12 | 6 | 3.0293 | 517 |
| 13 | 6 | 3.3223 | 567 |
| 14 | 6 | 3.6094 | 616 |
| 15 | 6 | 3.9023 | 666 |
| 16 | 6 | 4.2129 | 719 |
| 17 | 6 | 4.5234 | 772 |
| 18 | 6 | 4.8164 | 822 |
| 19 | 6 | 5.1152 | 873 |
| 20 | 8 | 5.332 | 682.5 |
| 21 | 8 | 5.5547 | 711 |
| 22 | 8 | 5.8906 | 754 |
| 23 | 8 | 6.2266 | 797 |
| 24 | 8 | 6.5703 | 841 |
| 25 | 8 | 6.9141 | 885 |
| 26 | 8 | 7.1602 | 916.5 |
| 27 | 8 | 7.4063 | 948 |
| 28 | 2 |  | reserved |
| 29 | 4 |  | reserved |
| 30 | 6 |  | reserved |
| 31 | 8 |  | reserved |

$PL_{b,f,c}(q_d)$ is the downlink path loss predicted in dB by the user equipment UE using the RS resource index $(q_d)$ with respect to the active downlink BWP (DL BWP) of the serving cell (c). $f_{b,f,c}(i)$ may comply with 3GPP TS 38.213, and may be adjusted by downlink control information (DCI) transmitted from the base station to the electronic device. According to various embodiments, the electronic device 101 may be determined within a range in which the target power determined based on <Equation 1> does not exceed According to various embodiments, the electronic device 101 may map and apply at least one MCS index or a range of the MCS index and an adjustment value y of the maximum transmission power. For example, the electronic device 101 may configure one MCS index to be mapped to the adjustment value y of the specific maximum transmission power, or configure a plurality of MCS indexes to be mapped to the adjustment value y of the specific maximum transmission power. As another example, the electronic device 101 may map and store a section or a range including at least one MCS index to an adjustment value y of a specific maximum transmission power. For example, when the range of the MCS index is 3 to 10, by setting the adjustment value (y) of the maximum transmission power to −1, it may be configured to adjust by −1 dB from the currently set maximum transmission power, when the range of the MCS index is 11 to 19, by setting the adjustment value (y) of the maximum transmission power to −2, it may be configured to adjust by −2 dB from the currently set maximum transmission power, and when the range of the MCS index is 20 to 27, by setting the adjustment value y of the maximum transmission power to −3, it may be configured to be adjusted by −3 dB from the currently set maximum transmission power. For example, when the maximum transmission power (e.g., initial value of maximum transmission power or current value of maximum transmission power) is set to 23 dBm, if adjusted by −1 dB according to the MCS index, the maximum transmission power may be adjusted to 22 dBm, if adjusted by −2 dB according to the MCS index, the maximum transmission power may be adjusted to 21 dBm, and if adjusted by −3 dB according to the MCS index, the maximum transmission power may be adjusted to 20 dBm.

According to various embodiments, the electronic device 101 may identify information on the number of resource blocks allocated to the electronic device, and identify the adjustment information of the maximum transmission power based on the confirmed number of resource blocks. For example, the electronic device 101 may map and apply the number of resource blocks or a range of the number of resource blocks to the adjustment value y of the maximum transmission power. For example, when the range of the number of resource blocks is 0 to 30, by setting the adjustment value (y) of the maximum transmission power to −1, it may be configured to adjust by −1 dB from the currently set maximum transmission power, when the range of the number of resource blocks is 31 to 60, by setting the adjustment value (y) of the maximum transmission power to −2, it may be configured to adjust by −2 dB from the currently set maximum transmission power, and when the range of the number of resource blocks exceeds 60, by setting the adjustment value y of the maximum transmission power to −3, it may be configured to be adjusted by −3 dB from the currently set maximum transmission power. For example, when the maximum transmission power (e.g., initial value of maximum transmission power or current value of maximum transmission power) is set to 23 dBm, if adjusted by −1 dB according to the number of resource blocks, the maximum transmission power may be adjusted to 22 dBm, if adjusted by −2 dB according to the number of resource blocks, the maximum transmission power may be adjusted to 21 dBm, and if adjusted by −3 dB according to the number of resource blocks, the maximum transmission power may be adjusted to 20 dBm.

Figure 20:
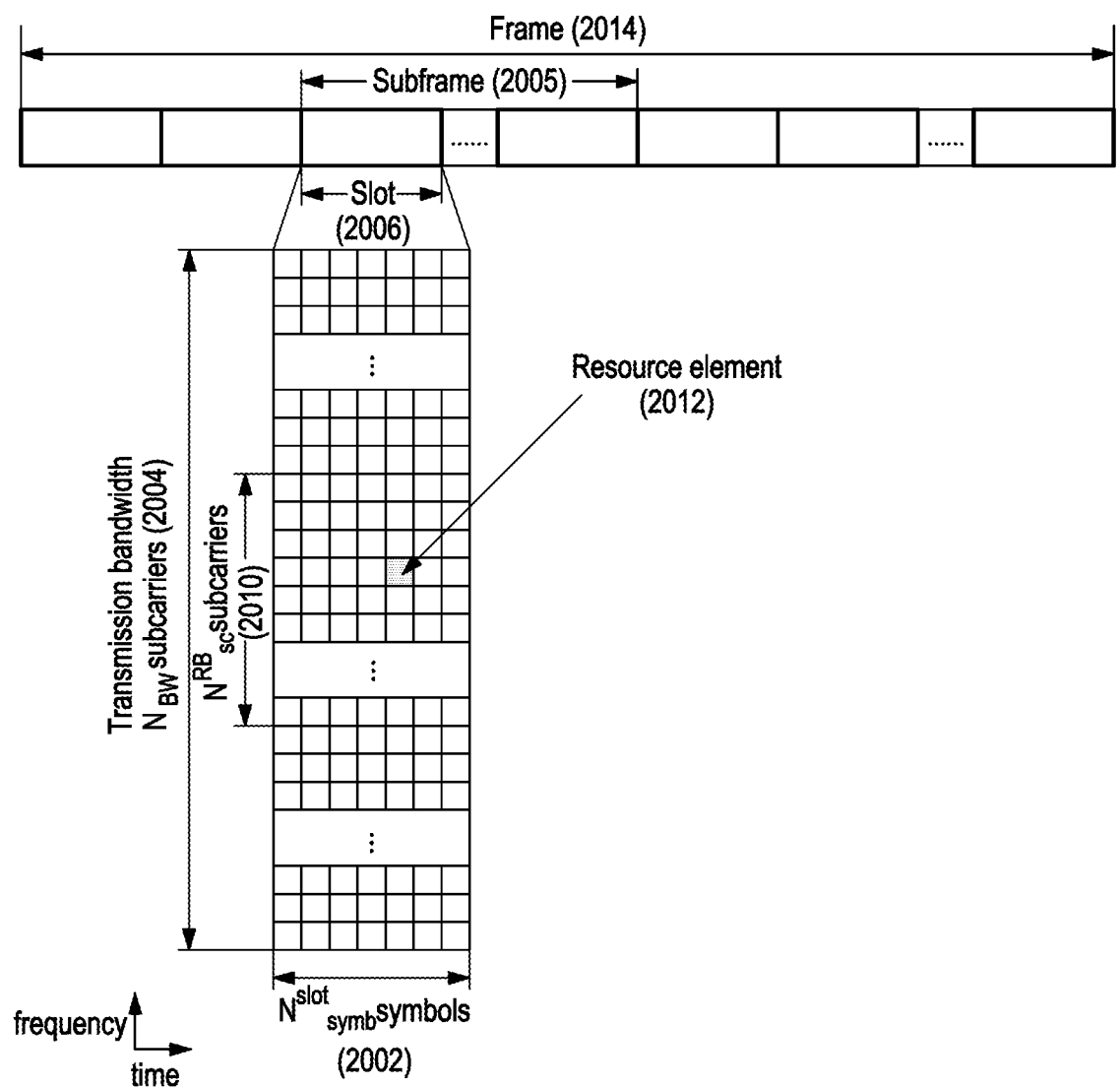
FIG. 20 is a diagram illustrating an example structure of a resource block allocated to an electronic device according to various embodiments.

FIG. 20 is a diagram illustrating an example structure of a resource block allocated to an electronic device according to various embodiments. Referring to FIG. 20, the horizontal axis represents the time domain, and the vertical axis represents the frequency domain. The minimum transmission unit in the time domain of the 5G system is an orthogonal frequency division multiplexing (OFDM) symbol, and $N_{symb}^{slot}$ symbols 2002 may be gathered to form one slot 2006, and $N_{slot}^{subframe}$ slots may be gathered to form one subframe 2005. The length of the subframe is 1.0 ms, and 10 subframes may be gathered to form one frame 2014 having a length of 10 ms. The minimum transmission unit in the frequency domain is a subcarrier, and the bandwidth of the entire system transmission band may include a total of $N_{BW}$ 2004 subcarriers.

A basic unit of a resource in the time-frequency domain is a resource element (RE) 2012 and may be represented by an OFDM symbol index and a subcarrier index. A resource block (RB) may be defined as $N_{sc}^{RB}$ consecutive subcarriers 2010 in the frequency domain. In the 5G system, $N_{sc}^{RB}=12$, and the data rate may increase in proportion to the number of RBs scheduled to the electronic device 101. In the 5G system, the base station may map data in units of RBs and perform scheduling on RBs of one slot for each electronic device 101. For example, in the 5G system, a basic time unit in which scheduling is performed may be a slot, and a basic frequency unit in which scheduling is performed may be an RB. Although the RB in the 5G system has been described in FIG. 20, various embodiments are not limited to the 5G system, and may be equally or similarly applied to various communication systems including the LTE system.

According to various embodiments, in response to identifying the overheating state (or information related to overheating conditions) in operation 1820, the electronic device 101 may identify the adjustment information of the maximum transmission power based on the above-described number of MCS and resource blocks. For example, the electronic device 101 may identify the adjustment information of the maximum transmission power by simultaneously considering the MCS and the number of resource blocks. For example, according to the embodiment, the electronic device 101 may identify the adjustment information (e.g., adjustment value of maximum transmission power (y)) of the maximum transmission power using a mapping table in which the MCS and the resource block are simultaneously considered as illustrated in <Table 2> below.

TABLE 2

| | | Adjustment value (γ) according to the number of resource block | | |
|---|---|---|---|---|
| | | 1~30 | 31~60 | 61~ |
| MCS index | 3~10 | +1 | 0 | −1 |
| | 11~19 | 0 | −1 | −2 |
| | 20~27 | −1 | −2 | −3 |

Referring back to FIG. 18, according to various embodiments, the electronic device 101 may adjust configured maximum transmission power for the electronic device based on the identified maximum transmission power adjustment information in operation 1830. For example, referring to <Table 2>, if the MCS index is 11 to 19 and the number of resource blocks is 31 to 60, by setting the adjustment value y of the maximum transmission power to −1, the maximum transmission power may be adjusted by −1 dB. For example, when the current maximum transmission power or the initial value of the maximum transmission power is 23 dBm, the maximum transmission power may be set or adjusted to 22 dBm according to the MCS index and the number of resource blocks. According to various embodiments, the electronic device 101 may identify the target power of uplink (UL) transmission data based on the adjusted maximum transmission power in operation 1840. For example, the target power of the uplink transmission data may be set to a value such that the target power determined based on Equation 1 above does not exceed the adjusted maximum transmission power. For example, when the target power determined based on <Equation 1> is 23 dBm and the maximum transmission power is adjusted from 23 dBm to 22 dBm, the final target power of uplink transmission data may be set or confirmed as 22 dBm.

According to various embodiments, the electronic device 101 may transmit the uplink transmission data with a target power set or checked based on the adjusted maximum transmission power in operation 1850.

According to various embodiments, in the above-described embodiment, the adjustment value (y) of the maximum transmission power is used to adjust the maximum transmission power, but according to an embodiment, the adjustment value (y) of the maximum transmission power may be used to adjust the target power of <Equation 1>. For example, referring to <Table 2>, if the MCS index is 11 to 19 and the number of resource blocks is 31 to 60, by setting the adjustment value y of the maximum transmission power to −1, the target power can be adjusted by −1 dB.

According to various embodiments, the electronic device 101 may determine whether to apply the adjustment of the maximum transmission power in operation 1820 and operation 1830 based on the above-described information (e.g. information related to resource allocation) related to the physical (PHY) layer.

For example, when the path loss is greater than or equal to a set value (30 dB), it may be determined that the electronic device 101 is located in an area outside the cell or a weak electric field, so that the above-described adjustment of the maximum transmission power may not be applied. For example, even if the maximum transmission power can be adjusted from 23 dBm to 22 dBm according to the number of MCS and/or resource blocks, if the path loss is equal to or greater than a set value, the maximum transmission power is no longer lowered or, conversely, the maximum transmission power can be adjusted to increase.

According to various embodiments, the electronic device 101 may be configured to not exceed the set maximum value when adjusting the maximum transmission power, and may be configured to not be less than the set minimum value. For example, when the maximum value of the maximum transmission power is set to 25 dBm and the minimum value is set to 10 dBm, according to the number of the MCS and/or resource blocks, the electronic device 101 may control not to exceed 25 dBm set as the maximum value even when the maximum transmission power increases, and may control not to be less than 10 dBm set as the minimum value even when the maximum transmission power decreases.

According to various embodiments, when the grant ratio is equal to or greater than a set value, the electronic device 101 may not apply the above-described adjustment of the maximum transmission power. For example, if the grant ratio is 50% or more, the electronic device 101 may control so that the maximum transmission power is not lowered further from a currently set value, or control that the maximum transmission power is not lowered by more than a set value (e.g., 3 dB) from an initial value of the maximum transmission power.

Figure 21:
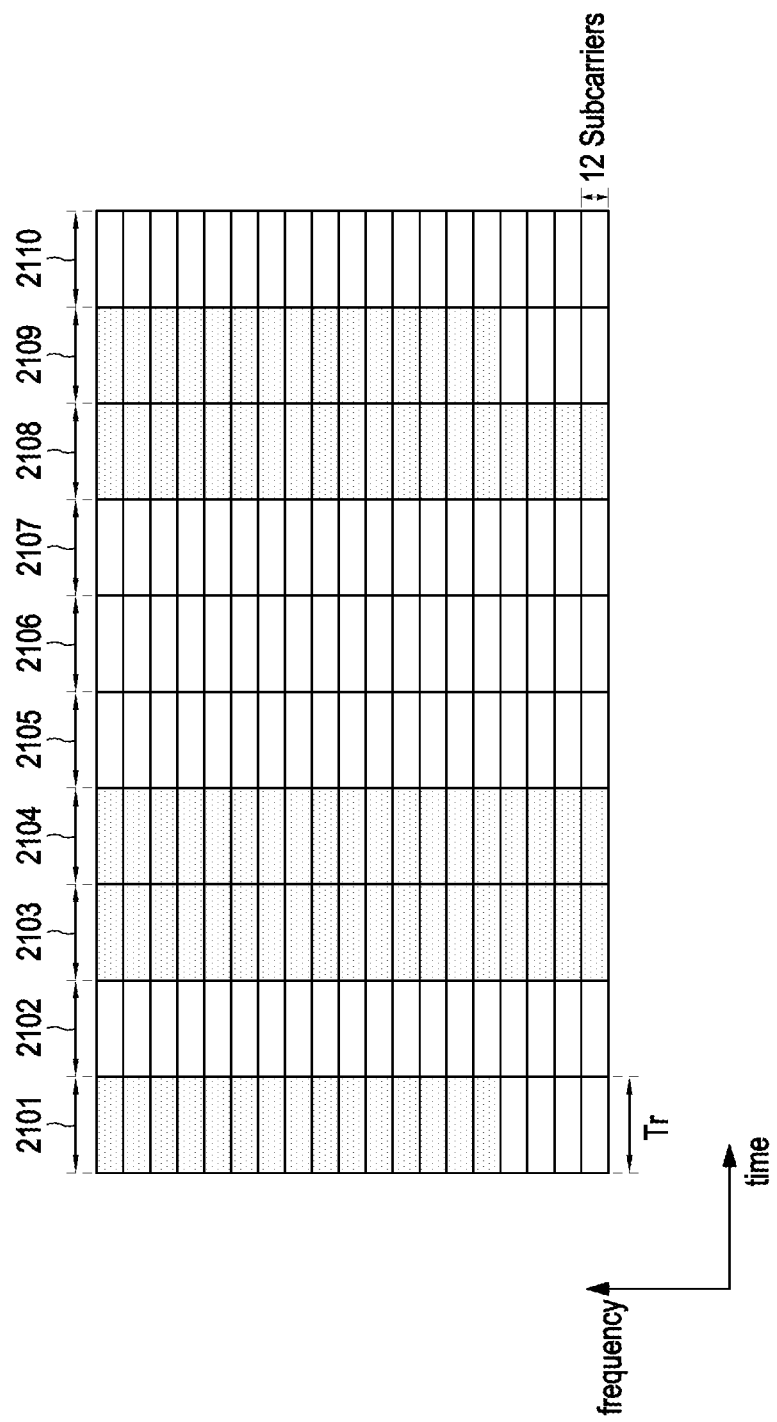
FIG. 21 is a diagram illustrating a concept of a grant rate allocated to an electronic device according to various embodiments.

According to various embodiments, the grant ratio may be determined as illustrated in FIG. 21. Referring to FIG. 21, the grant rate may indicate a rate at which resource blocks are allocated on the time axis. In FIG. 21, a horizontal axis may indicate a time axis, and a vertical axis may indicate a frequency axis. In FIG. 21, one column may represent one resource block (RB), but is not limited thereto. For example, one cell on the horizontal axis in FIG. 21 may represent one OFDM symbol, two or more OFDM symbols, or one slot including a plurality of OFDM symbols, but is not limited thereto. In the following description, for convenience of explanation, it may be assumed that one column along the horizontal axis in FIG. 21 includes one slot including 14 OFDM symbols, and one column along the vertical axis includes 12 subcarriers. For example, in the first slot 2101 of FIG. 21, 15 RBs out of a total of 19 RBs may be allocated for data transmission in the electronic device 101. One RB may not be allocated to the second slot 2102, the third slot 2103, the sixth slot 2106, the seventh slot 2107, and the tenth slot 2110. All 19 RBs may be allocated to the fourth slot 2104, the fifth slot 2105, and the eighth slot 2108. Five RBs may be allocated to the ninth slot 2109. Referring to FIG. 21, because at least one RB is allocated to 5 slots out of a total of 10 slots, the grant ratio may be calculated as 50% (5/10). According to various embodiments, when the grant ratio is 50% or more, if the maximum transmission power is lowered by 3 dB or more, the grant ratio must be doubled, so it may be difficult for the base station to allocate additional resource blocks, accordingly, it is possible to control so as not to further lower the maximum transmission power in order to guarantee a transmission speed (e.g., a data transmission rate) for the electronic device 101.

According to various embodiments, when the BSI is equal to or greater than a set value, the electronic device 101 may not apply the above-described adjustment of the maximum transmission power. The BSI may refer to an index set in response to the size of the buffer for a predetermined time in the memory buffer of the electronic device 101, and may be set as illustrated in Table 3 below, but is not limited thereto.

TABLE 3

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |

TABLE 3-continued

| Index | Buffer Size (BS) value [bytes] |
|---|---|
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

For example, if the BSI is equal to or greater than a specific value, the electronic device 101 may control so that the maximum transmission power is not lowered further from the currently set value or not lowered by more than a set value (e.g., 3 dB) from the initial value of the maximum transmission power. The BSI may be transmitted while being included in a buffer status report (BSR) transmitted from the electronic device 101 to the network. For example, the electronic device 101 may transmit the BSR including the BSI to the network through a medium access control (MAC) control element (CE). According to various embodiments, the electronic device 101 may identify the BSI included in the BSR for transmission to the network, and when the BSI is greater than or equal to a set value, control not to lower the maximum transmission power. For example, referring to <Table 3>, when the BSI is 50, the buffer size may correspond to 19325 bytes to 22624 bytes, and the electronic device 101 may control not to lower the maximum transmission power to ensure transmission of data corresponding to the buffer size.

According to various embodiments, when the BLER is equal to or greater than a set value, the electronic device 101 may not apply the above-described adjustment of the maximum transmission power. For example, when BLER is 10% or more, the electronic device 101 may control the maximum transmission power not to be lowered further from a currently set value.

Figure 19:
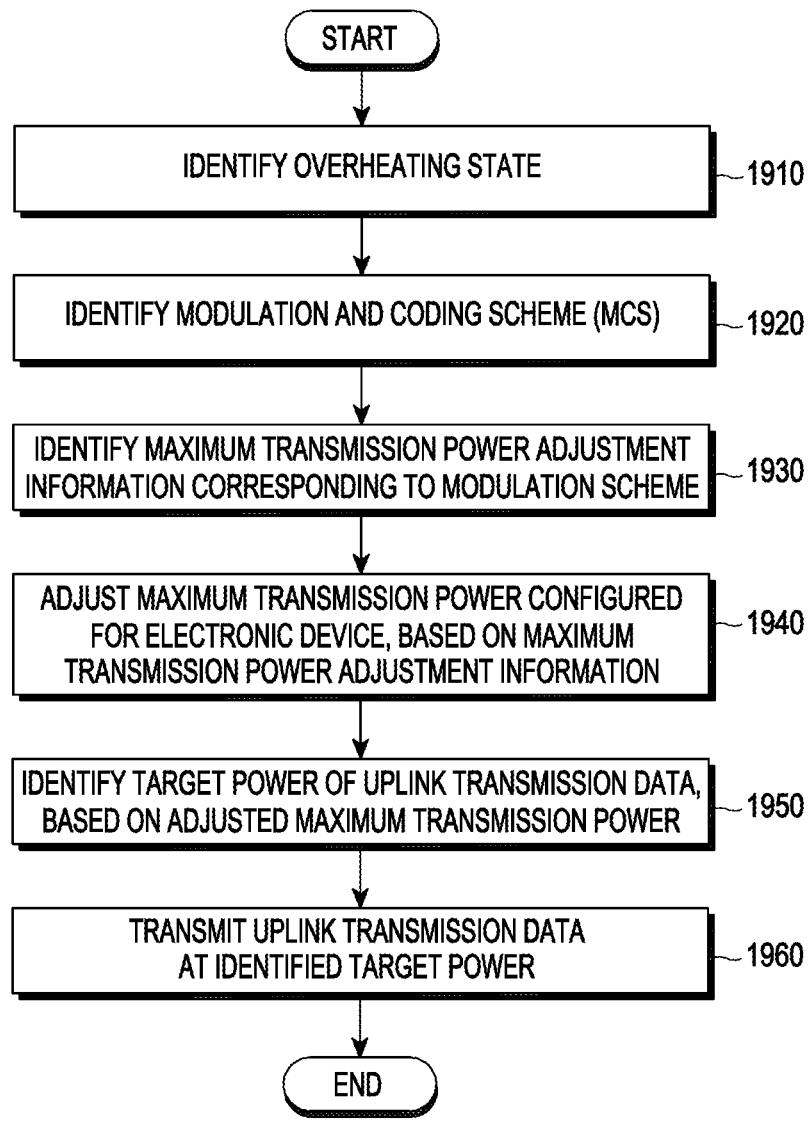
FIG. 19 is a flowchart illustrating an example method of operating an electronic device according to various embodiments.

FIG. 19 is a flowchart illustrating an example method of operating an electronic device according to various embodiments. Referring to FIG. 19, according to various embodiments, the electronic device 101 (e.g., at least one of the processor 120, the first communications processor 212, the second communications processor 214, or the unified communications processor 260) may identify the overheating state (or information related to overheating conditions) in operation 1910. For example, the electronic device 101 may identify an indication indicating an overheating in operation 1910. For example, the processor 120 may obtain temperature information from the sensor module 176. For example, the processor 120 may determine whether the obtained temperature information is equal to or greater than a specified threshold temperature (e.g., 43° C.). When the obtained temperature information is equal to or greater than a specified threshold temperature, the processor 120 may provide an indication indicating the overheating to the communication processor (e.g., at least one of the first communications processor 212, the second communications processor 214, or the unified communications processor 260). In another implementation example, the communication processor (e.g., at least one of the first communications processor 212, the second communications processor 214, or the unified communications processor 260) may obtain temperature information directly from the sensor module 176. In this case, the communication processor (e.g., at least one of the first communications processor 212, the second communications processor 214, or the unified communications processor 260) may determine whether the obtained temperature information is equal to or greater than a specified threshold temperature.

According to various embodiments, the electronic device 101 may identify information related to an overheating state in operation 1910. For example, the electronic device 101 may manage a plurality of temperature ranges. The electronic device 101 may identify a temperature range including the measured temperature as information related to an overheating state.

According to various embodiments, the electronic device 101 may control the transmission power based on the MCS in response to identifying the overheating state (or information related to the overheating state). For example, the electronic device 101 may identify the adjustment information of the maximum transmission power based on the MCS, in response to identifying the overheating state. According to various embodiments, the electronic device 101 may use the average value for a set unit time (e.g., 1 second) when the MCS is applied in embodiments to be described later.

According to various embodiments, the electronic device 101 may control the power of the transmission signal according to the target power required from the base station within the maximum transmission power transmittable by the electronic device 101. For example, the electronic device may control the power of the transmission signal to a minimum value among a target power and a maximum transmission power (UE Tx MAX Power) of the electronic device. According to various embodiments, the maximum transmission power (UE Tx MAX Power) of the electronic device may be determined to be the smallest among maximum available transmit power (PcMax) of the electronic device in consideration of the characteristics of the electronic device, maximum transmission power (PeMax) according to a power class set in the electronic device, and maximum transmission power considering specific absorption rate (SAR) back-off event (SAR Max Power), but there is no limitation on the determination method. In the following description, for convenience of description, it is assumed that the maximum transmission power (UE Tx MAX Power) is the maximum transmission power (PcMax) available for the electronic device.

According to various embodiments, the target power may be changed according to a channel state that is changed in real time, and may be determined according to transmitting power control (TPC) by the base station. For example, as described in the description of FIG. 18, the electronic device 101 may determine the target power based on the above <Equation 1> according to the standard document 3GPP TS 38.213.

According to various embodiments, the electronic device 101 may identify information about the MCS in operation 1920 in response to identifying the overheating state (or information related to the overheating state) in operation 1910. According to various embodiments, in operation 1930, the electronic device 101 may identify the adjustment information of the maximum transmission power corresponding to the modulation scheme identified from the information on the MCS. The modulation method may correspond to a modulation order of <Table 1> described above, but is not limited thereto. For example, when the modulation method is QPSK, the modulation order may be 2, when the modulation method is 16QAM, the modulation order may be 4, when the modulation method is 64QAM, the modulation order may be 6, and when the modulation method is 256QAM, the modulation order may be 8.

According to various embodiments, the electronic device 101 may map and apply each modulation method and an adjustment value of the maximum transmission power. For example, when the modulation scheme is QPSK, it may be configured to maintain the maximum transmission power without adjusting, when the modulation method is 16QAM, it can be set to adjust by −1 dB from the currently set maximum transmission power, when the modulation method is 64QAM, it may be set to adjust by −2 dB from the currently set maximum transmission power, and when the modulation method is 128QAM, it may be set to adjust by −3 dB from the currently set maximum transmission power.

According to various embodiments, the electronic device 101 may identify the adjustment information of the maximum transmission power set for the identified modulation method in operation 1930. The electronic device 101 may adjust the maximum transmission power set for the electronic device based on the adjustment information of the maximum transmission power in operation 1940. For example, when the maximum transmission power (e.g., the initial value of the maximum transmission power or the current value of the maximum transmission power) is set to 23 dBm, if adjusted by −1 dB according to the modulation scheme, the maximum transmission power may be adjusted to 22 dBm, if adjusted by −2 dB according to the modulation scheme, the maximum transmission power may be adjusted to 21 dBm, and if adjusted by −3 dB according to the modulation scheme, the maximum transmission power may be adjusted to 20 dBm.

According to various embodiments, the electronic device 101 may identify a target power of uplink (UL) transmission data based on the adjusted maximum transmission power in operation 1950. For example, the target power of the uplink transmission data may be set to a value such that the target power determined based on <Equation 1> above does not exceed the adjusted maximum transmission power. For example, when the target power determined based on <Equation 1> is 23 dBm and the maximum transmission power is adjusted from 23 dBm to 22 dBm, the final target power of uplink transmission data may be set or confirmed as 22 dBm.

According to various embodiments, the electronic device 101 may transmit the uplink transmission data with a target power set or checked based on the adjusted maximum transmission power in operation 1960.

According to various embodiments, the electronic device 101 may determine whether to apply the adjustment of the maximum transmission power in operation 1920 and operation 1940 based on the above-described information (e.g., information related to resource allocation) related to the physical (PHY) layer. In various embodiments of determining whether to apply the adjustment of the maximum transmission power in the electronic device 101, the methods described above with reference to FIG. 18 may be applied in the same or similar manner.

Figure 22:
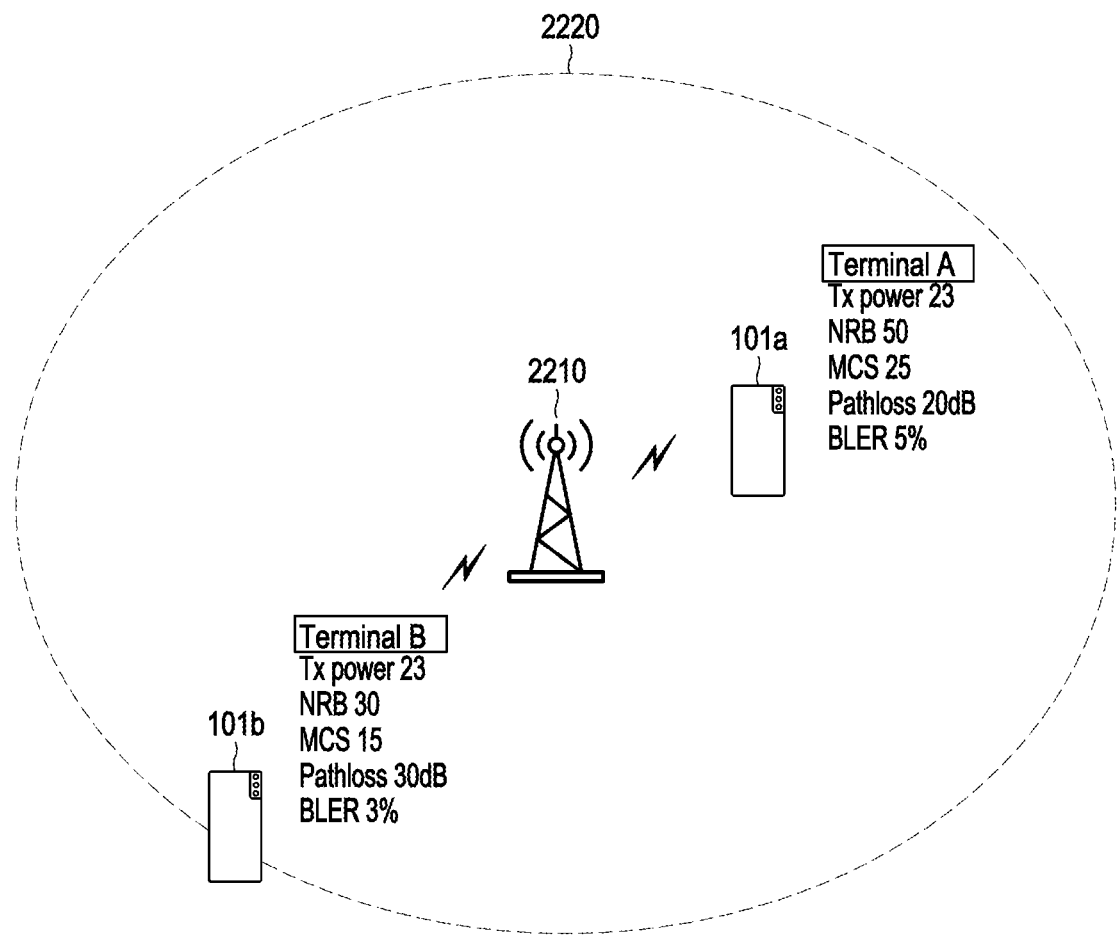
FIG. 22 is a diagram illustrating an electronic device and a location within a cell according to various embodiments.

FIG. 22 is a diagram illustrating a location within an electronic device and a cell according to various embodiments. Referring to FIG. 22, a base station 2210 may communicate with at least one electronic device (e.g., a UE A 101a, or a UE B 101b) located in the cell 2220 covered by the base station. The UE A 101a may be relatively closer to the base station 2210 than the UE B 101b. For example, although the UE A 101a transmits data with the same target power as that of the UE B 101b, because signal strengths received by the base station 2210 are different from each other, resource allocation may also be different.

For example, as illustrated in FIG. 22, the UE A 101a may transmit uplink data with a target power of 23 dBm, and the base station 2210 may allocate 50 resource blocks and an MCS index of 25 to UE A 101a. The path loss between the base station 2210 and the UE A 101a may be calculated as 20 dB, and the BLER may be measured as 5%. Compared to the UE A 101a, the UE B 101b may transmit uplink data with a target power of 23 dBm, and the base station 2210 may allocate 30 resource blocks and an MCS index of 15 to UE B 101b. The path loss between the base station 2210 and the UE B 101b may be calculated as 30 dB, and the BLER may be measured as 3%. According to various embodiments, even if the UE A 101a transmits uplink data with the same target power as that of the UE B 101b, the distance to the base station 2210 is relatively close, so the path loss may be less. The base station 2210 may provide a higher transmission rate by allocating relatively more resources or a higher modulation scheme to the UE A 101a than the UE B 101b.

According to various embodiments, because the UE A 101a is not located at the cell boundary unlike the UE B 101b, the path loss is not relatively large, as described above, when heat is generated in the UE A 101a, the transmission power may be controlled to be lowered based on information (e.g., information related to resource allocation) related to the physical (PHY) layer.

For example, UE A 101a may adjust the maximum transmission power based on the MCS index (e.g., 25) and/or the number of resource blocks (e.g., 50) in response to identifying the overheating state. For example, when the overheating state is identified, the UE A 101a may adjust the maximum transmission power by applying the above-mentioned <Table 2>. Applying <Table 2>, because the MCS index of the UE A 101a is 25 and the number of resource blocks is 50, the maximum transmission power may be adjusted by −2 dB. For example, when the current maximum transmission power or the initial value of the maximum transmission power of the UE A 101a is 23 dBm and the target power is 23 dBm, as the maximum transmission power is adjusted from 23 dBm to −2 dB and set to 21 dBm, the target power may be lowered to 21 dBm. As the UE A 101a transmits uplink data with a relatively low target power, the data received from the base station 2210 may have an increased BLER, and as the BLER increases, the base station 2210 may change the MCS index to a lower value for the UE A 101a or reduce the number of resource blocks allocated. According to various embodiments, when the quality of service (QoS) for the service provided by the UE A 101a needs to guarantee a data rate greater than or equal to a set value, the base station 2210 may increase the grant rate instead of adjusting the MCS index or the allocation number of resource blocks for the UE A 101a.

Figure 23:
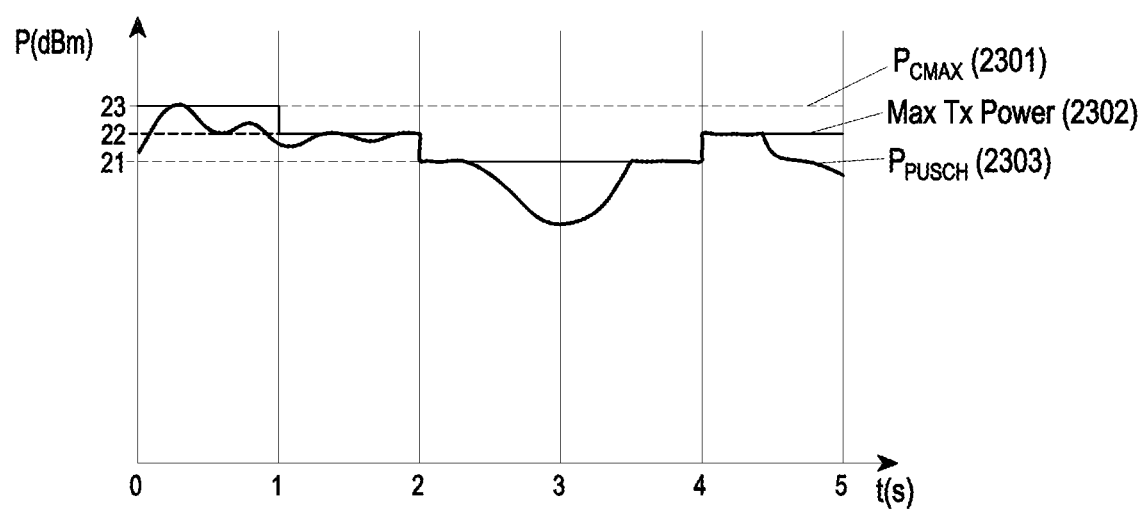
FIG. 23 is a graph comparing power according to various embodiments.

FIG. 23 is a graph comparing power according to various embodiments. Referring to FIG. 23, the electronic device 101 may control the power of the transmission signal according to the target power required from the base station within the maximum transmission power transmittable by the electronic device 101. For example, the electronic device may control the power of the transmission signal to a minimum value among a target power and a maximum transmission power (UE Tx MAX Power) of the electronic device. According to various embodiments, the maximum transmission power (UE Tx MAX Power) of the electronic device may be determined to be the smallest among maximum available transmit power (PcMax) of the electronic device in consideration of the characteristics of the electronic device, maximum transmission power (PeMax) according to a power class set in the electronic device, and maximum transmission power considering specific absorption rate (SAR) back-off event (SAR Max Power), but there is no limitation on the determination method. In FIG. 23, for convenience of description, it is assumed that the maximum transmission power (UE Tx MAX Power) is the maximum transmission power (PcMax; $P_{CMAX}$) 2301 available for the electronic device.

According to various embodiments, the initial value or reference value of the maximum transmission power (Max Tx Power) 2302 may be set as the maximum transmission power ($P_{CMAX}$) available for the electronic device, and as described above, the maximum transmission power 2302 may be adjusted based on the number of MCSs and/or resource blocks for every set time (e.g., 1 second). For example, the maximum transmission power 2302 may be set to 23 dBm, which is the same as the maximum transmission power (PcMax; $P_{CMAX}$) 2301 of the electronic device as an initial value. According to various embodiments, the electronic device 101 may set the maximum transmission power 2302 to 22 dBm adjusted to be lower by −1 dB after 1 second, based on identifying the overheating state. As the overheating state is continuously identified, the electronic device 101 may adjust the maximum transmission power 2302 to 21 dBm after 2 seconds. According to various embodiments, the electronic device 101 may set the maximum transmission power 2302 to 21 dBm after 3 seconds to the same value as before, and may adjust the maximum transmission power 2302 as high as 22 dBm by 1 dB when the electronic device 101 comes out of the overheating state after 4 seconds.

According to various embodiments, the electronic device 101 may set a transmission power ($P_{PUSCH}$) 2303 of uplink data based on the adjusted maximum transmission power 2302. For example, as illustrated in FIG. 23, the transmit power 2303 of the uplink data, as described above, may be changed according to a channel state that is changed in real time, and may be determined according to a transmitting power control (TPC) by a base station. For example, the electronic device 101 may determine the target power based on <Equation 1> according to the standard document 3GPP TS 38.213 as described above in the description of FIG. 18. According to various embodiments, the electronic device 101 may transmit the uplink data at the transmit power 2303 of the uplink data determined based on the target power calculated according to <Equation 1> and the adjusted maximum transmission power 2302. For example, by determining the transmit power 2303 of the uplink data as a smaller (e.g., to the minimum) value of the target power calculated according to <Equation 1> and the adjusted maximum transmission power 2302, it may be configured so that the transmit power 2303 of the uplink data does not exceed the adjusted maximum transmission power 2302.

According to various embodiments, the electronic device 101 may transmit information on a difference between the adjusted maximum transmission power 2302 and the determined transmission power 2303 of the uplink data in a power headroom report (PHR) to the base station (e.g., the base station 2210 of FIG. 22). For example, the electronic device 101 may transmit the PHR to the network through a medium access control (MAC) control element (CE). The base station may perform transmission power control for the electronic device 101 based on the PHR transmitted from the electronic device 101. For example, when the base station determines that there is no difference between the adjusted maximum transmission power 2302 and the determined transmission power 2303 of the uplink data as a result of identifying the PHR, the current transmit power 2303 refers to the maximum transmission power, so the base station may control to maintain or lower the target power of the electronic device 101 without controlling to increase the target power any more.

Figure 24:
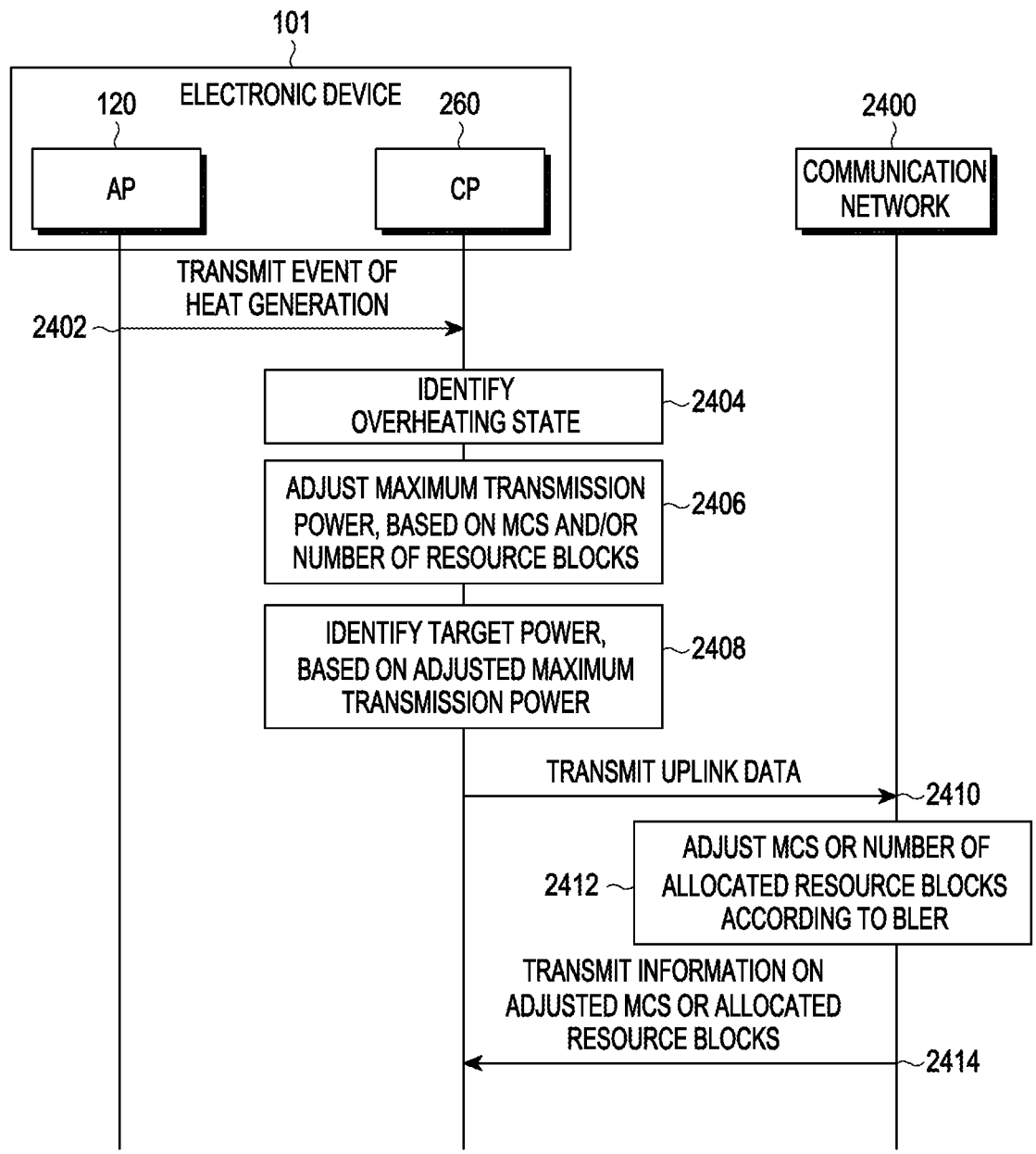
FIG. 24 is a signal flow diagram illustrating an example method of operating an electronic device according to various embodiments.

FIG. 24 is a signal flow diagram illustrating an example method of operating an electronic device according to various embodiments. Referring to FIG. 24, according to various embodiments, the AP 120 (e.g., the processor 120) of the electronic device 101 may transmit a heating (e.g., heat generation) event to the CP 260 (e.g., at least one of the first communications processor 212, the second communications processor 214, or the unified communications processor 260) in operation 2402.

According to various embodiments, the CP 260 (e.g., at least one of the first communications processor 212, the second communications processor 214, or the unified communications processor 260) of the electronic device 101 may identify an overheating state (or information related to overheating conditions) in operation 2404.

According to various embodiments, the CP 260 of the electronic device 101 may adjust the maximum transmission power to a relatively lower value based on at least one of the MCS and/or the number of resource blocks in operation 2406 in response to identifying the overheating state (or information related to overheating conditions). Because various embodiments of adjusting the maximum transmission power have been described with reference to FIGS. 18 and 19, a detailed description thereof may not be repeated.

According to various embodiments, the CP 260 of the electronic device 101 may set or confirm a target power (e.g., transmit power of uplink data) based on the low-adjusted maximum transmission power in operation 2408, and transmit the uplink transmission data to the communication network 2400 (e.g., base station 2210) in operation 2410.

According to various embodiments, the communication network 2400 may receive uplink data for which the transmit power is adjusted to be low, and as the transmit power is adjusted to be low, the BLER for the received uplink data may be increased. The communication network 2400 may adjust the allocation number of MCSs or resource blocks as the BLER is changed in operation 2412. For example, as the BLER increases, the communication network 2400 may lower the MCS index or reduce the number of resource blocks allocated. The communication network 2400 may transmit the adjusted MCS or resource block allocation information to the electronic device 101 in operation 2414.

According to various embodiments, the electronic device 101 may move to a position of the weak electric field. For example, the electronic device 101 may move from the position of the UE A 101a of FIG. 22 to the position (e.g., border area of cell 2220) of the UE B 101b. Although the electronic device 101 moves to the position of the weak electric field, normal communication between the electronic device 101 and the communication network 2400 may be difficult because the maximum transmission power is adjusted to be low according to the overheating state of the electronic device 101. According to various embodiments, when the electronic device 101 moves to the position of the weak electric field, the electronic device 101 may adjust the maximum transmission power to be higher again. According to various embodiments, the electronic device 101 may identify the weak electric field condition based on reference signal received power (RSRP) of the received signal or the number of times of decoding failure of the received signal. For example, when the RSRP of the received signal is less than or equal to a set value (e.g., −115 dBm), the electronic device 101 may determine the weak electric field state.

Figure 25:
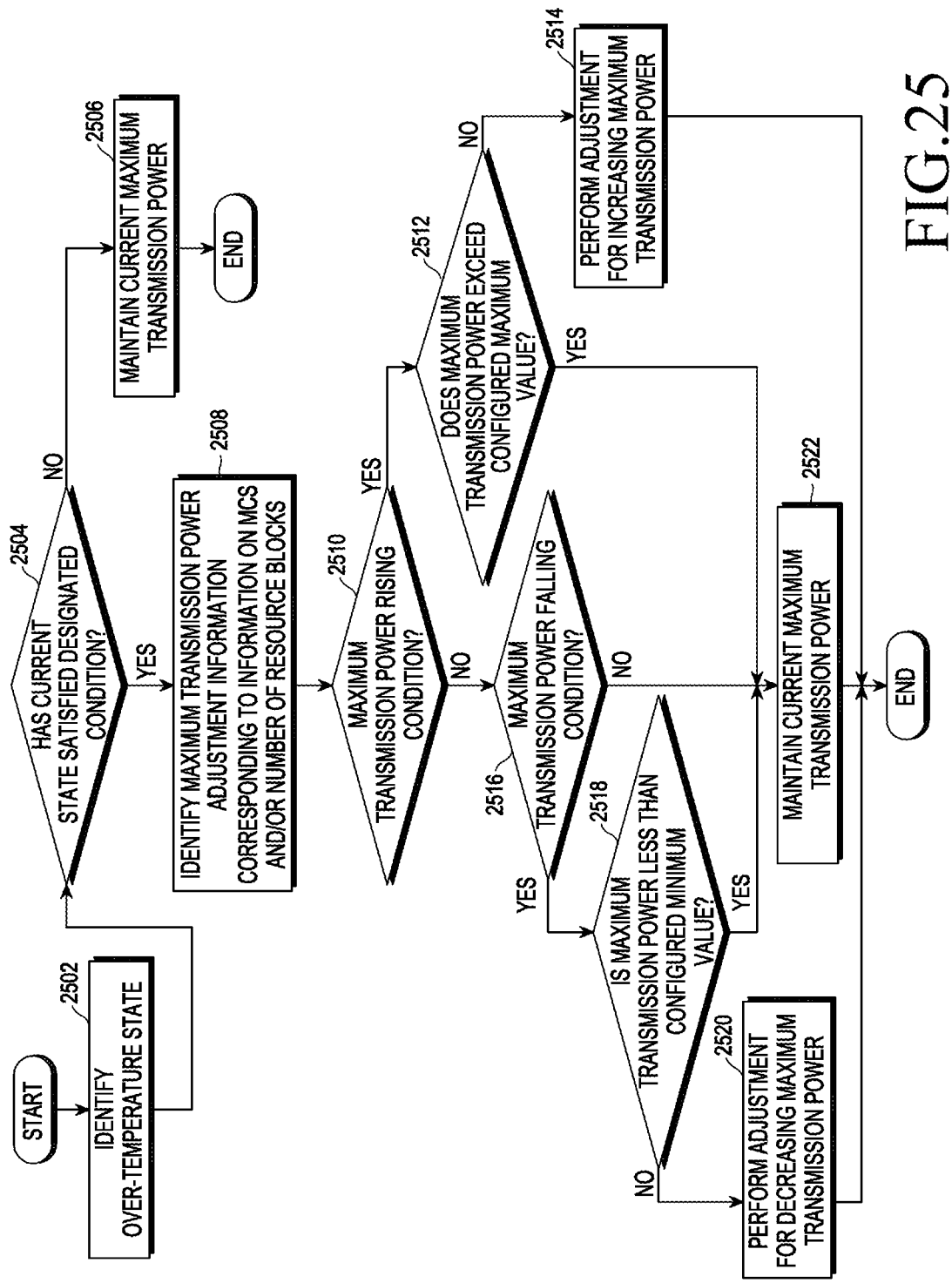
FIG. 25 is a flowchart illustrating an example method of operating an electronic device according to various embodiments.

FIG. 25 is a flowchart illustrating an example method of operating an electronic device according to various embodiments. Referring to FIG. 25, according to various embodiments, the electronic device 101 (e.g., at least one of the processor 120, the first communications processor 212, the second communications processor 214, or the unified communications processor 260) may identify the overheating state (or information related to overheating conditions) in operation 2502.

According to various embodiments, in response to identifying the overheating state (or information related to the overheating state), the electronic device 101 may determine whether the current state satisfies a specified condition in operation 2504. For example, the situation in which the specified condition is satisfied may include at least one of operation 1205 of FIG. 12, operation 1505 of FIG. 15, operation 1607 of FIG. 16, and operation 1707 of FIG. 17. As a result of the identification, if the specified condition is not satisfied (2504—No), the current maximum transmission power (e.g., $P_{CMAX}$) may be maintained in operation 2506.

According to various embodiments, as a result of the identification, when a specified condition is satisfied (2504—Yes), the electronic device 101 may identify the adjustment information of the maximum transmission power corresponding to at least one of the MCS and the number of resource blocks in operation 2508. For example, the electronic device 101 may identify the adjustment information of the maximum transmission power corresponding to the number of MCSs and resource blocks with reference to <Table 4> below.

TABLE 4

|  | Number of resource blocks | | |
| --- | --- | --- | --- |
|  | 1~30 | 31~60 | 61~ |
| MCS index 3~10 | increase | maintain | decrease |
| 11~19 | maintain | decrease | decrease |
| 20~27 | decrease | decrease | decrease |

Referring to <Table 4> above, if the MCS index is 11 to 19 and the number of resource blocks is 31 to 60, it can be adjusted so that the maximum transmission power is reduced by a unit setting value (e.g., 1 dB). As another example, if the MCS index is 3 to 10 and the number of resource blocks is 1 to 30, it can be adjusted so that the maximum transmission power is increased by a unit setting value (e.g., 1 dB). As another example, if the MCS index is 11-19 and the number of resource blocks is 1 to 30, it can be set to maintain the current maximum transmission power. According to various embodiments, the electronic device 101 may identify the adjustment information of the maximum transmission power and, in operation 2510, determine whether the identified adjustment information of the maximum transmission power is a rising condition (e.g., the condition set to increase by the unit set value). For example, referring to <Table 4>, when the MCS index is 3 to 10 and the number of resource blocks is 1 to 30, the electronic device 101 may identify that the maximum transmission power is increased or raised. As a result of the identification, if the condition for increasing the maximum transmission power is identified (2510—Yes), the electronic device 101 may determine whether the value obtained by adjusting the increase of the maximum transmission power in operation 2512 exceeds a set maximum value. As a result of the identification, if the set maximum value is exceeded (2512—Yes), the electronic device 101 may control to maintain the current maximum transmission power without increasing it in operation 2522. As a result of the identification, if the set maximum value is not exceeded (2512—No), the electronic device 101 may increase the current maximum transmission power by the unit setting value in operation 2514.

According to various embodiments, if it is identified that the maximum transmission power increase condition is not the result of the identification in the operation 2510 (2510—No), in operation 2516, the electronic device 101 may determine whether the adjustment information of the maximum transmission power identified in operation 2508 is a falling condition (e.g., the condition configured to decrease by the unit set value). For example, referring to <Table 4>, when the MCS index is 11 to 19 and the number of resource blocks is 31 to 60, the electronic device 101 may identify that the maximum transmission power is reduced or lowered. As a result of the identification, if it is identified that the maximum transmission power is falling condition (2516—Yes), the electronic device 101 may identify whether the value obtained by lowering the maximum transmission power in operation 2518 is less than a set minimum value. As a result of the identification, if it is less than the set minimum value (2518—Yes), in operation 2522, the electronic device 101 may maintain current maximum transmission power without reducing the current maximum transmission power. As a result of the identification, if the value obtained by lowering the maximum transmission power is not less than the set minimum value (2518—No), the electronic device 101 may lower the current maximum transmission power by the unit setting value in operation 2520. As a result of the identification in operation 2516, if it is identified that the maximum transmission power is not a falling condition (2516—No), in operation 2522, the electronic device 101 may maintain the current maximum transmission power.

Figure 26:
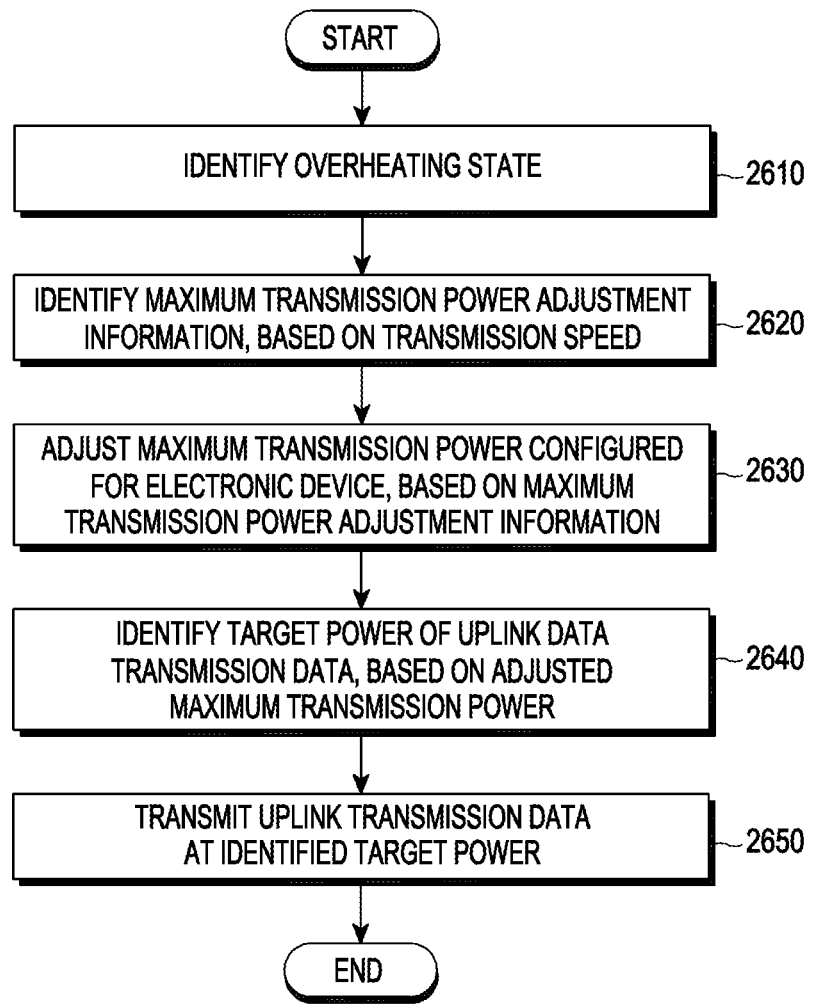
FIG. 26 is a flowchart illustrating an example method of operating an electronic device according to various embodiments.

FIG. 26 is a flowchart illustrating an example method of operating an electronic device according to various embodiments. Referring to FIG. 26, according to various embodiments, the electronic device 101 (e.g., at least one of the processor 120, the first communications processor 212, the second communications processor 214, or the unified communications processor 260) may identify the overheating state (or information related to overheating conditions) in operation 2610. For example, the electronic device 101 may identify an indication indicating an overheating in operation 2610. For example, the processor 120 may obtain temperature information from the sensor module 176. For example, the processor 120 may determine whether the obtained temperature information is equal to or greater than a specified threshold temperature (e.g., 43° C.). When the obtained temperature information is equal to or greater than a specified threshold temperature, the processor 120 may provide an indication indicating the overheating to the communication processor (e.g., at least one of the first communications processor 212, the second communications processor 214, or the unified communications processor 260). In another implementation example, the communication processor (e.g., at least one of the first communications processor 212, the second communications processor 214, or the unified communications processor 260) may obtain temperature information directly from the sensor module 176. In this case, the communication processor (e.g., at least one of the first communications processor 212, the second communications processor 214, or the unified communications processor 260) may determine whether the obtained temperature information is equal to or greater than a specified threshold temperature.

According to various embodiments, the electronic device 101 may identify information related to an overheating state in operation 2610. For example, the electronic device 101 may manage a plurality of temperature ranges. The electronic device 101 may identify a temperature range including the measured temperature as information related to an overheating state.

According to various embodiments, the electronic device 101 may control the transmission power based on information (e.g., information related to resource allocation) related to a physical (PHY) layer in response to identifying the overheating state (or information related to overheating conditions). For example, the electronic device 101 may identify whether the maximum transmission power (Max Tx power) is adjusted and/or the adjustment information of the maximum transmission power based on information related to a physical layer in response to identifying the overheating state. The information related to the physical layer may include at least one of modulation and coding scheme (MCS), the number of resource blocks (RBs) (NRB), grant ratio, block error rate (BLER), data rate (or throughput; T-put), buffer status index (BSI), or path loss (PL). According to various embodiments, the electronic device 101 may use the average value for a set unit time (e.g., 1 second) when applying the information related to the physical layer in embodiments to be described later.

According to various embodiments, the electronic device 101 may control the power of the transmission signal according to the target power required from the base station within the maximum transmission power transmittable by the electronic device 101. For example, the electronic device may control the power of the transmission signal to a minimum value among a target power and a maximum transmission power (UE Tx MAX Power) of the electronic device. According to various embodiments, the maximum transmission power (UE Tx MAX Power) of the electronic device may be determined to be the smallest among maximum available transmit power (PcMax) of the electronic device in consideration of the characteristics of the electronic device, maximum transmission power (PeMax) according to a power class set in the electronic device, and maximum transmission power considering specific absorption rate (SAR) back-off event (SAR Max Power), but there is no limitation on the determination method. In the following description, for convenience of description, it is assumed that the maximum transmission power (UE Tx MAX Power) is the maximum transmission power (PcMax) available for the electronic device.

According to various embodiments, the target power may be changed according to a channel state that is changed in real time, and may be determined according to transmitting power control (TPC) by the base station. According to various embodiments, the electronic device 101 may be determined within a range in which the target power determined based on <Equation 1> does not exceed the maximum transmission power of the electronic device. For example, when the maximum transmission power of the electronic device is set to 20 dBm and the target power determined based on Equation 1 above is 21 dBm, the transmit power for uplink data transmission in the electronic device 101 may be limited to 20 dBm.

According to various embodiments, the electronic device 101 may identify the adjustment information of the maximum transmission power based on the above-described information (e.g., information related to resource allocation) related to the physical (PHY) layer, in response to identifying the overheating state (or information related to overheating conditions) in operation 2610. For example, in operation 2620, the electronic device 101 may identify the adjustment information of the maximum transmission power based on the transmission speed (or throughput (T-put)). For example, the electronic device 101 may determine the transmission rate (e.g., data rate (or throughput)) based on <Equation 2> below according to the standard document 3GPP TS 38.306.

[Equation 2]

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

The definition of <Equation 2> may follow 3GPP TS 38.306, for example, v may refer to the number of layers, Qm may refer to a modulation order, f may refer to a scaling factor, and Rmax may refer to a code rate. In <Equation 2>, N may refer to the number of RBs allocated to the electronic device 101, T may refer to numerology, and OH may refer to overhead in consideration of control data. For example, the data rate may be determined based on the number of MCSs and/or resource blocks as illustrated in <Equation 2>.

According to various embodiments, the electronic device 101 may map and apply the data rate or a range of the data rate and an adjustment value of the maximum transmission power. For example, when the data rate is within the first set range, it may be set to adjust by −1 dB from the currently set maximum transmission power, when the data rate is within the set second range, it may be set to adjust by −2 dB from the currently set maximum transmission power, and when the range of the MCS index is 20 to 27, it may be set to adjust by −3 dB from the currently set maximum transmission power.

According to various embodiments, in operation 2620 described above, the electronic device 101 may identify the adjustment information of the maximum transmission power by further considering a grant ratio to the transmission rate. For example, based on a value obtained by dividing the transmission rate determined by <Equation 2> by the grant ratio, it is possible to identify the adjustment information of the maximum transmission power.

According to various embodiments, the electronic device 101 may adjust the set maximum transmission power for the electronic device based on the identified maximum transmission power adjustment information in operation 2630. For example, when the maximum transmission power (e.g., initial value of maximum transmission power or current value of maximum transmission power) is set to 23 dBm, if adjusted by −1 dB according to the data rate, the maximum transmission power may be adjusted to 22 dBm, if adjusted by −2 dB according to the data rate, the maximum transmission power may be adjusted to 21 dBm, and if adjusted by −3 dB according to the data rate, the maximum transmission power may be adjusted to 20 dBm.

According to various embodiments, the electronic device 101 may identify a target power of uplink transmission data based on the adjusted maximum transmission power in operation 2640.

According to various embodiments, the electronic device 101 may transmit the uplink transmission data with a target power set or checked based on the adjusted maximum transmission power in operation 2650.

According to various embodiments, the electronic device 101 may determine whether to apply the adjustment of the maximum transmission power in operations 2620 and 2630 based on the above-described information (e.g., information related to resource allocation) related to the physical (PHY) layer.

For example, when the path loss is greater than or equal to a set value (30 dB), it may be determined that the electronic device 101 is located in an area outside the cell or a weak electric field, so that the above-described adjustment of the maximum transmission power may not be applied. For example, even if the maximum transmission power can be adjusted from 23 dBm to 22 dBm according to the number of MCS and/or resource blocks, if the path loss is equal to or greater than a set value, the maximum transmission power is no longer lowered or, conversely, the maximum transmission power can be adjusted to increase.

According to various embodiments, the electronic device 101 may be set not to exceed a set maximum value when adjusting the maximum transmission power, and may set not to be less than a set minimum value. For example, when the maximum value of the maximum transmission power is set to 25 dBm and the minimum value is set to 10 dBm, according to the number of the MCS and/or resource blocks, the electronic device 101 may control not to exceed 25 dBm set as the maximum value even when the maximum transmission power increases, and may control not to be less than 10 dBm set as the minimum value even when the maximum transmission power decreases.

According to various embodiments, when the grant ratio is equal to or greater than a set value, the electronic device 101 may not apply the above-described adjustment of the maximum transmission power. For example, if the grant ratio is 50% or more, the electronic device 101 may control so that the maximum transmission power is not lowered further from a currently set value, or control that the maximum transmission power is not lowered by more than a set value (e.g., 3 dB) from an initial value of the maximum transmission power.

According to various embodiments, when the BSI is equal to or greater than a set value, the electronic device 101 may not apply the above-described adjustment of the maximum transmission power. For example, if the BSI is equal to or greater than a specific value, the electronic device 101 may control so as not to lower the maximum transmission power further from the currently set value or to not lower the maximum transmission power by more than a set value (e.g., 3 dB) from the initial value of the maximum transmission power. The BSI may be transmitted while being included in a buffer status report (BSR) transmitted from the electronic device 101 to the network. For example, the electronic device 101 may transmit the BSR including the BSI to the network through a medium access control (MAC) control element (CE). According to various embodiments, the electronic device 101 may identify the BSI included in the BSR for transmission to the network, and when the BSI is greater than or equal to a set value, control not to lower the maximum transmission power. For example, when the BSI is 50, the buffer size may correspond to 19325 bytes to 22624 bytes, and the electronic device 101 may control not to lower the maximum transmission power to ensure transmission of data corresponding to the buffer size.

According to various embodiments, when the BLER is equal to or greater than a set value, the electronic device 101 may not apply the above-described adjustment of the maximum transmission power. For example, when the BLER is 10% or more, the electronic device 101 may control the maximum transmission power not to be lowered further from a currently set value.

According to various example embodiments, an electronic device (e.g., electronic device 101) may include: at least one processor (e.g., at least one of processor 120, first communication processor 212, second communication processor 214, unified communication processor 260, or communication processor 1320), and the at least one processor may be configured to identify at least one event requiring a change in UE capability of the electronic device, change the UE capability of the electronic device based on the at least one event and transmit a TAU request message indicating that UE capability information update is requested, enter an idle state, based on receiving a TAU acceptance message corresponding to the TAU request message in a state in which the UE capability enquiry message corresponding to the TAU request is not received, establish a new RRC connection with the network in the idle state, receive a UE capability enquiry message based on the new RRC connection, and transmit a UE capability information message including the changed UE capability based on the reception of the UE capability enquiry message.

According to various embodiments, the at least one processor may be configured to identify an overheating state of the electronic device as at least a part of an operation of identifying at least one event for which a change in the UE capability is required.

According to various embodiments, the at least one processor may be configured to identify an indication indicating whether the electronic device is overheating as at least part of the operation of identifying the overheating state of the electronic device, and change at least one information element configured in response to the indication, as at least a part of the operation of changing the UE capability, based on the at least one event.

According to various embodiments, the at least one processor may be configured to identify information related to the measured temperature as at least a part of the operation of identifying the overheating state of the electronic device, and change at least one information element configured in response to the measured temperature, as at least part of the operation of changing the UE capability, based on the at least one event.

According to various embodiments, the at least one processor may be configured to: change at least one of an information element associated with deactivation of carrier aggregation (CA) and/or dual connectivity DC, an information element associated with a reduction in the number of component carrier CCs in CA, an information element associated with a reduction in bandwidth, an information element associated with a reduction in the number of layers, an information element associated with a reduction in the number of modulation and coding schemes MCSs, an information element associated with deactivation of a sounding reference signal (SRS) transmission, or an information element associated with deactivation of a specific radio access technology (RAT), as at least part of the operation of changing the UE capability based on the at least one event.

According to various embodiments, the at least one processor may be configured to identify an indication of deactivation of the first communication and/or the first RAT, as at least part of an operation of identifying at least one event for which a change in UE capability is required; and change the information element of the UE capability to deactivate the first communication and/or the first RAT, as at least part of the operation of changing the UE capability, based on the at least one event.

According to various embodiments, the at least one processor may be configured to monitor a parameter of a condition for deactivation of the first communication and/or the first RAT and confirm that the condition is satisfied based on the parameter, as at least part of the operation of identifying at least one event for which a change in UE capability is required, and change the information element of the UE capability to deactivate the first communication and/or the first RAT, as at least part of the operation of changing the UE capability, based on the at least one event.

According to various embodiments, the at least one processor may be configured to confirm the performance of at least one of a Wi-Fi communication connection and/or an IMS-related operation based on the Wi-Fi communication connection, as at least part of the operation of identifying at least one event for which a change in UE capability is required, and change an information element of the UE capability to deactivate a first communication and/or a first RAT that does not support call switching with the Wi-Fi communication, as at least part of the operation of changing the UE capability, based on the at least one event.

According to various embodiments, the at least one processor may further be configured to: confirm an end of the at least one event, based on transmitting the UE capability information message including the changed UE capability, recover the UE capability based on the end of the at least one event, and perform at least one operation for reporting the recovered UE capability to the network.

According to various embodiments, the at least one processor may be configured to transmit an RRC connection setup complete message including a TAU request message, based on no data to be transmitted in the idle state, or transmit an RRC connection setup complete message including a service request message based on the presence of data to be transmitted in the idle state, as at least part of the operation of establishing the new RRC connection with the network in the idle state.

According to various embodiments, the at least one processor may be configured to, based on the failure to receive the UE capability enquiry message after establishing the new RRC connection, perform at least one operation for deregistration from the core network; perform at least one operation for registration with the core network after deregistration for the core network, receive the UE capability enquiry message after registration with the core network, and transmit a UE capability information message including the changed UE capability, based on the reception of the UE capability enquiry message.

According to various embodiments, the at least one processor may be configured to transmit the TAU request message based on at least one service being used and/or scheduled to be used by the electronic device, as at least part of the operation of transmitting the TAU request message indicating that the UE capability information update is requested.

According to various embodiments, the at least one processor may be configured to, based on confirmation that the at least one service is not being used by the electronic device and/or it is confirmed that it is not going to be used, perform at least one operation for deregistration for the core network, perform at least one operation for registration with the core network after deregistration for the core network, after registration with the core network, receive the UE capability enquiry message, and transmit a UE capability information message including the changed UE capability, based on the reception of the UE capability enquiry message.

According to various embodiments, a method of operating an electronic device may include identifying at least one event requiring a change in UE capability of the electronic device, changing the UE capability of the electronic device based on the at least one event and transmitting a TAU request message indicating that UE capability information update is requested, entering an idle state, based on receiving a TAU acceptance message corresponding to the TAU request message in a state in which the UE capability enquiry message corresponding to the TAU request is not received, establishing a new RRC connection with the network in the idle state, receiving a UE capability enquiry message based on the new RRC connection, and transmitting a UE capability information message including the changed UE capability, based on the reception of the UE capability enquiry message.

According to various embodiments, the identifying at least one event requiring a change in UE capability includes checking an overheating state of the electronic device.

According to various embodiments, the identifying the overheating state of the electronic device includes checking an indication indicating whether the electronic device is overheating, and the changing the UE capability based on the at least one event includes changing at least one information element set in response to the indication.

According to various embodiments, the identifying the overheating state of the electronic device includes checking information related to the measured temperature, and the changing the UE capability based on the at least one event includes changing at least one information element set in response to the measured temperature.

According to various embodiments, the changing the UE capability based on the at least one event includes changing at least one of an information element associated with deactivation of CA and/or DC, an information element associated with a reduction in the number of CCs in CA, an information element associated with a reduction in bandwidth, an information element associated with a reduction in the number of layers, an information element associated with a reduction in the number of MCSs, an information element associated with deactivation of SRS transmission, or an information element associated with deactivation of a specific RAT.

According to various embodiments, the identifying at least one event requiring a change in UE capability includes identifying an indication of deactivation of the first communication and/or the first RAT, and the changing the UE capability of the electronic device based on the at least one event includes changing the information element of the UE capability to deactivate the first communication and/or the first RAT.

According to various embodiments, the identifying at least one event requiring a change in UE capability includes monitoring a parameter of a condition for deactivation of the first communication and/or the first RAT, and confirming that the condition is satisfied based on the parameter, and the changing the UE capability of the electronic device based on the at least one event includes changing the information element of the UE capability to deactivate the first communication and/or the first RAT.

According to various embodiments, the identifying at least one event requiring a change in UE capability includes confirming the performance of at least one of a Wi-Fi communication connection and/or an IMS-related operation based on the Wi-Fi communication connection, and the changing the UE capability of the electronic device based on the at least one event includes changing the information element of the UE capability to deactivate a first communication and/or a first RAT that does not support call switching with the Wi-Fi communication.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising at least one processor, wherein the at least one processor, comprising processing circuitry, is individually and/or collectively configured to:

identify at least one event requiring a change in user equipment (UE) capability of the electronic device, change the UE capability of the electronic device, based on the at least one event, and transmit a tracking area update (TAU) request message indicating that UE capability information update is requested, receive a TAU accept message corresponding to the TAU request message while a UE capability enquiry message corresponding to the TAU request is not received, enter an idle state, based on receiving the TAU accept message while the UE capability enquiry message is not received, establish a new radio resource control (RRC) connection with the network in the idle state, receive a UE capability enquiry message based on the new RRC connection, transmit a UE capability information message including the changed UE capability based on the reception of the UE capability enquiry message, identify an end of the at least one event, after transmitting the UE capability information message including the changed UE capability, recover the UE capability, based on the end of the at least one event, and perform at least one operation for reporting the recovered UE capability to the network.

2. The electronic device of claim 1, wherein the at least one processor is configured to identify an overheating state of the electronic device, as at least a part of an operation of identifying at least one event for which a change in the UE capability is required.

3. The electronic device of claim 2, wherein the at least one processor is configured to identify an indication indicating whether the electronic device is overheating, as at least part of the operation of checking the overheating state of the electronic device, and change at least one information element configured in response to the indication, as at least a part of the operation of changing the UE capability, based on the at least one event.

4. The electronic device of claim 2, wherein the at least one processor is configured to:

identify information related to the measured temperature, as at least a part of the operation of confirming the overheating state of the electronic device, and change at least one information element configured in response to the measured temperature, as at least part of the operation of changing the UE capability, based on the at least one event.

5. The electronic device of claim 2, wherein the at least one processor is configured to: change at least one of an information element associated with deactivation of carrier aggregation (CA) and/or DC, an information element associated with a reduction in the number of CCs in CA, an information element associated with a reduction in bandwidth, an information element associated with a reduction in the number of layers, an information element associated with a reduction in the number of MCSs, an information element associated with deactivation of a sounding reference signal (SRS) transmission, or an information element associated with deactivation of a specific radio access technology (RAT), as at least part of the operation of changing the UE capability, based on the at least one event.

6. The electronic device of claim 1, wherein the at least one processor is configured to:

identify an indication of deactivation of the first communication and/or the first RAT, as at least part of an operation of identifying, as at least one event for which a change in UE capability is required, and change the information element of the UE capability to deactivate the first communication and/or the first RAT, as at least part of the operation of changing the UE capability, based on the at least one event.

7. The electronic device of claim 1, wherein the at least one processor is configured to monitor a parameter of a condition for deactivation of the first communication and/or the first RAT and confirm that the condition is satisfied based on the parameter, as at least part of the operation of identifying at least one event for which a change in UE capability is required, and change the information element of the UE capability to deactivate the first communication and/or the first RAT, as at least part of the operation of changing the UE capability, based on the at least one event.

8. The electronic device of claim 1, wherein the at least one processor is configured to:

identify the performance of at least one of a Wi-Fi communication connection and/or an IMS-related operation based on the Wi-Fi communication connection, as at least part of the operation of identifying at least one event for which a change in UE capability is required, and change an information element of the UE capability to deactivate a first communication and/or a first RAT that does not support call switching with the Wi-Fi communication, as at least part of the operation of changing the UE capability, based on the at least one event.

9. The electronic device of claim 1, wherein the at least one processor is configured to:

as at least part of the operation of establishing the new RRC connection with the network in the idle state, transmit through the transceiver, an RRC connection setup complete message including a TAU request message, based on no data to be transmitted in the idle state, or transmit through the transceiver, an RRC connection setup complete message including a service request message, based on the presence of data to be transmitted in the idle state.

10. The electronic device of claim 1, wherein the at least one processor is further configured to, based on the failure to receive the UE capability enquiry message after establishing the new RRC connection:

perform at least one operation for deregistration to the core network, perform at least one operation for registration with the core network based on deregistration for the core network, receive through the transceiver, the UE capability enquiry message based on registration with the core network, and transmit through the transceiver, a UE capability information message including the changed UE capability, based on the reception of the UE capability enquiry message.

11. The electronic device of claim 1, wherein the at least one processor is configured to transmit the TAU request message, based on at least one service being used and/or scheduled to be used by the electronic device, as at least part of the operation of transmitting the TAU request message indicating that the UE capability information update is requested.

12. The electronic device of claim 11, wherein the at least one processor is further configured to, based on confirmation that the at least one service is not being used by the electronic device and/or it is confirmed that it is not going to be used:

perform at least one operation for deregistration for the core network, perform at least one operation for registration with the core network based on deregistration for the core network, receive through the transceiver, the UE capability enquiry message after registration with the core network, and transmit a UE capability information message including the changed UE capability, based on the reception of the UE capability enquiry message.

13. A method of operating an electronic device, the method comprising:
    identifying at least one event requiring a change in UE capability of the electronic device;
    changing the UE capability of the electronic device based on the at least one event and transmitting a TAU request message indicating that UE capability information update is requested;
    receiving a TAU acceptance message corresponding to the TAU request message in a state in which a UE capability enquiry message corresponding to the TAU request is not received;
    entering an idle state, based on receiving the TAU accept message while the UE capability enquiry message is not received;
    establishing a new RRC connection with the network in the idle state;
    receiving a UE capability enquiry message based on the new RRC connection;
    transmitting a UE capability information message including the changed UE capability based on the reception of the UE capability enquiry message;
    identifying an end of the at least one event, after transmitting the UE capability information message including the changed UE capability;
    recovering the UE capability, based on the end of the at least one event; and
    performing at least one operation for reporting the recovered UE capability to the network.

14. The method of claim 13, wherein the identifying at least one event requiring a change in UE capability comprises checking an overheating state of the electronic device.

15. The method of claim 14, wherein the identifying the overheating state of the electronic device comprises checking an indication indicating whether the electronic device is overheating, and
    the changing the UE capability based on the at least one event comprises changing at least one information element set in response to the indication.

16. The method of claim 14, wherein the identifying the overheating state of the electronic device comprises checking information related to the measured temperature, and
    the changing the UE capability based on the at least one event comprises changing at least one information element set in response to the measured temperature.

17. The method of claim 13, wherein the changing the UE capability based on the at least one event comprises changing at least one of an information element associated with deactivation of CA and/or DC, an information element associated with a reduction in the number of CCs in CA, an information element associated with a reduction in bandwidth, an information element associated with a reduction in the number of layers, an information element associated with a reduction in the number of MCSs, an information element associated with deactivation of SRS transmission, or an information element associated with deactivation of a specific RAT.

18. The method of claim 13, wherein the identifying at least one event requiring a change in UE capability comprises identifying an indication of deactivation of the first communication and/or the first RAT, and
    the changing the UE capability of the electronic device based on the at least one event comprises changing the information element of the UE capability to deactivate the first communication and/or the first RAT.

19. The method of claim 13, wherein the identifying at least one event requiring a change in UE capability comprises monitoring a parameter of a condition for deactivation of the first communication and/or the first RAT, and identifying that the condition is satisfied based on the parameter, and
    the changing the UE capability of the electronic device based on the at least one event comprises changing the information element of the UE capability to deactivate the first communication and/or the first RAT.

* * * * *